US012403505B2

(12) United States Patent
Kumar et al.

(10) Patent No.: US 12,403,505 B2
(45) Date of Patent: Sep. 2, 2025

(54) SORTING OF ALUMINUM ALLOYS

(71) Applicant: Sortera Technologies Inc., Markle, IN (US)

(72) Inventors: Nalin Kumar, Fort Wayne, IN (US); Manuel Gerardo Garcia, Jr., Austin, TX (US)

(73) Assignee: SORTERA TECHNOLOGIES, INC., Markle, IN (US)

(*) Notice: Subject to any disclaimer, the term of this patent is extended or adjusted under 35 U.S.C. 154(b) by 0 days.

(21) Appl. No.: 18/590,841

(22) Filed: Feb. 28, 2024

(65) Prior Publication Data

US 2024/0246117 A1 Jul. 25, 2024

Related U.S. Application Data

(60) Continuation-in-part of application No. 17/495,291, filed on Oct. 6, 2021, now Pat. No. 11,975,365, which is a continuation-in-part of application No. 17/491,415, filed on Sep. 30, 2021, now Pat. No. 11,278,937, which is a continuation-in-part of application No. 17/380,928, filed on Jul. 20, 2021, which is a continuation-in-part of application No. 17/227,245, filed on Apr. 9, 2021, now Pat. No.
(Continued)

(51) Int. Cl.

| | |
|---|---|
| ***B07C 5/34*** | (2006.01) |
| ***B07C 5/342*** | (2006.01) |
| *B07C 5/04* | (2006.01) |

(52) U.S. Cl.
CPC .............. *B07C 5/3422* (2013.01); *B07C 5/34* (2013.01); *B07C 5/342* (2013.01); *B07C 5/04* (2013.01); *B07C 2501/0054* (2013.01)

(58) Field of Classification Search
CPC ......... B07C 5/34; B07C 5/342; B07C 5/3422; B07C 5/04; B07C 2501/0054
See application file for complete search history.

(56) References Cited

U.S. PATENT DOCUMENTS 4,317,521 A 3/1982 Clark
4,572,735 A 2/1986 Poetzschke
(Continued)

FOREIGN PATENT DOCUMENTS

BR PI0210794-5 B1 7/2002
CA 3065962 A1 * 6/2020 ............. B07C 5/342
(Continued)

OTHER PUBLICATIONS

European Patent Office; Extended European Search Report for application EP19792330.3; Apr. 30, 2021; 7 pages.
(Continued)

*Primary Examiner* — Terrell H Matthews
(74) *Attorney, Agent, or Firm* — Kelly Kordzik

(57) ABSTRACT

A material handling system sorts mixed materials utilizing a combination of a spectroscopic sensor, such as x-ray fluorescence, and a vision system that implements an artificial intelligence system in order to identify or classify each of the materials, which are then sorted into separate groups based on such an identification or classification. The system is capable of sorting between materials typically found within Zorba, such as wrought, cast, and extrusion aluminum alloys.

23 Claims, 16 Drawing Sheets

Related U.S. Application Data

11,964,304, which is a continuation-in-part of application No. 16/939,011, filed on Jul. 26, 2020, now Pat. No. 11,471,916, said application No. 17/491,415 is a continuation-in-part of application No. 16/852,514, filed on Apr. 19, 2020, now Pat. No. 11,260,426, said application No. 16/939,011 is a continuation of application No. 16/375,675, filed on Apr. 4, 2019, now Pat. No. 10,722,922, said application No. 16/852,514 is a division of application No. 16/358,374, filed on Mar. 19, 2019, now Pat. No. 10,625,304, said application No. 16/375,675 is a continuation-in-part of application No. 15/963,755, filed on Apr. 26, 2018, now Pat. No. 10,710,119, said application No. 16/358,374 is a continuation-in-part of application No. 15/963,755, filed on Apr. 26, 2018, now Pat. No. 10,710,119, which is a continuation-in-part of application No. 15/213,129, filed on Jul. 18, 2016, now Pat. No. 10,207,296.

(60) Provisional application No. 63/487,583, filed on Feb. 28, 2023, provisional application No. 62/490,219, filed on Apr. 26, 2017, provisional application No. 62/193,332, filed on Jul. 16, 2015.

(56) References Cited

U.S. PATENT DOCUMENTS 4,586,613 A 5/1986 Horii
4,834,870 A 5/1989 Osterberg
4,848,590 A 7/1989 Kelly
5,016,039 A * 5/1991 Sosa .................... G03B 7/097 396/50
5,042,947 A 8/1991 Potzschke
5,114,230 A 5/1992 Pryor
5,236,092 A 8/1993 Krotkov
5,260,576 A 11/1993 Sommer, Jr.
5,663,997 A 9/1997 Willis
5,676,256 A 10/1997 Kumar
5,733,592 A 3/1998 Wettstein
5,738,224 A 4/1998 Sommer, Jr.
5,911,327 A 6/1999 Tanaka
6,064,476 A 5/2000 Goltsos
6,100,487 A 8/2000 Schultz
6,124,560 A * 9/2000 Roos ...................... B07C 5/361 209/587
6,266,390 B1 7/2001 Sommer, Jr.
6,313,422 B1 11/2001 Anibas
6,313,423 B1 * 11/2001 Sommer ................ B07C 5/366 209/579
6,412,642 B2 7/2002 Charles
6,421,042 B1 * 7/2002 Omura ............... G06F 3/04842 345/157
6,519,315 B2 2/2003 Sommer, Jr.
6,545,240 B2 4/2003 Kumar
6,795,179 B2 9/2004 Kumar
7,099,433 B2 8/2006 Sommer
7,200,200 B2 4/2007 Laurila
7,564,943 B2 7/2009 Sommer, Jr.
7,616,733 B2 11/2009 Sommer
7,674,994 B1 3/2010 Valerio
7,763,820 B1 7/2010 Sommer, Jr.
7,802,685 B2 9/2010 Allen
7,848,484 B2 12/2010 Sommer, Jr.
7,886,915 B2 2/2011 Shulman
7,978,814 B2 7/2011 Sommer
8,144,831 B2 3/2012 Sommer, Jr.
8,553,838 B2 10/2013 Sommer
8,600,545 B2 12/2013 Earlam
8,615,123 B2 * 12/2013 Dabic ................... G07D 5/005 382/136
9,156,162 B2 10/2015 Suzuki
9,316,596 B2 4/2016 Levesque
9,514,590 B2 12/2016 Lindbichler
9,785,851 B1 10/2017 Torek
9,927,354 B1 * 3/2018 Starr ................. G01N 21/3581
9,956,609 B1 5/2018 De Saro
10,005,107 B2 6/2018 Ogusu
10,036,142 B2 * 7/2018 Bamber ................. E02F 9/264
10,207,296 B2 * 2/2019 Garcia ..................... B07C 5/34
10,295,451 B2 5/2019 Schneider
10,467,477 B2 11/2019 Gershtein
10,478,861 B2 11/2019 Comtois
10,625,304 B2 * 4/2020 Kumar ................. G06T 7/0006
10,710,119 B2 * 7/2020 Kumar .................... G06N 3/08
10,722,922 B2 * 7/2020 Kumar ..................... B07C 5/34
10,799,915 B2 10/2020 Horowitz
10,824,936 B2 11/2020 Wu
10,967,404 B2 4/2021 Grof
11,278,937 B2 * 3/2022 Kumar ..................... B07C 5/34
11,964,304 B2 * 4/2024 Kumar ..................... B07C 5/34
12,246,355 B2 * 3/2025 Kumar ..................... B07C 5/34
2002/0186882 A1 12/2002 Cotman
2003/0147494 A1 8/2003 Sommer, Jr.
2004/0151364 A1 8/2004 Kenneway
2004/0235970 A1 11/2004 Smith
2006/0239401 A1 10/2006 Sommer
2007/0029232 A1 * 2/2007 Cowling ............... B07C 5/3425 209/577
2007/0262000 A1 11/2007 Valerio
2008/0029445 A1 2/2008 Russcher
2008/0257795 A1 10/2008 Shuttleworth
2008/0302707 A1 12/2008 Bourely
2009/0292422 A1 11/2009 Eiswerth
2010/0017020 A1 * 1/2010 Hubbard-Nelson .... B07C 5/346 700/230
2010/0264070 A1 10/2010 Sommer, Jr.
2011/0017644 A1 1/2011 Valerio
2011/0247730 A1 * 10/2011 Yanar .................. B22D 21/007 148/552
2012/0148018 A1 6/2012 Sommer, Jr.
2013/0028487 A1 1/2013 Stager
2013/0079918 A1 3/2013 Spencer
2013/0126399 A1 5/2013 Wolff
2013/0184853 A1 * 7/2013 Roos ...................... B07C 5/346 378/53
2013/0264249 A1 10/2013 Sommer, Jr.
2013/0304254 A1 * 11/2013 Torek ................... B07C 5/3416 700/223
2015/0012226 A1 * 1/2015 Skaff ..................... G01N 21/55 702/22
2015/0336135 A1 11/2015 Corak
2016/0016201 A1 * 1/2016 Schons .................... B07B 1/14 209/658
2016/0059450 A1 3/2016 Meredith
2016/0136694 A1 * 5/2016 Janda ................ G01N 15/1434 209/576
2016/0250665 A1 9/2016 Lampe
2016/0346811 A1 12/2016 Iino
2017/0014868 A1 1/2017 Garcia
2017/0232479 A1 * 8/2017 Pietzka .................. B07C 5/342 209/3.3
2017/0261437 A1 9/2017 Buchter
2018/0065155 A1 3/2018 Ripley
2018/0243800 A1 * 8/2018 Kumar .................. G06N 20/00
2019/0130560 A1 5/2019 Horowitz
2019/0210067 A1 7/2019 Sortera
2019/0247891 A1 8/2019 Sortera
2019/0299255 A1 * 10/2019 Chaganti ............. G06F 18/2431
2020/0050922 A1 2/2020 Wu
2020/0290088 A1 9/2020 Sortera
2020/0368786 A1 11/2020 Sortera
2021/0001377 A1 1/2021 Sutton
2021/0046509 A1 2/2021 Andersen
2021/0094075 A1 4/2021 Horowitz et al.
2021/0217156 A1 7/2021 Balachandran et al.
2021/0229133 A1 7/2021 Sortera
2021/0346916 A1 11/2021 Sortera
2022/0016675 A1 1/2022 Sortera
2022/0023918 A1 1/2022 Sortera

(56) References Cited

U.S. PATENT DOCUMENTS

| | | | |
|---|---|---|---|
| 2022/0161298 | A1 | 5/2022 | Sortera |
| 2022/0168781 | A1 | 6/2022 | Sortera |
| 2022/0203407 | A1 | 6/2022 | Sortera |
| 2022/0245402 | A1 | 8/2022 | Tae |
| 2022/0355342 | A1 | 11/2022 | Sortera |
| 2022/0371057 | A1 | 11/2022 | Sortera |
| 2023/0011383 | A1 | 1/2023 | Balthasar |
| 2023/0044783 | A1 | 2/2023 | Sortera |
| 2023/0053268 | A1 | 2/2023 | Sortera |
| 2023/0169751 | A1 | 6/2023 | Geurts |
| 2023/0173543 | A1 | 6/2023 | Sortera |
| 2023/0176028 | A1 | 6/2023 | Sortera |
| 2024/0109103 | A1 | 4/2024 | Kumar et al. |
| 2024/0149304 | A1 | 5/2024 | Sortera |

FOREIGN PATENT DOCUMENTS

| | | | | | |
|---|---|---|---|---|---|
| CN | 102861722 | | | 1/2013 | |
| CN | 106000904 | | | 10/2016 | |
| CN | 107552412 | A | * | 1/2018 | ............. B07C 5/342 |
| CN | 111659635 | | | 9/2020 | |
| CN | 211888005 | U | | 11/2020 | |
| DE | 202009006383 | | | 9/2009 | |
| EP | 0074447 | | | 1/1987 | |
| JP | H07-275802 | | | 10/1995 | |
| JP | 2010-172799 | | | 8/2010 | |
| JP | 5969685 | | | 7/2016 | |
| JP | 2017-109197 | | | 6/2017 | |
| JP | 2021163078 | | | 10/2021 | |
| TW | I707812 | | | 10/2020 | |
| WO | WO2011/159269 | | | 12/2011 | |
| WO | WO2016/199074 | | | 12/2016 | |
| WO | WO-2017011835 | A1 | * | 1/2017 | ........... G01N 23/223 |
| WO | WO-2019241114 | A1 | * | 12/2019 | ........... B07C 5/3422 |
| WO | WO-2021126876 | A1 | * | 6/2021 | ........... B65G 47/918 |
| WO | WO2023/137423 | | | 7/2023 | |

OTHER PUBLICATIONS

India Patent Office; Office Action issued for India Application Serial No. 201937044046; Jun. 4, 2020; 7 pages.

United States International Searching Authority; International Search Report & Written Opinion for PCT/US2016/042850; Sep. 28, 2016; 15 pages.

A. Lee, "Comparing Deep Neural Networks and Traditional Vision Algorithms in Mobile Robotics," Swarthmore College, 9 pages, downloaded from Internet on May 1, 2018.

K. Tarbell et al., "Applying Machine Learning to the Sorting of Recyclable Containers," University of Illinois at Urbana-Champaign, Urbana, Illinois, 7 pages, downloaded from Internet on May 1, 2018.

The United States Patent and Trademark Office, Non-Final Office Action, U.S. Appl. No. 15/213,129, filed Oct. 6, 2017.

International Searching Authority, International Search Report and the Written Opinion, International Application No. PCT/US2018/029640, Jul. 23, 2018; 23 pages.

European Patent Office; Extended Search Report for application 16825313.6; Jan. 28, 2019; 12 pages.

India Patent Office; Office Action issued for India Application Serial No. 201817002365; Mar. 12, 2020; 6 pages.

International Searching Authority, International Search Report and the Written Opinion, International Application No. PCT/US2019/022995, Jun. 5, 2019; 10 pages.

The United States Patent and Trademark Office, Non-Final Office Action, U.S. Appl. No. 16/375,675, filed Jun. 28, 2019.

The United States Patent and Trademark Office, Final Office Action, U.S. Appl. No. 16/375,675, filed Jan. 17, 2020.

Chinese Patent Office; Office Action issued for Chinese Application No. 201980043725.X on Apr. 28, 2022; 21 pages; Beijing, CN.

Zhou et al., "SSA-CNN: Semantic Self-Attention CNN for Pedestrian Detection," ArXiv: 1902.09080v3, Jun. 6, 2019, pp. 4321-4330.

Zhang et al., "Designing and verifying a disassembly line approach to cope with the upsurge of end-of-life vehicles in China," Elsevier, Waste Management (2018), vol. 76, Jun. 2018, pp. 697-707. Retrieved on Jul. 10, 2022 from <https://isiarticles.com/budles/Article/pre/pdf/98926.pdf>.

Japan Patent Office; Office Action issued Jan. 10, 2023 for Serial No. 2021-509947; 9 pages (with translation).

International Searching Authority, International Search Report and The Written Opinion of the International Searching Authority, International Application No. PCT/US2022/035011, Oct. 27, 2022.

Rozenstein, O. et al., "Development of a new approach based on midwave infrared spectroscopy for post-consumer black plastic waste sorting in the recycling industry," Waste Management 68 (2017); pp. 38-44, Jul. 2017.

United States International Searching Authority; International Search Report & Written Opinion for PCT/US2022/020657; Jun. 16, 2022; 10 pages.

United States International Searching Authority; International Search Report & Written Opinion for PCT/US2022/016869; Jun. 29, 2022; 11 pages.

United States International Searching Authority; International Search Report & Written Opinion for PCT/US2022/060626; May 2, 2023; 12 pages.

United States International Searching Authority; International Search Report & Written Opinion for PCT/US2022/051681; Mar. 20, 2023; 6 pages.

United States International Searching Authority; International Search Report & Written Opinion for PCT/US2022/039622; Oct. 28, 2022; 12 pages.

United States International Searching Authority; International Search Report & Written Opinion for PCT/US2022/035013; Sep. 23, 2022; 7 pages.

Mach Vision New High Technology Equipment—Machinex, Jun. 8, 2021, downloaded from https://www.machinexrecycling.com/news/mach-vision-new-high-technology-equipment/, 1 page.

BHS and NRT Introduce Max-AITM; Bulk Handling Systems (BHS); Apr. 18, 2017; downloaded from https://max-ai.com/autonomous-qc/ on Apr. 18, 2024.

Gao et al., "Applying Improved Optical Recognition with Machine Learning on Sorting Cu Impurities in Steel Scrap," Journal of Sustainable Metallurgy, vol. 6, pp. 785-795, Dec. 7, 2020.

United States International Searching Authority; International Search Report & Written Opinion for PCT/US2022/030943; Sep. 28, 2022; 10 pages; Alexandria, VA.

The United States Patent and Trademark Office, Non-Final Office Action, U.S. Appl. No. 16/358,374, filed Jun. 28, 2019.

The United States Patent and Trademark Office, Non-Final Office Action, U.S. Appl. No. 16/358,374, filed Dec. 12, 2019.

The United States Patent and Trademark Office, Non-Final Office Action, U.S. Appl. No. 15/963,755, filed Apr. 5, 2019.

The United States Patent and Trademark Office, Non-Final Office Action, U.S. Appl. No. 15/963,755, filed Sep. 13, 2019.

The United States Patent and Trademark Office, Non-Final Office Action, U.S. Appl. No. 15/963,755, filed May 11, 2020.

The United States Patent and Trademark Office, Non-Final Office Action, U.S. Appl. No. 17/491,415, filed Nov. 15, 2021.

The United States Patent and Trademark Office, Non-Final Office Action, U.S. Appl. No. 17/673,694, filed Jan. 25, 2024.

The United States Patent and Trademark Office, Non-Final Office Action, U.S. Appl. No. 17/696,831, filed Mar. 29, 2024.

The United States Patent and Trademark Office, Non-Final Office Action, U.S. Appl. No. 17/495,291, filed Oct. 27, 2023.

The United States Patent and Trademark Office, Non-Final Office Action, U.S. Appl. No. 17/972,507, filed Jun. 20, 2024.

United States International Searching Authority; International Search Report & Written Opinion for PCT/US2024/017756; Jun. 17, 2024; 12 pages.

United States International Searching Authority; International Search Report & Written Opinion for PCT/US2024/017762; Jun. 17, 2024; 15 pages.

Elmahi, E.M., "Studies of Some Alloys Using X-Ray Fluorescence," Thesis; University of Khartoum, Jan. 1997, 58 pages.

(56) References Cited

OTHER PUBLICATIONS

Data Sheet for Aluminum 319.0-F, Sand Cast; available from MatWeb, www.matweb.com; downloaded from internet on Sep. 29, 2022; 2 pages.
Data Sheet for Aluminum 356.0-F, Sand Cast; available from MatWeb, www.matweb.com; downloaded from internet on Sep. 29, 2022; 1 page.

* cited by examiner

SORTING OF ALUMINUM ALLOYS

This application claims priority to U.S. Provisional Patent Application Ser. No. 63/487,583, which is hereby incorporated by reference herein. This application is a continuation-in-part application of U.S. patent application Ser. No. 17/495,291 (issued as U.S. Pat. No. 11,975,365), which is a continuation-in-part application of U.S. patent application Ser. No. 17/491,415 (issued as U.S. Pat. No. 11,278,937), which is a continuation-in-part application of U.S. patent application Ser. No. 17/380,928, which is a continuation-in-part application of U.S. patent application Ser. No. 17/227,245 (issued as U.S. Pat. No. 11,964,304), which is a continuation-in-part application of U.S. patent application Ser. No. 16/939,011 (issued as U.S. Pat. No. 11,471,916), which is a continuation application of U.S. patent application Ser. No. 16/375,675 (issued as U.S. Pat. No. 10,722,922), which is a continuation-in-part application of U.S. patent application Ser. No. 15/963,755 (issued as U.S. Pat. No. 10,710,119), which is a continuation-in-part application of U.S. patent application Ser. No. 15/213,129 (issued as U.S. Pat. No. 10,207,296), which claims priority to U.S. Provisional Patent Application Ser. No. 62/193,332, all of which are hereby incorporated by reference herein. U.S. patent application Ser. No. 17/491,415 (issued as U.S. Pat. No. 11,278,937) is a continuation-in-part application of U.S. patent application Ser. No. 16/852,514 (issued as U.S. Pat. No. 11,260,426), which is a divisional application of U.S. patent application Ser. No. 16/358,374 (issued as U.S. Pat. No. 10,625,304), which is a continuation-in-part application of U.S. patent application Ser. No. 15/963,755 (issued as U.S. Pat. No. 10,710,119), which claims priority to U.S. Provisional Patent Application Ser. No. 62/490,219, all of which are hereby incorporated by reference herein.

GOVERNMENT LICENSE RIGHTS

This disclosure was made with U.S. government support under Grant No. DE-AR0000422 awarded by the U.S. Department of Energy. The U.S. government may have certain rights in this disclosure.

TECHNOLOGY FIELD

The present disclosure relates in general to the classification and sorting of a mixture of materials, and in particular, to the classification and sorting of aluminum alloys from a mixture of Zorba materials.

BACKGROUND INFORMATION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Recycling has benefits for communities and for the environment, since it reduces the amount of waste sent to landfills and incinerators, conserves natural resources, increases economic security by tapping a domestic source of materials, prevents pollution by reducing the need to collect new raw materials, and saves energy.

The recycling of aluminum (Al) scrap is a very attractive proposition in that up to 95% of the energy costs associated with manufacturing can be saved when compared with the laborious extraction of the more costly primary aluminum. Primary, or virgin, aluminum is defined as aluminum originating from aluminum-enriched ore, such as bauxite. At the same time, the demand for aluminum is steadily increasing in markets, such as car manufacturing, because of its light-weight properties. As a result, there are certain economies available to the aluminum industry by developing a well-planned yet simple recycling plan or system. The use of recycled material would be a less expensive metal resource than a primary source of aluminum. As the amount of aluminum sold to the automotive industry (and other industries) increases, it will become increasingly necessary to use recycled aluminum to supplement the availability of primary aluminum.

Correspondingly, it is particularly desirable to efficiently separate aluminum scrap metals into alloy families, since mixed aluminum scrap of the same alloy family is worth much more than that of indiscriminately mixed alloys. For example, in the blending methods used to recycle aluminum, any quantity of scrap composed of similar, or the same, alloys and of consistent quality, has more value than scrap composed of mixed aluminum alloys. Within such aluminum alloys, aluminum will always be the bulk of the material. However, constituents such as copper, magnesium, silicon, iron, chromium, zinc, manganese, and other alloy elements provide a range of properties to alloyed aluminum and a means to distinguish one aluminum alloy from the other.

The Aluminum Association is the authority that defines the allowable limits for aluminum alloy chemical composition. The data for the aluminum wrought alloy chemical compositions is published by the Aluminum Association in "International Alloy Designations and Chemical Composition Limits for Wrought Aluminum and Wrought Aluminum Alloys," which was updated in January 2015, and which is incorporated by reference herein. In general, according to the Aluminum Association, the 1xxx series of wrought aluminum alloys is composed essentially of pure aluminum with a minimum 99% aluminum content by weight; the 2xxx series is wrought aluminum principally alloyed with copper (Cu); the 3xxx series is wrought aluminum principally alloyed with manganese (Mn); the 4xxx series is wrought aluminum alloyed with silicon (Si); the 5xxx series is wrought aluminum primarily alloyed with magnesium (Mg); the 6xxx series is wrought aluminum principally alloyed with magnesium and silicon; the 7xxx series is wrought aluminum primarily alloyed with zinc (Zn); and the 8xxx series is a miscellaneous category.

The Aluminum Association also has a similar document for cast aluminum alloy designations. The 1xx series of cast aluminum alloys is composed essentially of pure aluminum with a minimum 99% aluminum content by weight; the 2xx series is cast aluminum principally alloyed with copper; the 3xx series is cast aluminum principally alloyed with silicon plus copper and/or magnesium; the 4xx series is cast aluminum principally alloyed with silicon; the 5xx series is cast aluminum principally alloyed with magnesium; the 6xx series is an unused series; the 7xx series is cast aluminum principally alloyed with zinc; the 8xx series is cast aluminum principally alloyed with tin; and the 9xx series is cast aluminum alloyed with other elements. Examples of cast alloys utilized for automotive parts include 38x (e.g., 380, 383, 384, 356, 360, and 319).

In general, wrought aluminum alloys have a higher magnesium concentration than cast aluminum alloys, and cast aluminum alloys have a higher silicon concentration than wrought aluminum alloys.

Furthermore, the presence of commingled pieces of different alloys in a body of scrap limits the ability of the scrap to be usefully recycled, unless the different alloys (or, at least, alloys belonging to different compositional families such as those designated by the Aluminum Association) can be separated prior to re-melting. This is because, when commingled scrap of a plurality of different alloy compositions or composition families is re-melted, the resultant molten mixture contains proportions of the principal alloy and elements (or the different compositions) that are too high to satisfy the compositional limitations required in any particular commercial alloy.

The automotive industry is an important sector for the U.S. economy in terms of revenue generation and employment. Over the last five decades, the Detroit automotive industry suffered many setbacks due to low-cost imports. The recent emergence of fuel-efficient light weight and electric vehicles offers an opportunity for Detroit to regain global leadership in automotive manufacturing, particularly in light of massive investments by Ford and General Motors to capture significant market share. One consequence is that the materials used to manufacture automobiles are changing from heavy steel to light-weight aluminum for auto bodies and battery trays, and copper for electric motors. For example, a Tesla Model 3 electric vehicle (EV) contains approximately 660 lbs. of aluminum as compared to approximately 250 lbs. in an average internal combustion engine ("ICE") car. There is now a consensus that by the year 2025, there will be a shortage of 2 billion lbs. of aluminum to manufacture electrical vehicles. Currently, Russia and China are two of the largest suppliers of primary aluminum in the world. A similar situation exists for the need for copper for the electric motors, so much so that the copper prices have significantly increased. Hence, there is a need to develop domestic, reliable, and sustainable supply chains for these important materials.

Zorba is mixed non-ferrous scrap typically containing 90-95% metallic content, and is a byproduct of current steel manufacturing operations. Currently, there are approximately 300 automotive shredders in U.S. that shred 12-15 million end-of-life ("EOL") automobiles annually, in addition to white goods (e.g., washers, dryers, refrigerators, and other appliances) and construction scrap (e.g., aluminum siding, window, and door frames). The shredders are typically operated continuously to produce steel (ferrous) scrap (e.g., to then produce steel rebars for use in construction of buildings, bridges, and factories). After shredding, the steel scrap is removed by huge electromagnets and sent to steel mills. A byproduct of the shredders is the left-over mixed non-ferrous scrap containing everything except magnetic steel. The next step has traditionally involved the use of eddy current sorters to separate low value non-metallics (typically half the weight of the car which is sent to landfills) and recover the mixed metallic scrap (i.e., Zorba). However, such eddy current sorters are inefficient and very expensive to operate. As a result, vast amounts of Zorba remain unsorted. Currently, over 10 billion lbs. of Zorba are produced in the U.S. each year, and more than 40% of it is shipped overseas to be hand sorted.

Moreover, as evidenced by the production and sale of the Ford F-150 pickup having a considerable increase in its body and frame parts composed of aluminum instead of steel, it is additionally desirable to recycle sheet metal scrap (e.g., wrought aluminum of certain alloy compositions), including that generated in the manufacture of automotive components from sheet aluminum (often referred to in the industry as "Clip"). Recycling of the scrap involves re-melting the scrap to provide a body of molten metal that can be cast and/or rolled into useful aluminum parts for further production of such vehicles. However, automotive manufacturing scrap (and metal scrap from other sources such as airplanes and commercial and household appliances) often includes a mixture of scrap pieces of wrought and cast pieces and/or two or more aluminum alloys differing substantially from each other in composition. Thus, those skilled in the aluminum alloy art will appreciate the difficulties of separating aluminum alloys, especially alloys that have been worked, such as cast, forged, extruded, rolled, and generally wrought alloys, into a reusable or recyclable worked product.

Currently, the only existing technology which separates cast from wrought in a cost-effective fashion is an x-ray transmission ("XRT") technology. Because cast is heavier than wrought due to the higher silicon concentration, the cast alloys are denser than the wrought alloys. The x-ray transmission technology is able to measure the heavier density cast aluminum alloys and then sort the cast from the wrought alloys. However, this method is not perfect. For example, cast alloys 319 and 380/383 have a relatively high zinc concentration (e.g., ~3%), giving these cast alloys their higher respective density. Cast alloy 360 however, has a lower relative zinc concentration (e.g., ~0.5%), and therefore lower density. The lower density of cast alloy 360 causes the x-ray transmission method to classify this alloy as a wrought alloy and not a cast alloy. Therefore, the x-ray transmission technology does not classify all of the cast alloys correctly due to the large variance in their respective densities. Thus, such cast alloys end up being sorted along with the wrought aluminum alloys, which will result in too much relative silicon in the melted mixture.

DETAILED DESCRIPTION

Figure 1:
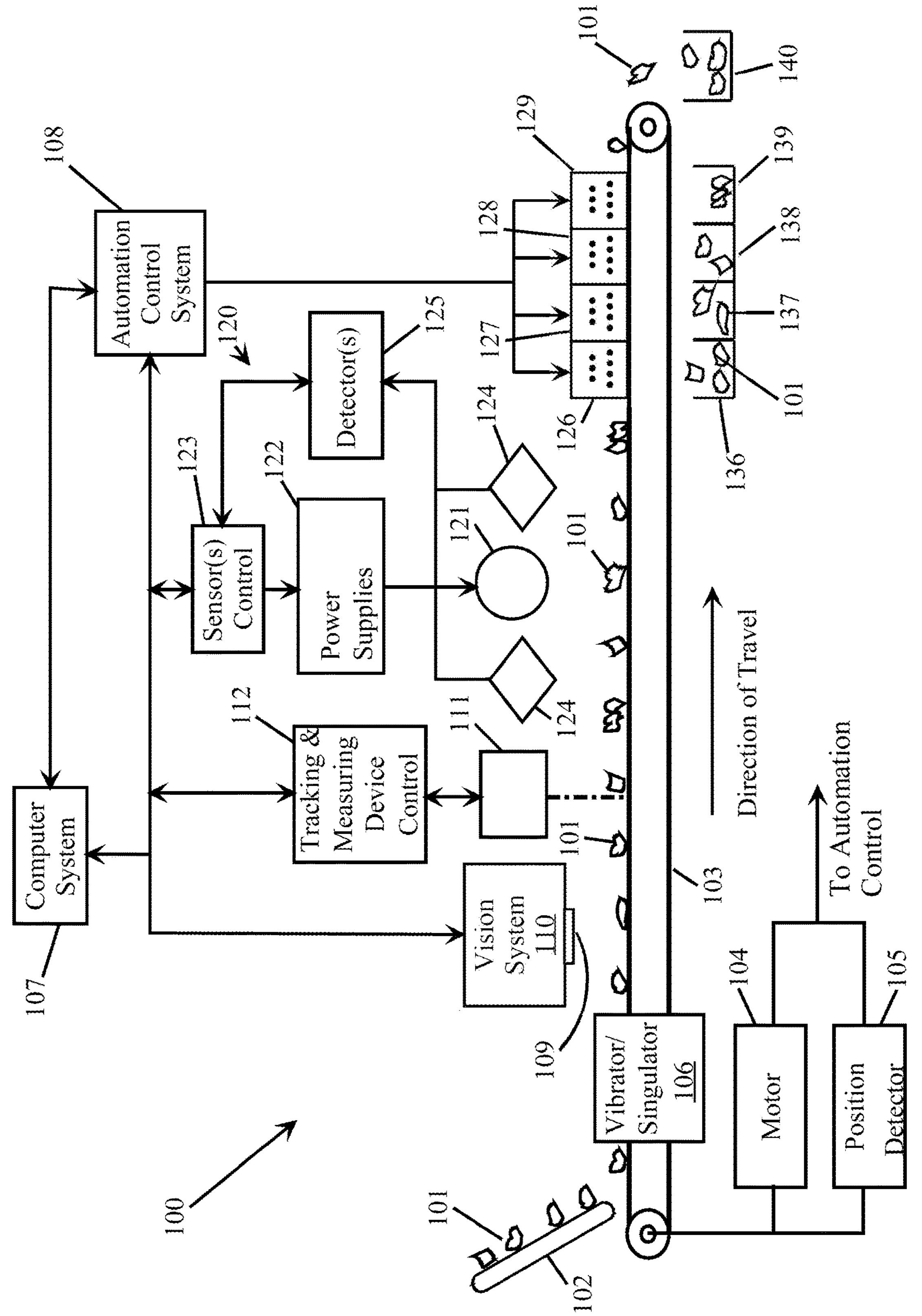
FIG. 1 illustrates a schematic of a material handling system configured in accordance with various embodiments of the present disclosure.

Various detailed embodiments of the present disclosure are disclosed herein. However, it is to be understood that the disclosed embodiments are merely exemplary of the disclosure, which may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to employ various embodiments of the present disclosure.

There is a desire to recover high-value materials from Zorba with high robustness, throughput, efficiency, accuracy, and precision. As will be further described herein, after removal of low value steel with magnetic separators, various higher value non-ferrous materials (e.g., aluminum, copper, brass, zinc, stainless steel, PCBs, lead, etc.) are sorted in accordance with various embodiments of the present disclosure to generate high purity "specification feedstocks" that can be used for manufacturing products.

Sorting/recovery of various high-value materials from Zorba is more complex; and requires both spectroscopic and vision (implementing an AI system) based sensors. Embodiments of the present disclosure accomplish such tasks by essentially measuring the chemical composition of each type of material found in the Zorba. The signals from a vision system and a sensor system (e.g., a spectroscopic system, such as XRF, LIBS, etc.) are combined for each distinct material to create a "fingerprint" that represents the image and composition data within the material, which is then utilized to sort between the various materials within the Zorba.

As used herein, "materials" may include any item or object, including but not limited to, metals (ferrous and/or nonferrous), metal alloys (including, but not limited to, aluminum alloys), heavies, Zorba, Zebra, Twitch, pieces of metal embedded in another different material, plastics/polymers (including, but not limited to, any of the plastics/polymers disclosed herein, known in the industry, or newly created in the future), rubber, foam, printed circuit boards ("PCBs"), glass (including, but not limited to, borosilicate or soda lime glass, and various colored glass), ceramics, paper, cardboard, Teflon, PE, bundled wires, insulation covered wires, rare earth elements, leaves, wood, plants, parts of plants, textiles, bio-waste, packaging, electronic waste, batteries and accumulators, scrap from end-of-life ("EOL") products (e.g., vehicles, aircraft, and/or appliances), mining, construction, and demolition waste, crop wastes, forest residues, purpose-grown grasses, woody energy crops, microalgae, food waste, hazardous chemical and biomedical wastes, construction debris, farm wastes, biogenic items, non-biogenic items, objects with a specific carbon content, any other objects that may be found within municipal solid waste, and any other objects, items, or materials disclosed herein, including further types or classes of any of the foregoing that can be distinguished from each other, including but not limited to, by one or more sensor systems, including but not limited to, any of the sensor technologies disclosed herein.

In a more general sense, a "material" may include any item or object composed of a chemical element, a compound or mixture of chemical elements, or a compound or mixture of a compound or mixture of chemical elements, wherein the complexity of a compound or mixture may range from being simple to complex (all of which may also be referred to herein as a material having a specific "chemical composition" (also referred to herein as a specific "material composition")). "Chemical element" means a chemical element of the periodic table of chemical elements, including chemical elements that may be discovered after the filing date of this application. Within this disclosure, the terms "scrap," "scrap pieces," "materials," "material pieces," and "material scrap pieces" may be used interchangeably. As used herein, a material piece or scrap piece referred to as having a metal alloy composition is a metal alloy having a specific chemical composition that distinguishes it from other metal alloys. As used herein, a "contaminant" is any material, or a component of a material piece, that is to be excluded from a group of sorted materials.

As used herein, the term "predetermined" refers to something that has been established or decided in advance, such as by a user of embodiments of the present disclosure.

As used herein, the term "chemical signature" refers to a unique pattern (e.g., fingerprint spectrum), as would be produced by one or more analytical instruments, indicating the presence of one or more specific elements or molecules (including polymers) in a sample. The elements or molecules may be organic and/or inorganic. Such analytical instruments include any of the sensor systems disclosed herein, and also disclosed in U.S. published patent application no. 2022/0161298, which is hereby incorporated by reference herein. In accordance with embodiments of the present disclosure, one or more such sensor systems may be configured to produce a chemical signature of a material piece.

As defined within the Guidelines for Nonferrous Scrap promulgated by the Institute Of Scrap Recycling Industries, Inc. ("ISRI"), the term "Zorba" is the collective term for shredded nonferrous metals, including, but not limited to, those originating from EOL products (e.g., vehicles, aircraft, appliances) or waste electronic and electrical equipment ("WEEE"). ISRI has established the specifications for Zorba; in Zorba, each scrap piece may be made up of a combination of the nonferrous metals: aluminum, copper, lead, magnesium, stainless steel, nickel, tin, and zinc, in elemental or alloyed (solid) form. Furthermore, the term "Twitch" shall mean fragmented aluminum scrap. Twitch has been traditionally produced by media separation technology, such as a float process, whereby the aluminum scrap floats to the top because heavier metal scrap pieces sink (for example, in some processes, sand may be mixed in to change the density of the water in which the scrap is immersed). The term "Zebra" shall mean the high-density nonferrous metals typically produced by such processes.

As well known in the industry, a "polymer" is a substance or material composed of very large molecules, or macromolecules, composed of many repeating subunits. A polymer may be a natural polymer found in nature or a synthetic polymer. "Multilayer polymer films" are composed of two or more different compositions and may possess a thickness of up to about $7.5\text{-}8\times10^{-4}$ m. The layers are at least partially contiguous and preferably, but optionally, coextensive. As used herein, the terms "plastic," "plastic piece," and "piece of plastic material" (all of which may be used interchangeably) refer to any object that includes or is composed of a polymer composition of one or more polymers and/or multilayer polymer films.

As used herein, a "fraction" refers to any specified combination of organic and/or inorganic elements or molecules, polymer types, plastic types, polymer compositions, chemical signatures of plastics, physical characteristics of the plastic piece (e.g., color, transparency, strength, melting point, density, shape, size, manufacturing type, uniformity, reaction to stimuli, etc.), etc., including any and all of the various classifications and types of plastics disclosed herein. Non-limiting examples of fractions are one or more different types of plastic pieces that contain: LDPE plus a relatively high percentage of aluminum; LDPE and PP plus a relatively low percentage of iron; PP plus zinc; combinations of PE, PET, and HDPE; any type of red-colored LDPE plastic pieces; any combination of plastic pieces excluding PVC; black-colored plastic pieces; combinations of #3-#7 type plastics that contain a specified combination of organic and inorganic molecules; combinations of one or more different types of multi-layer polymer films; combinations of specified plastics that do not contain a specified contaminant or additive; any types of plastics with a melting point greater than a specified threshold; any thermoset plastic of a plurality of specified types; specified plastics that do not contain chlorine; combinations of plastics having similar densities; combinations of plastics having similar polarities; plastic bottles without attached caps or vice versa.

As used herein, the term "image data" refers to a packet of digital data pertaining to a captured visual image of an individual material piece.

As used herein, the term "sort," and any derivatives thereof, refers to the physical separation of certain material pieces (e.g., specifically classified material pieces) from other material pieces.

As used herein, the terms "identify" and "classify," the terms "identification" and "classification," and any derivatives of the foregoing, may be utilized interchangeably. As used herein, to "classify" a material piece is to assign or determine (i.e., identify) a type or class of materials to which the material piece belongs. For example, in accordance with certain embodiments of the present disclosure, a vision system (as further described herein) and/or sensor system (as further described herein) may be configured to capture (collect) and analyze any type of information for classifying materials and distinguishing such classified materials from other materials, which classifications can be utilized within a material handling system to selectively sort material pieces as a function of a set of one or more physical and/or chemical characteristics (e.g., which may be user-defined), including but not limited to, color, texture, hue, shape, brightness, weight, density, chemical composition, size, uniformity, manufacturing type, chemical signature, predetermined fraction, radioactive signature, transmissivity to light, sound, or other signals, and reaction to stimuli such as various fields, including emitted and/or reflected electromagnetic radiation ("EM") of the material pieces.

The types or classes (i.e., classifications) of material pieces may be user-definable (e.g., predetermined) and not limited to any known classification(s) of materials. The granularity of the types or classes may range from very coarse to very fine. For example, the types or classes may include plastics, ceramics, glasses, metals, foam, wood, and other materials, where the granularity of such types or classes is relatively coarse; different metals and metal alloys such as, for example, zinc, copper, brass, lead, chrome plate, nickel plate, stainless steel, and aluminum, where the granularity of such types or classes is finer; or between specific types of aluminum alloys, where the granularity of such types or classes is relatively fine. Thus, the types or classes may be configured to distinguish between materials of significantly different chemical compositions such as, for example, plastics and metal alloys, or to distinguish between materials of almost identical chemical compositions such as, for example, different types of aluminum alloys. It should be appreciated that the methods and systems discussed herein may be applied to accurately identify/classify material pieces for which the chemical composition is completely unknown before being classified.

As used herein, "manufacturing type" refers to the type of manufacturing process by which the material piece was manufactured, such as a metal part having been formed by a wrought process, having been cast (including, but not limited to, expendable mold casting, permanent mold casting, and powder metallurgy), having been extruded, having been forged, a material removal process, etc.

As referred to herein, a "conveyor system" may be any known piece of mechanical handling equipment that moves materials from one location to another, including, but not limited to, an aero-mechanical conveyor, automotive conveyor, conveyor belt, belt-driven live roller conveyor, bucket conveyor, chain conveyor, chain-driven live roller conveyor, drag conveyor, dust-proof conveyor, electric track vehicle system, flexible conveyor, gravity conveyor, gravity skatewheel conveyor, lineshaft roller conveyor, motorized-drive roller conveyor, overhead I-beam conveyor, overland conveyor, pharmaceutical conveyor, plastic belt conveyor, pneumatic conveyor, screw or auger conveyor, spiral conveyor, tubular gallery conveyor, vertical conveyor, vibrating conveyor, wire mesh conveyor, and conveying material pieces within a fluid past a vision system and/or a sensor system (including, but not limited to, very small particles suspended in the fluid).

The systems and methods described herein according to certain embodiments of the present disclosure receive a heterogeneous mixture of a plurality of material pieces (e.g., EOL scrap, Zorba, Heavies, Zebra, and/or Twitch), wherein at least one material piece within this heterogeneous mixture includes a chemical composition different from one or more other material pieces and/or at least one material piece within this heterogeneous mixture is physically distinguishable from other material pieces, and/or at least one material piece within this heterogeneous mixture is of a class or type of material different from the other material pieces within the mixture, and the systems and methods are configured to identify/classify/distinguish/sort this one material piece into a group separate from such other material pieces. Embodiments of the present disclosure may be utilized to sort any types or classes of materials as defined herein. By way of contrast, a homogeneous set or group of materials all fall within the same identifiable class or type of material.

Certain embodiments of the present disclosure will be described herein as classifying and sorting material pieces into such separate groups or collections by sorting out the material pieces (e.g., physically depositing (e.g., ejecting or diverting) the material pieces into separate receptacles or bins, or onto another conveyor system), as a function of user-defined or predetermined groupings or collections (e.g., material piece classifications). As an example, within certain embodiments of the present disclosure, material pieces are sorted into separate receptacles in order to separate material pieces composed of a particular material composition, or compositions, from other material pieces composed of a different material composition.

It should be noted that the materials to be sorted may have irregular sizes and shapes. For example, such material (e.g., Zorba, Zebra, and/or Twitch) may have been previously run through some sort of shredding mechanism that chops up the materials into such irregularly shaped and sized pieces (producing scrap pieces), which may then be fed or diverted onto a conveyor system.

Certain embodiments of the present disclosure may be configured to sort aluminum alloy material pieces into separate receptacles so that substantially all of the aluminum alloy material pieces having a material composition falling within one of the aluminum alloy series published by the Aluminum Association are sorted into a single receptacle (for example, a receptacle may correspond to one or more particular aluminum alloy series (e.g., 1xxx, 2xxx, 3xxx, 4xxx, 5xxx, 6xxx, 7xxx, 8xxx, 1xx, 2xx, 3xx, 4xx, 5xx, 6xx, 7xx, 8xx, 9xx)). Furthermore, as will be described herein, certain embodiments of the present disclosure may be configured to sort metal alloys into separate receptacles as a function of a classification of their metal alloy composition even if such metal alloy compositions fall within the same alloy series (e.g., as defined by the Aluminum Association). As a result, the material handling system configured in accordance with certain embodiments of the present disclosure can classify and sort aluminum alloy material pieces having compositions that would all classify them into a single aluminum alloy series (e.g., the 3xx series or the 5xx series) into separate receptacles as a function of their aluminum alloy composition. For example, certain embodiments of the present disclosure can classify and sort into separate receptacles aluminum alloy material pieces classified as cast aluminum alloy 360 separate from aluminum alloy material pieces classified as cast aluminum alloy 380 (or other similar cast aluminum alloys, such as 383).

FIG. 1 illustrates a non-limiting example of a material handling system 100 configured in accordance with various embodiments of the present disclosure. A conveyor system 103 may be implemented to convey individual material pieces 101 through the material handling system 100 so that each of the individual material pieces 101 can be tracked, classified, distinguished, and/or sorted into predetermined desired groups (e.g., material classifications). Such a conveyor system 103 may be implemented with one or more conveyor belts on which the material pieces 101 travel, typically at a predetermined constant speed. However, certain embodiments of the present disclosure may be implemented with other types of conveyor systems, including a system in which the material pieces free fall past one or more of the various components of the material handling system 100 (or any other type of vertical sorter), or any of the other conveyor systems disclosed herein. Hereinafter, wherein applicable, the conveyor system 103 may also be referred to as the conveyor belt 103. In one or more embodiments, some or all of the acts or functions of conveying, capturing, stimulating, detecting, classifying, distinguishing, and sorting may be performed automatically, i.e., without human intervention. For example, in the material handling system 100, one or more cameras, one or more vision systems, one or more sensor systems, one or more sources of stimuli, one or more emissions detectors, one or more classification modules, a sorting apparatus, one or more sorting devices, and/or other system components may be configured to perform these and other operations automatically.

Furthermore, though the simplified illustration in FIG. 1 depicts a single stream of material pieces 101 on a conveyor belt 103, embodiments of the present disclosure may be implemented in which a plurality of such streams of material pieces are passing by the various components of the material handling system 100 in parallel with each other. In accordance with certain embodiments of the present disclosure, some sort of suitable feeder mechanism (e.g., another conveyor system, bowl feeder, or hopper 102) may be utilized to feed the material pieces 101 onto the conveyor system 103, whereby the conveyor system 103 conveys the material pieces 101 past various components within the material handling system 100. In accordance with certain embodiments of the present disclosure, a tumbler and/or a vibrator may be utilized to separate the individual material pieces from a collection (e.g., a physical pile) of material pieces. In accordance with certain embodiments of the present disclosure, the material pieces may be positioned into one or more singulated (i.e., single file) streams, which may be performed by an active or passive singulator 106. An example of a passive singulator is further described in U.S. Pat. No. 10,207,296.

As such, certain embodiments of the present disclosure are capable of simultaneously tracking, classifying, distinguishing, and/or sorting such travelling streams of material pieces. Alternatively, the conveyor system (e.g., the conveyor belt 103) may simply convey a collection of material pieces, which have been deposited onto the conveyor belt 103, in a random manner. As such, in accordance with certain embodiments of the present disclosure, singulation of the material pieces 101 is not required to track, classify, distinguish, and/or sort the material pieces.

Within certain embodiments of the present disclosure, the conveyor system 103 is operated to travel at a predetermined speed by a conveyor system motor 104. This predetermined speed may be programmable and/or adjustable by the operator in any well-known manner. Within certain embodiments of the present disclosure, control of the conveyor system motor 104 and/or the position detector 105 may be performed by an automation control system 108. Such an automation control system 108 may be operated under the control of a computer system 107, and/or the functions for performing the automation control may be implemented in software within the computer system 107. If the conveyor system 103 is a conveyor belt, then it may be a conventional endless belt conveyor employing a conventional drive motor 104 suitable to move the conveyor belt 103 at the predetermined speeds.

A position detector 105 (e.g., a conventional encoder) may be operatively coupled to the conveyor belt 103 and the automation control system 108 to provide information corresponding to the movement (e.g., speed) of the conveyor belt 103. Thus, as will be further described herein, through the utilization of the controls to the conveyor belt drive motor 104 and/or the automation control system 108 (and alternatively including the position detector 105), as each of the material pieces 101 travelling on the conveyor belt 103 are identified, they can be tracked by location and time (relative to the various components of the material handling system 100) so that the various components of the material handling system 100 can be activated/deactivated as each material piece 101 passes within their vicinity. As a result, the automation control system 108 is able to track the location of each of the material pieces 101 while they travel along the conveyor belt 103.

The vision system 110 may be configured to perform certain types of identification (e.g., classification) of all or a portion of the material pieces 101 (also referred to herein as a "vision check"), as will be further described herein. For example, such a vision system 110 may be utilized to capture or acquire information about each of the material pieces 101. For example, the vision system 110 may be configured (e.g., with an artificial intelligence ("AI") system as further described herein) to capture or collect any type of information from the material pieces that can be utilized within the material handling system 100 to classify the material pieces 101 as a function of a set of one or more characteristics (e.g., physical and/or chemical and/or radioactive, etc.) as described herein. In accordance with certain embodiments of the present disclosure, the vision system 110 may be configured to capture visual images of each of the material pieces 101 (including one-dimensional, two-dimensional, three-dimensional, or holographic imaging), for example, by using an optical sensor as utilized in typical digital cameras and video equipment. Such visual images captured by the optical sensor are then stored in a memory device as image data (e.g., formatted as image data packets). In accordance with certain embodiments of the present disclosure, such image data may represent images captured within optical wavelengths of light (i.e., the wavelengths of light that are observable by the typical human eye). However, alternative embodiments of the present disclosure may utilize vision systems that are configured to capture an image of a material made up of wavelengths of light outside of the visual wavelengths of the human eye.

In accordance with alternative embodiments of the present disclosure the vision system 110 may also be utilized as a means to track each of the material pieces 101 as they travel on the conveyor system 103, which may utilize one or more still or live action cameras 109 to note the position (i.e., location and timing) of each of the material pieces 101 on the moving conveyor system 103.

In accordance with alternative embodiments of the present disclosure, the vision system 110 may implement a machine vision system for analyzing and/or determining the shapes, or relative shapes, of each of the material pieces 101, such as might be implemented within Lab VIEW.

In accordance with certain embodiments of the present disclosure, the material handling system 100 may be implemented with one or more sensor systems 120, which may be utilized solely or in combination with the vision system 110 to classify/identify/distinguish the material pieces 101 (for example, as described with respect to FIGS. 7A-7C and FIGS. 12A-12B). A sensor system 120 may be configured with any type of sensor technology, including sensors utilizing irradiated or reflected electromagnetic radiation (e.g., utilizing infrared ("IR"), Fourier Transform IR ("FTIR"), Forward-looking Infrared ("FLIR"), Very Near Infrared ("VNIR"), Near Infrared ("NIR"), Short Wavelength Infrared ("SWIR"), Long Wavelength Infrared ("LWIR"), Medium Wavelength Infrared ("MWIR" or "MIR"), Ultraviolet ("UV"), X-Ray Transmission ("XRT") Spectroscopy, X-Ray Fluorescence ("XRF") Spectroscopy, Laser Induced Breakdown Spectroscopy ("LIBS"), Laser Spark Spectroscopy ("LSS"), Laser-Induced Optical Emission Spectroscopy ("LIOES"), Raman Spectroscopy, Coherent Anti-stokes Raman Spectroscopy, Gamma-ray Spectroscopy, Hyperspectral Spectroscopy (e.g., any range beyond visible wavelengths), Acoustic Spectroscopy, NMR Spectroscopy, Microwave Spectroscopy, Terahertz Spectroscopy, Differential Scanning calorimetry ("DSC"), Thermogravimetric analysis ("TGA"), Optical and scanning electron microscopy ("SEM"), and Chromatography (e.g., LC-PDA, LC-MS, LC-LS, GC-MS, GC-FID, HS-GC), including one-dimensional, two-dimensional, or three-dimensional imaging with any of the foregoing), or by any other type of sensor technology, including but not limited to, chemical or radioactive, all of which are to be distinguished herein from the implementation of a vision system that analyzes visual images utilizing an AI technology (e.g., an AI model). Implementation of an exemplary XRF spectroscopy system (e.g., for use as a sensor system 120 herein) is further described in U.S. Pat. No. 10,207,296. XRF can also be used within alternative embodiments of the present disclosure to identify inorganic materials within a plastic piece (e.g., for inclusion within a chemical signature).

As used herein, the terms "sensor system" and "sensor technology" refer to the implementation of any of the sensor systems disclosed herein for classifying/identifying/distinguishing (also referred to herein as a "sensor system classification") material pieces as distinguished from the use of a vision system utilizing an AI technology for classifying/identifying/distinguishing material pieces.

The following sensor systems may also be used within certain embodiments of the present disclosure for determining the chemical signatures of plastic pieces and/or classifying plastic pieces for sorting. The previously disclosed various forms of infrared spectroscopy (e.g., IR, FTIR, FLIR, VNIR, NIR, SWIR, LWIR, MWIR, and/or MIR) may be utilized to obtain a chemical signature specific of each plastic piece that provides information about the base polymer of any plastic material, as well as other components present in the material (mineral fillers, copolymers, polymer blends, etc.). DSC is a thermal analysis technique that obtains the thermal transitions produced during the heating of the analyzed material specific for each material. TGA is another thermal analysis technique resulting in quantitative information about the composition of a plastic material regarding polymer percentages, other organic components, mineral fillers, carbon black, etc. Capillary and rotational rheometry can determine the rheological properties of polymeric materials by measuring their creep and deformation resistance. Optical microscopy and SEM can provide information about the structure of the materials analyzed regarding the number and thickness of layers in multilayer materials (e.g., multilayer polymer films), dispersion size of pigment or filler particles in the polymeric matrix, coating defects, interphase morphology between components, etc. Chromatography can quantify minor components of plastic materials, such as UV stabilizers, antioxidants, plasticizers, anti-slip agents, etc., as well as residual monomers, residual solvents from inks or adhesives, degradation substances, etc.

Though FIG. 1 is illustrated as including one or more sensor systems 120, implementation of such sensor system(s) is optional within certain embodiments of the present disclosure. Within certain embodiments of the present disclosure, a combination of one or more vision systems and one or more sensor systems may be used to classify the material pieces 101. Within certain embodiments of the present disclosure, any combination of one or more of the different sensor technologies disclosed herein may be used to classify the material pieces 101 without utilization of a vision system 110.

In accordance with certain embodiments of the present disclosure, one or more vision systems and/or one or more sensor systems may be configured to identify which of the material pieces 101 contain a contaminant (e.g., steel or iron pieces containing copper; plastic pieces containing a specific contaminant, additive, or undesirable physical feature (e.g., an attached container cap formed of a different type of plastic than the container)), and send a signal to separate (sort out) such material pieces (e.g., from those not containing the contaminant). In such a configuration, the identified material pieces 101 may be diverted/ejected (sorted out) utilizing one of the mechanisms as described hereinafter for physically sorting material pieces into individual receptacles.

Within certain embodiments of the present disclosure, the material piece tracking device 111 (or a commercially available profilometer) and accompanying control system 112 may be utilized and configured to measure the sizes and/or shapes of each of the material pieces 101 as they pass within proximity of the material piece tracking device 111, along with the position (i.e., location and timing) of each of the material pieces 101 on the moving conveyor system 103. An exemplary operation of such a material piece tracking device 111 and control system 112 is further described in U.S. Pat. No. 10,207,296. Exemplary operations of a profilometer and similar devices are described in U.S. patent application Ser. No. 18/491,692, which is hereby incorporated by reference herein.

Alternatively, as disclosed herein, the vision system 110 may be utilized to track the position (i.e., location and timing) of each of the material pieces 101 as they are transported by the conveyor system 103. As such, certain embodiments of the present disclosure may be implemented without a material piece tracking device (e.g., the material piece tracking device 111) to track the material pieces.

Within certain embodiments of the present disclosure that implement one or more sensor systems 120, the sensor system(s) 120 may be configured to identify the chemical composition, relative chemical compositions (including, but not limited to, measuring the amounts of specific elements within a material piece), and/or manufacturing types of each of the material pieces 101 as they pass within proximity of the sensor system(s) 120. The sensor system(s) 120 may include an energy emitting source 121, which may be powered by a power supply 122, for example, in order to stimulate a response from each of the material pieces 101. Within certain embodiments of the present disclosure, as each material piece 101 passes within proximity to the emitting source 121, the sensor system 120 may emit an appropriate sensing signal towards the material piece 101. One or more detectors 124 may be positioned and configured to sense/detect one or more characteristics from the material piece 101 in a form appropriate for the type of utilized sensor technology. The one or more detectors 124 and the associated detector electronics 125 capture these received sensed characteristics to perform signal processing thereon and produce digitized information representing the sensed characteristics (e.g., spectroscopy data, such as XRF spectrum data), which is then analyzed to classify each of the material pieces 101.

It should be noted that though FIG. 1 is illustrated with a combination of a vision system 110 and one or more sensor systems 120, embodiments of the present disclosure may be implemented with any combination of sensor systems utilizing any of the sensor technologies disclosed herein, or any other sensor technologies currently available or developed in the future.

Within certain embodiments of the present disclosure, a material piece tracking device 111 and accompanying control system 112 may be utilized and configured to determine the sizes and/or shapes of each of the material pieces 101 as they pass within proximity of the material piece tracking device 111, along with the position (i.e., location and timing) of each of the material pieces 101 on the moving conveyor system 103. An exemplary operation of such a material piece tracking device 111 and control system 112 is further described in U.S. Pat. No. 10,207,296.

In accordance with certain embodiments of the present disclosure, the material tracking device 111 may be implemented before (e.g., upstream on the conveyor system) the vision system 110 and/or the sensor system 120 so that when a material piece 101 is detected by the material tracking system 111, it triggers the material handling system 100 for when the vision system 110 and/or the sensor system 120 are to capture characteristics of the material piece. Furthermore, the order in which the vision system(s) 110 and the sensor system(s) 120 are implemented within the material handling system 100 can be interchanged.

Classification of material pieces, which may be performed within the computer system 107, may then be utilized by the automation control system 108 to activate one of the N (N>1) sorting devices 126 . . . 129 of a sorting apparatus for sorting (e.g., diverting/ejecting) the material pieces 101 (e.g., into one or more N (N>1) sorting receptacles 136 . . . 139, or onto one or more other conveyor belts) according to the determined classifications. Four sorting devices 126 . . . 129 and four sorting receptacles 136 . . . 139 associated with the sorting devices are illustrated in FIG. 1 as merely a non-limiting example.

The sorting apparatus may include any well-known mechanisms for redirecting selected material pieces 101 towards a desired location, including, but not limited to, diverting the material pieces 101 from the conveyor belt system into the plurality of sorting receptacles. For example, a sorting device may utilize air jets, with each of the air jets assigned to one or more of the classifications. When one or more of the air jets (e.g., 127) receives a signal from the automation control system 108, the air jet(s) emits a stream of air that causes a material piece 101 to be diverted/ejected from the conveyor system 103 into a sorting receptacle (e.g., 137) (or onto another conveyor system) corresponding to that air jet.

Although the example illustrated in FIG. 1 uses air jets to divert/eject material pieces, other mechanisms may be used to divert/eject the material pieces, such as robotically removing the material pieces from the conveyor belt, pushing the material pieces from the conveyor belt (e.g., with paint brush type plungers), causing an opening (e.g., a trap door) in the conveyor system 103 from which a material piece may drop, or using air jets to separate the material pieces into separate receptacles as they are thrown from/fall from the edge of the conveyor belt. A pusher device, as that term is used herein, may refer to any form of device that may be activated to dynamically displace an object on or from a conveyor system/device, employing pneumatic, mechanical, or other means to do so, such as any appropriate type of mechanical pushing mechanism (e.g., an ACME screw drive), pneumatic pushing mechanism, or air jet pushing mechanism.

In addition to the N sorting receptacles 136 . . . 139 into which material pieces 101 are diverted/ejected, the material handling system 100 may also include a receptacle 140 that receives material pieces 101 not diverted/ejected from the conveyor system 103 into any of the aforementioned N sorting receptacles 136 . . . 139. For example, a material piece 101 may not be diverted/ejected from the conveyor system 103 into one of the N sorting receptacles 136 . . . 139 when the classification of the material piece 101 is not determined (or simply because the sorting devices failed to adequately divert/eject a piece). Thus, the receptacle 140 may serve as a default receptacle into which unclassified or unsorted material pieces are dumped. Alternatively, the receptacle 140 may be used to receive one or more classifications of material pieces that have deliberately not been assigned to any of the N sorting receptacles 136 . . . 139. These such material pieces may then be further sorted in accordance with other characteristics and/or by another material handling system.

Depending upon the variety of classifications of material pieces desired, multiple classifications may be mapped to a single sorting device and/or associated sorting receptacle. In other words, there need not be a one-to-one correlation between classifications and sorting devices and/or receptacles. For example, it may be desired by the user to sort certain classifications of materials into the same sorting receptacle. To accomplish this sort, when a material piece 101 is classified as falling into a predetermined grouping of classifications, the same sorting device may be activated to sort these into the same sorting receptacle (or onto another conveyor belt). Such combination sorting may be applied to produce any desired combination of sorted material pieces. The mapping of classifications may be programmed by the user (e.g., using any of the sorting algorithms as described herein operated by the computer system 107) to produce such desired combinations. Additionally, the classifications of material pieces are user-definable, and not limited to any particular known classifications of material pieces.

The systems and methods described herein may be applied to classify and/or sort individual material pieces having any of a variety of sizes. Even though the systems and methods described herein are described primarily in relation to sorting individual material pieces of a singulated stream one at a time, the systems and methods described herein are not limited thereto. Such systems and methods may be used to stimulate and/or detect emissions from a plurality of materials concurrently. For example, as opposed to a singulated stream of materials being conveyed along one or more conveyor belts in series, multiple singulated streams may be conveyed in parallel. Each stream may be on a same belt or on different belts arranged in parallel. Further, pieces may be randomly distributed on (e.g., across and along) one or more conveyor belts. Accordingly, the systems and methods described herein may be used to stimulate, and/or detect emissions from, a plurality of these material pieces at the same time. In other words, a plurality of material pieces may be treated as a single piece as opposed to each material piece being considered individually. Accordingly, the plurality of material pieces may be classified and sorted (e.g., diverted/ejected from the conveyor system) together.

The conveyor system 103 may include a recycle loop (not shown) so that unclassified material pieces are rerouted through the material handling system 100 for rescanning and resorting into a category. Moreover, because the material handling system 100 is able to specifically track each material piece 101 as it travels on the conveyor system 103, some sort of sorting device (e.g., the sorting device 129) may be implemented to direct/eject a material piece 101 that the material handling system 100 has failed to classify after a predetermined number of cycles through the material handling system 100 (or the material piece 101 is collected in receptacle 140).

With material handling systems 100 implementing an XRF system for a sensor system 120, signals representing the detected/captured XRF spectrum may be converted into a discrete energy histogram such as on a per-channel (i.e., element) basis, as further described herein, which may be utilized for determining the amounts of specific elements within a material piece. Such a conversion process may be implemented within the control system 123 or the computer system 107. Within certain embodiments of the present disclosure, such a control system 123 or computer system 107 may include a commercially available spectrum acquisition module, such as the commercially available Amptech MCA 5000 acquisition card and software programmed to operate the card. Such a spectrum acquisition module, or other software implemented within the material handling system 100, may be configured to implement a plurality of channels for dispersing x-rays into a discrete energy spectrum (i.e., histogram) with such a plurality of energy levels, whereby each energy level corresponds to an element that the material handling system 100 has been configured to detect. The material handling system 100 may be configured so that there are sufficient channels corresponding to certain elements within the chemical periodic table that are important for distinguishing between different materials. The energy counts for each energy level may be stored in a separate collection storage register. The computer system 107 then reads each collection register to determine the number of counts for each energy level during the collection interval, and build the energy histogram. As will be described in more detail herein, a sorting algorithm (e.g., a PCA algorithm) configured in accordance with certain embodiments of the present disclosure may then utilize this collected histogram of energy levels to classify at least certain ones of the material pieces 101 (and/or assist the vision system 110 in classifying the material pieces 101).

As previously noted, certain embodiments of the present disclosure may implement one or more vision systems (e.g., vision system 110) configured (e.g., in combination with an AI system) to classify and/or distinguish material pieces. Such an AI system may implement any well-known AI system (e.g., Artificial Narrow Intelligence ("ANI"), Artificial General Intelligence ("AGI"), Artificial Super Intelligence ("ASI")), a machine learning system including one that implements a neural network (e.g., artificial neural network, deep neural network, convolutional neural network, recurrent neural network, autoencoders, reinforcement learning, etc.), a machine learning system implementing supervised learning, unsupervised learning, semi-supervised learning, reinforcement learning, self-learning, feature learning, sparse dictionary learning, anomaly detection, robot learning, association rule learning, fuzzy logic, deep learning algorithms, deep structured learning hierarchical learning algorithms, decision tree learning (e.g., classification and regression tree ("CART"), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), and/or deep machine learning algorithms, such as those described in and publicly available at the deeplearning.net website (including all software, publications, and hyperlinks to available software referenced within this website), which is hereby incorporated by reference herein. Non-limiting examples of publicly available machine learning software and libraries that could be utilized within embodiments of the present disclosure include Python, OpenCV, Inception, Theano, Torch, PyTorch, Pylearn2, Numpy, Blocks, TensorFlow, MXNet, Caffe, Lasagne, Keras, Qt, Ubuntu, NVIDIA drivers, Pandas, Matplotlib, github, Chainer, Matlab Deep Learning, CNTK, MatConvNet (a MATLAB toolbox implementing convolutional neural networks for computer vision applications), DeepLearnToolbox (a Matlab toolbox for Deep Learning (from Rasmus Berg Palm)), BigDL, Cuda-Convnet (a fast C++/CUDA implementation of convolutional (or more generally, feed-forward) neural networks), Deep Belief Networks, RNNLM, RNNLIB-RNNLIB, matrbm, deeplearning4j, Eblearn.Ish, deepmat, MShadow, Matplotlib, SciPy, CXXNET, Nengo-Nengo, Eblearn, cudamat, Gnumpy, 3-way factored RBM and mcRBM, mPOT (Python code using CUDAMat and Gnumpy to train models of natural images), ConvNet, Elektronn, OpenNN, NeuralDesigner, Theano Generalized Hebbian Learning, Apache Singa, Lightnet, and SimpleDNN.

In accordance with certain embodiments of the present disclosure, certain types of machine learning may be performed in stages. For example, training occurs (which may be performed offline in that a material handling system 100 (or similar apparatus) is not being utilized to perform actual classifying/sorting of material pieces). For example, a material handling system 100 (or similar apparatus) may be utilized to train the machine learning system in that control samples (e.g., homogenous sets) of material pieces (i.e., having the same types or classes of materials, or falling within the same predetermined fraction) are passed through the material handling system 100 (e.g., by a conveyor system 103); and all such material pieces may not be sorted, but may be collected in a common receptacle (e.g., receptacle 140). Alternatively, the training may be performed at another location remote from the material handling system 100, including using some other mechanism for collecting sensed information (characteristics) of control sets of material pieces. During this training stage, algorithms within the machine learning system extract features from the captured information (e.g., using image processing techniques well known in the art). Non-limiting examples of training algorithms include, but are not limited to, linear regression, gradient descent, feed forward, polynomial regression, learning curves, regularized learning models, and logistic regression. It is during this training stage that the algorithms within the machine learning system learn the relationships between materials and their features/characteristics (e.g., as captured by the vision system and/or sensor system(s)), creating a knowledge base for later classification of a heterogeneous mixture of material pieces received by the material handling system 100, which may then be sorted by desired classifications. Such a knowledge base may include one or more libraries, wherein each library includes parameters (e.g., neural network parameters) for utilization by the machine learning system in classifying material pieces. For example, one particular library may include parameters configured by the training stage to recognize and classify a specific type or class of material, or one or more materials that fall with a predetermined fraction. In accordance with certain embodiments of the present disclosure, such libraries may be inputted into the machine learning system, and then the user of the material handling system 100 may be able to adjust certain ones of the parameters in order to adjust an operation of the material handling system 100 (for example, adjusting the threshold effectiveness of how well the machine learning system recognizes (identifies, classifies) a particular material piece from a heterogeneous mixture of materials).

Additionally, the inclusion of certain chemical elements in material pieces results in identifiable physical features (e.g., visually discernible characteristics) in materials. As a result, when a plurality of material pieces containing such a particular chemical composition are passed through the aforementioned training stage, the machine learning system can learn how to distinguish such material pieces from others. Consequently, a machine learning system (or any AI system) configured in accordance with certain embodiments of the present disclosure may be configured to sort between material pieces as a function of their respective material/chemical compositions. It can be readily appreciated that embodiments of the present disclosure may be configured to utilize image data (e.g., visual images) of a material piece as a proxy for representations of one or more various physical and/or chemical attributes of the material piece (e.g., ductility, malleability, brittleness, hardness, luster, tensile strength, reactionary with various materials, etc.).

For example, Twitch includes cast aluminum alloys and wrought aluminum alloys. These two alloys have the same color. The difference between these two alloys is their chemical composition. Cast aluminum alloys have larger concentrations of silicon as an alloying element, while wrought aluminum alloys do not have a large concentration of silicon as an alloying element, and thus command a price premium. An AI system implemented within a vision system (e.g., the vision system 110), may be configured to classify these pieces with over 95% accuracy at high speeds. The AI system is able to classify these materials accurately because the difference in the silicon content results in the alloys looking physically different from one another. The cast aluminum alloys, because of the higher silicon concentration, fracture after shredding and do not bend nor fold. The wrought aluminum alloys however, because they do not have a high silicon concentration, are far more malleable. The wrought aluminum alloys bend and fold during the shredding process, and therefore have visual features that resemble torn fabric. These visual features may be trained in the AI system and ultimately arise due to the chemical nature of the alloy.

During the training stage, a plurality of material pieces of one or more specific types, classifications, or fractions of material(s), which are the control samples, may be delivered past the vision system and/or one or more sensor systems(s) (e.g., by a conveyor system) so that the algorithms within the machine learning system detect, extract, and learn what features represent such a type or class of material. For example, each of the material pieces in the control sample may be first passed through such a training stage so that the algorithms within the machine learning system "learn" (are trained) how to detect, recognize, and classify such material pieces—in the case of training a vision system (e.g., the vision system 110), trained to visually discern (distinguish) between material pieces. This creates a library of parameters particular to such a homogenous class of material pieces. The same process can be performed with respect to images of any classification of material pieces creating a library of parameters particular to such classification of material pieces. For each type of material to be classified by the vision system, any number of exemplary material pieces of that classification of material may be passed by the vision system. Given captured sensed information as input data, the algorithms within the machine learning system may use N classifiers, each of which test for one of N different material types. Note that the machine learning system may be "taught" (trained) to detect any type, class, or fraction of material, including any of the types, classes, or fractions of materials disclosed herein.

After the algorithms have been established and the machine learning system has sufficiently learned (been trained) the differences (e.g., visually discernible differences) for the material classifications (e.g., within a user-defined level of statistical confidence), the libraries for the different material classifications are then implemented into a material classifying/sorting system (e.g., material handling system 100) to be used for identifying, distinguishing, and/or classifying material pieces from a heterogeneous mixture of material pieces, and then possibly sorting such classified material pieces if sorting is to be performed.

One point of mention here is that, in accordance with certain embodiments of the present disclosure, the detected/captured features/characteristics (e.g., visual images) of the material pieces may not be necessarily simply particularly identifiable or discernible physical characteristics; they can be abstract formulations that can only be expressed mathematically, or not mathematically at all; nevertheless, the AI system may be configured to parse the spectral data to look for patterns that allow the control samples to be classified during the training stage. Furthermore, the AI system may take subsections of captured information of a material piece and attempt to find correlations between the pre-defined classifications.

In accordance with certain embodiments of the present disclosure, instead of utilizing a training stage whereby control (homogenous) samples of material pieces are passed by the vision system, training of the AI system may be performed utilizing a labeling/annotation technique (or any other supervised learning technique) whereby as data/information of material pieces are captured by a vision system, a user inputs a label or annotation that identifies each material piece, which is then used to create the library for use by the AI system when classifying material pieces within a heterogenous mixture of material pieces. In other words, a previously generated knowledge base of characteristics captured from one or more samples of a class of materials may be accomplished by any of the techniques disclosed herein, whereby such a knowledge base is then utilized to automatically classify materials.

Therefore, as disclosed herein, certain embodiments of the present disclosure provide for the identification/classification of one or more different materials in order to determine which material pieces should be diverted from a conveyor system or device. In accordance with certain embodiments, machine learning techniques may be utilized to train (i.e., configure) a neural network to identify a variety of one or more different classes or types of materials. Images, or other types of sensed information, may be captured of materials (e.g., traveling on a conveyor system), and based on the identification/classification of such materials, the systems described herein can decide which material piece should be allowed to remain on the conveyor system, and which should be diverted/removed from the conveyor system (for example, either into a collection receptacle, or diverted onto another conveyor system).

Figure 2:
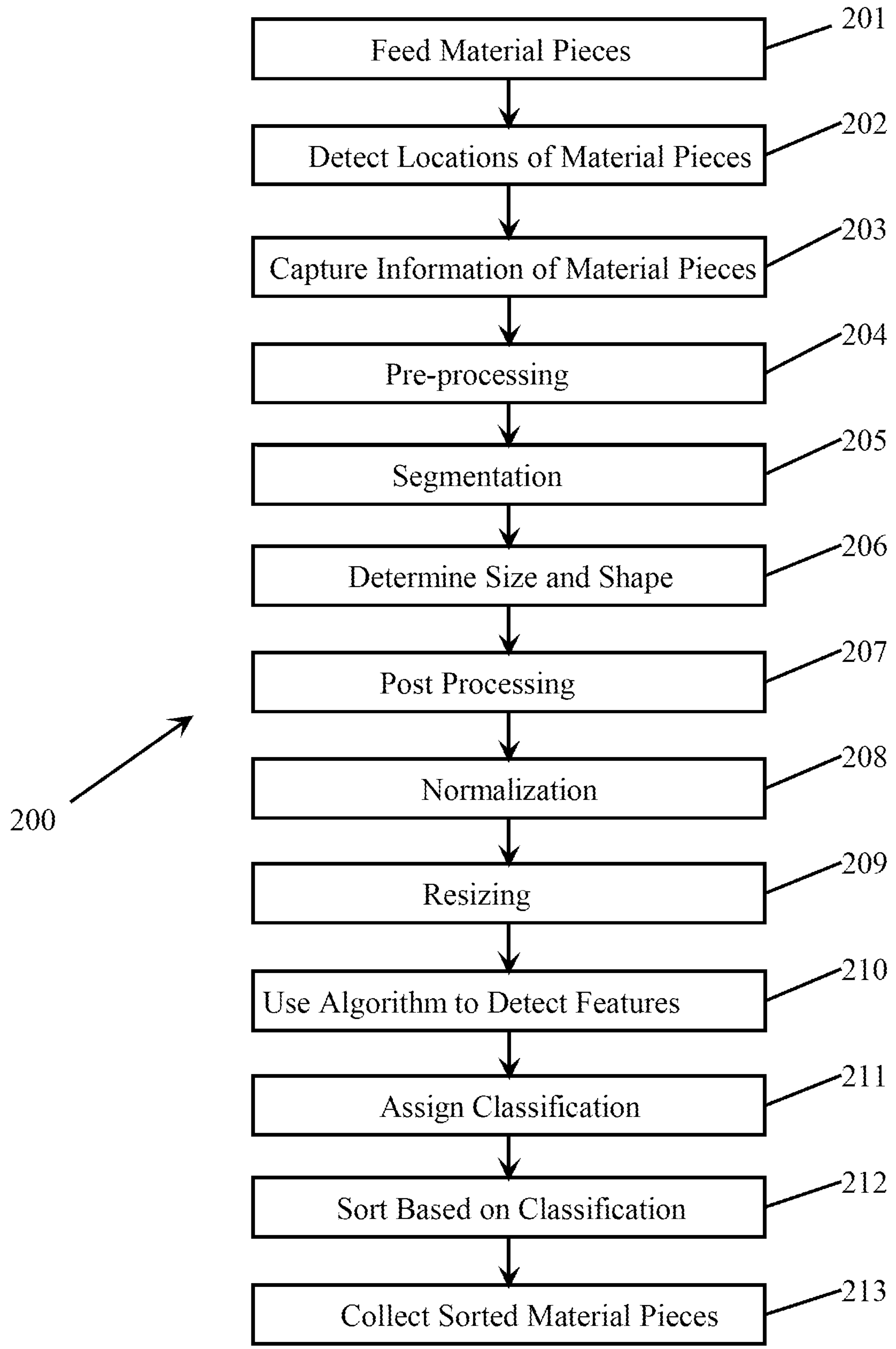
FIG. 2 illustrates a flowchart diagram configured in accordance with certain embodiments of the present disclosure.

FIG. 2 illustrates a flowchart diagram depicting exemplary embodiments of a process 200 of classifying/sorting material pieces utilizing a vision system in accordance with certain embodiments of the present disclosure. The process 200 may be performed to classify a heterogeneous mixture of material pieces into any combination of predetermined types, classes, and/or fractions. The process 200 may be configured to operate within any of the embodiments of the present disclosure described herein, including the material handling system 100 of FIG. 1 and with respect to the "vision checks" described with respect to FIGS. 7A-7C and FIGS. 12A-12B. Operation of the process 200 may be performed by hardware and/or software, including within a computer system (e.g., computer system 3400 of FIG. 11) controlling the system (e.g., the computer system 107 and/or the vision system 110). In the process block 201, the material pieces are fed past a vision system (e.g., on a conveyor system). In the process block 202, the location on the conveyor system of each material piece may be detected for tracking of each material piece as it travels through the material handling system 100. This may be performed by the vision system 110 (for example, by distinguishing a material piece from the underlying conveyor system material while in communication with a conveyor system position detector (e.g., the position detector 105)). Alternatively, a material piece tracking device 111 can be used to track the pieces. Or, any system that can create a light source (including, but not limited to, visual light, UV, and IR) and have a detector that can be used to locate the material pieces. In the process block 203, when a material piece has traveled in proximity to one or more of the vision systems, sensed information/characteristics of the material piece is captured/acquired. In the process block 204, the vision system may perform pre-processing of the captured information, which may be utilized to detect (extract) information of each of the material pieces (e.g., from the background (e.g., the conveyor belt); in other words, the pre-processing may be utilized to identify the difference between the material piece and the background). Well-known image processing techniques such as dilation, thresholding, and contouring may be utilized to identify the material piece as being distinct from the background. In the process block 205, segmentation may be performed. For example, the captured information may include information pertaining to one or more material pieces. Additionally, a particular material piece may be located on a seam of the conveyor belt when its image is captured. Therefore, it may be desired in such instances to isolate the image of an individual material piece from the background of the image. In an exemplary technique for the process block 205, a first step is to apply a high contrast of the image; in this fashion, background pixels are reduced to substantially all black pixels, and at least some of the pixels pertaining to the material piece are brightened to substantially all white pixels. The image pixels of the material piece that are white are then dilated to cover the entire size of the material piece. After this step, the location of the material piece is a high contrast image of all white pixels on a black background. Then, a contouring algorithm can be utilized to detect boundaries of the material piece. The boundary information is saved, and the boundary locations are then transferred to the original image. Segmentation is then performed on the original image on an area greater than the boundary that was earlier defined. In this fashion, the material piece is identified and separated from the background.

In the optional process block 206, the material pieces may be conveyed along the conveyor system within proximity of a material piece tracking device (or a profilometer) in order to determine a size and/or shape of the material pieces, which may be useful for assisting with classification of certain materials due to their shape or size, or if an XRF system or some other spectroscopy sensor is also implemented within the material handling system. In the process block 207, post processing may be performed. Post processing may involve resizing the captured information/data to prepare it for use in the neural networks. This may also include modifying certain properties (e.g., enhancing image contrast, changing the image background, or applying filters) in a manner that will yield an enhancement to the capability of the AI system to classify the material pieces. Subsequent to image post processing, normalization may be performed in the process block 208. In the process block 209, the data may be resized. Data resizing may be desired under certain circumstances to match the data input requirements for certain AI systems, such as neural networks. For example, neural networks may require much smaller image sizes (e.g., 225×255 pixels or 299×299 pixels) than the sizes of the images captured by typical digital cameras. Moreover, the smaller the input data size, the less processing time is needed to perform the classification. Thus, smaller data sizes can ultimately increase the throughput of the material handling system 100 and increase its value.

In the process blocks 210 and 211, an identification/classification is performed on each material piece based on the sensed/detected features. For example, the process block 210 may be configured with a neural network employing one or more algorithms that compare the extracted features with those stored in a previously generated knowledge base (e.g., generated during a training stage), and assigns the classification with the highest match to each of the material pieces based on such a comparison. The algorithms may process the captured information/data in a hierarchical manner by using automatically trained filters. The filter responses are then successfully combined in the next levels of the algorithms until a probability is obtained in the final step. In the process block 211, these probabilities may be used for each of the N classifications to decide in what manner the respective material pieces should be sorted. For example, each of the N classifications may be assigned to one sorting receptacle (or onto another specified conveyor belt), and the material piece under consideration is sorted into that receptacle (or another specified conveyor belt) that corresponds to the classification returning the highest probability larger than a predefined threshold. Within embodiments of the present disclosure, such predefined thresholds may be preset by the user. A particular material piece may be sorted into an outlier receptacle (or onto another specified conveyor belt) if none of the probabilities is larger than the predetermined threshold.

Next, in the process block 212, a sorting device corresponding to the classification, or classifications, of the material piece may be activated (e.g., instructions sent to the sorting device to sort out the material piece). As will be described with respect to various aspects of FIGS. 7A-7C and FIGS. 12A-12B, such sorting instructions may be based solely on the classification by a vision system (also referred to herein as a "vision check") or as a function of a combination of classifications from the vision system and a sensor system (also referred to herein as a "sensor system classification"). Between the time at which the image of the material piece was captured and the time at which the sorting device is activated, the material piece has moved from the proximity of the vision system to a location downstream on the conveyor system (e.g., at the rate of conveying of a conveyor system). In embodiments of the present disclosure, the activation of the sorting device is timed such that as the material piece passes the sorting device mapped to the classification of the material piece, the sorting device is activated, and the material piece is diverted/ejected (sorted out) from the conveyor system into its associated sorting receptacle (or onto another conveyor belt as the case may be). Within embodiments of the present disclosure, the activation of a sorting device may be timed by a respective position detector that detects when a material piece is passing before the sorting device and sends a signal to enable the activation of the sorting device. In the process block 213, the sorting receptacle (or other conveyor belt) corresponding to the sorting device that was activated receives the sorted-out material piece.

In accordance with alternative embodiments of the present disclosure, the AI system utilized to classify the material pieces may be periodically or even continually updated with newly acquired image data collected by the vision system as it classifies material pieces. In other words, as new image data is collected by the vision system, it is utilized to update one or more AI models within the AI system, such as if the classification accuracy increases.

Figure 3:
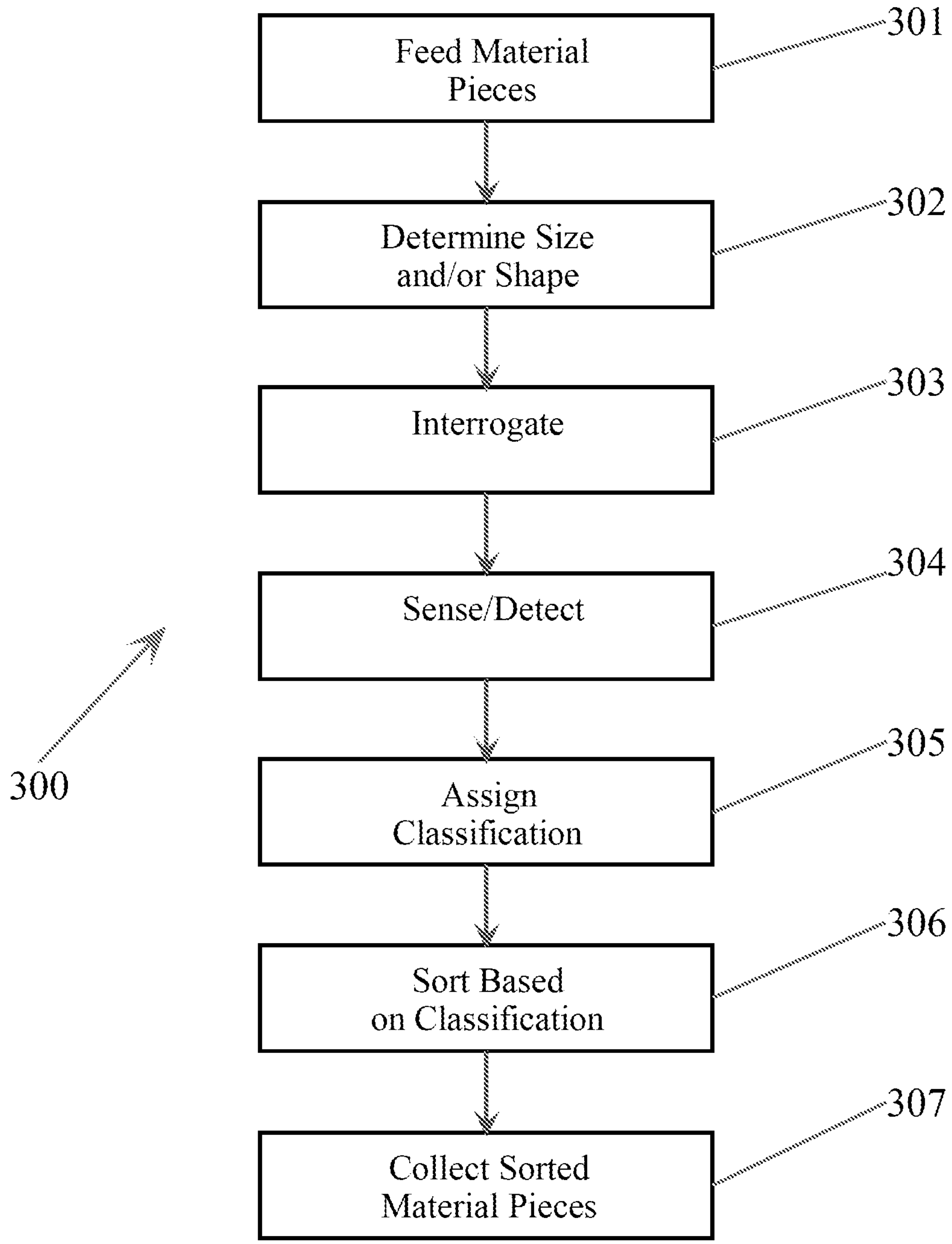
FIG. 3 illustrates a flowchart diagram configured in accordance with certain embodiments of the present disclosure.

FIG. 3 illustrates a flowchart diagram depicting exemplary embodiments of a process 300 for classifying and/or sorting material pieces utilizing a sensor system 120 in accordance with certain embodiments of the present disclosure. The process 300 may be configured to operate within any of the embodiments of the present disclosure described herein, including the material handling system 100 of FIG. 1 and aspects of the process 700 described with respect to FIGS. 7A-7C or aspects of the process 1200 described with respect to FIGS. 12A-12B. In accordance with certain embodiments of the present disclosure, the process 300 may be configured to operate in conjunction with the process 200. For example, the process blocks 303-305 may be incorporated in the process 200 (e.g., operating in series or in parallel with the process blocks 203-210) in order to combine the efforts of one or more vision systems (e.g., the vision system 110) with one or more sensor systems (e.g., the sensor system 120).

Operation of the process 300 may be performed by hardware and/or software, including within a computer system (e.g., computer system 3400 of FIG. 11) controlling the system (e.g., the sensor control 123 and/or the computer system 107 of FIG. 1). In the process block 301, the material pieces are fed along a conveyor system. Next, in the optional process block 302, the material pieces may be conveyed along the conveyor system within proximity of a material piece tracking device, profilometer, and/or an optical imaging system in order to track each material piece and/or determine a size and/or shape of the material pieces. In the process block 303, when a material piece has traveled in proximity of the sensor system, the material piece may be interrogated, or stimulated, with EM energy (waves) or some other type of stimulus appropriate for the particular type of sensor technology utilized by the sensor system. In the process block 304, physical characteristics (e.g., a captured XRF spectrum) of the material piece are sensed/detected and captured by the sensor system. In the process block 305, the type of material is identified/classified based on the captured characteristics, which may be combined with the classification by the AI system in conjunction with the vision system 110 (e.g., as described with respect to various aspects of FIGS. 7A-7C and FIGS. 12A-12B).

Next, if sorting of the material pieces is to be performed, in the process block 306, a sorting device corresponding to the classification of the material piece is activated. Between the time at which the material piece was sensed and the time at which the sorting device is activated, the material piece has moved from the proximity of the sensor system to a location downstream on the conveyor system, at the rate of conveying of the conveyor system. In certain embodiments of the present disclosure, the activation of the sorting device is timed such that as the material piece passes the sorting device mapped to the classification of the material piece, the sorting device is activated, and the material piece is diverted/ejected from the conveyor system into its associated sorting receptacle (or onto another conveyor belt). Within certain embodiments of the present disclosure, the activation of a sorting device may be timed by a respective position detector that detects when a material piece is passing before the sorting device and sends a signal to enable the activation of the sorting device. In the process block 307, the sorting receptacle (or another conveyor belt) corresponding to the sorting device that was activated receives the diverted/ejected material piece.

As can be readily appreciated, and as will be further disclosed with respect to FIGS. 7A-7C and FIGS. 12A-12B, the process blocks 203-211 may be performed in parallel with the process blocks 303-305 (and also the process block 302 if necessary) within a material handling system 100 to accomplish the various classifications/sorts described with respect to FIGS. 7A-7C and FIGS. 12A-12B.

Figure 4:
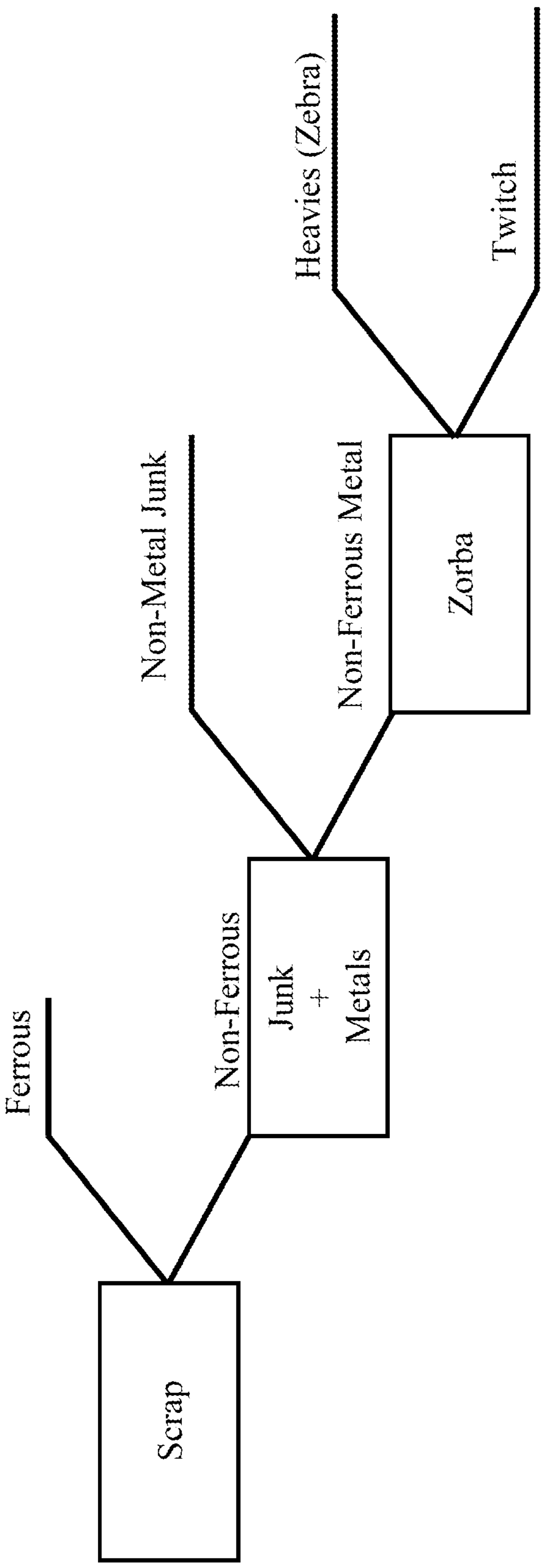
FIG. 4 schematically illustrates various sorts that can be performed on scrap.
Figure 5:
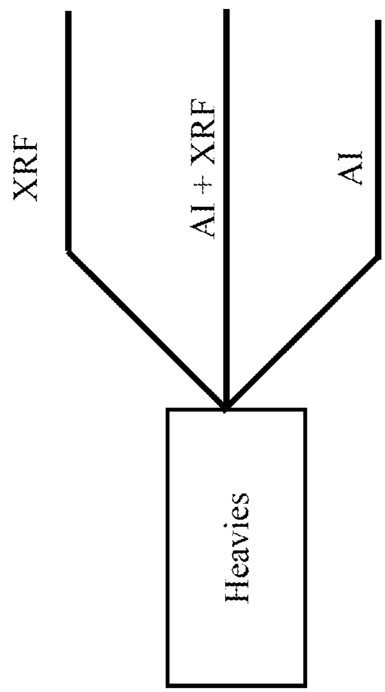
FIG. 5 schematically illustrates exemplary technologies that can be utilized for classifying and sorting of Zebra materials.
Figure 6:
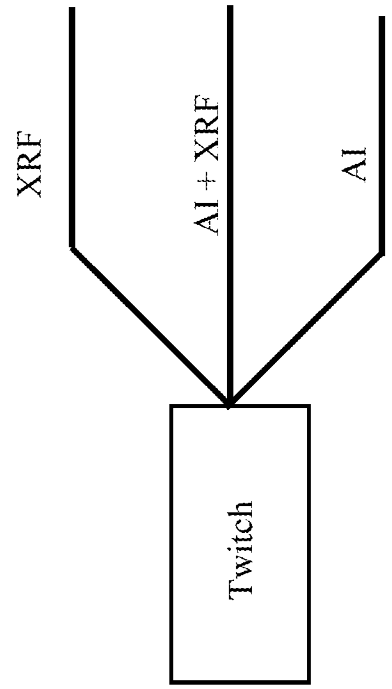
FIG. 6 schematically illustrates exemplary technologies that can be utilized for classifying and sorting of Twitch materials.

Referring to FIGS. 4-6, there are illustrated systems and processes configured in accordance with certain embodiments of the present disclosure in which materials (e.g., scrap pieces) may be sorted. Such materials may originate from shredded EOL products (e.g., vehicles, aircraft, and/or appliances). Referring to FIG. 4, materials, which may have been shredded into scrap, may be sorted between ferrous and non-ferrous materials. For example, a magnet may be utilized to remove the ferrous material pieces. The remaining non-ferrous materials may typically include non-ferrous metals (often referred to as Zorba) and other "junk" or "fluff" materials (e.g., cloth, leather, foam rubber, rubber, plastics, wood, PCBs, glass, coins, and any other non-metallic materials).

In accordance with certain embodiments of the present disclosure, such as disclosed with respect to FIGS. 7A-7C and FIGS. 12A-12B, the Zorba may then be separated (classified/sorted) from the junk materials (for example, see the process blocks 701-703). The Zorba may include one or more of various metals or metal alloys (e.g., copper, brass, zinc, stainless steel, lead, nickel alloys, gold or silver (e.g., located within PCBs), aluminum (cast, wrought, and/or extrusion alloys, including, but not limited to, high-Z (high zinc concentration) cast aluminum alloys (e.g., cast aluminum alloys 319 and 380/383) and/or low-Z (low zinc concentration) cast aluminum alloys (e.g., cast aluminum alloys 356 and 360).

Figure 7A:
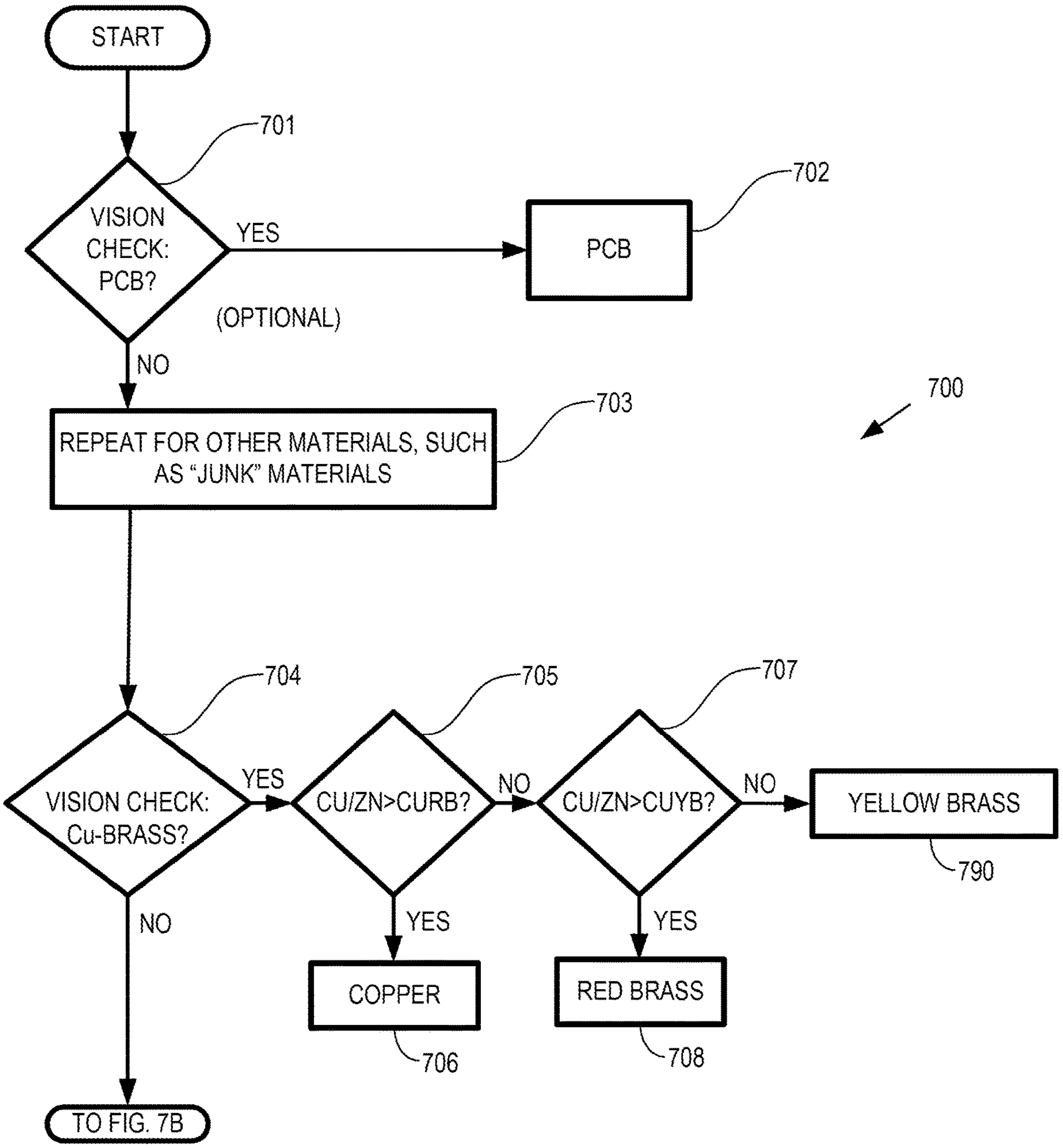
FIGS. 7A, 7B, and 7C illustrate a flowchart diagram configured in accordance with various embodiments of the present disclosure.
Figure 7B:
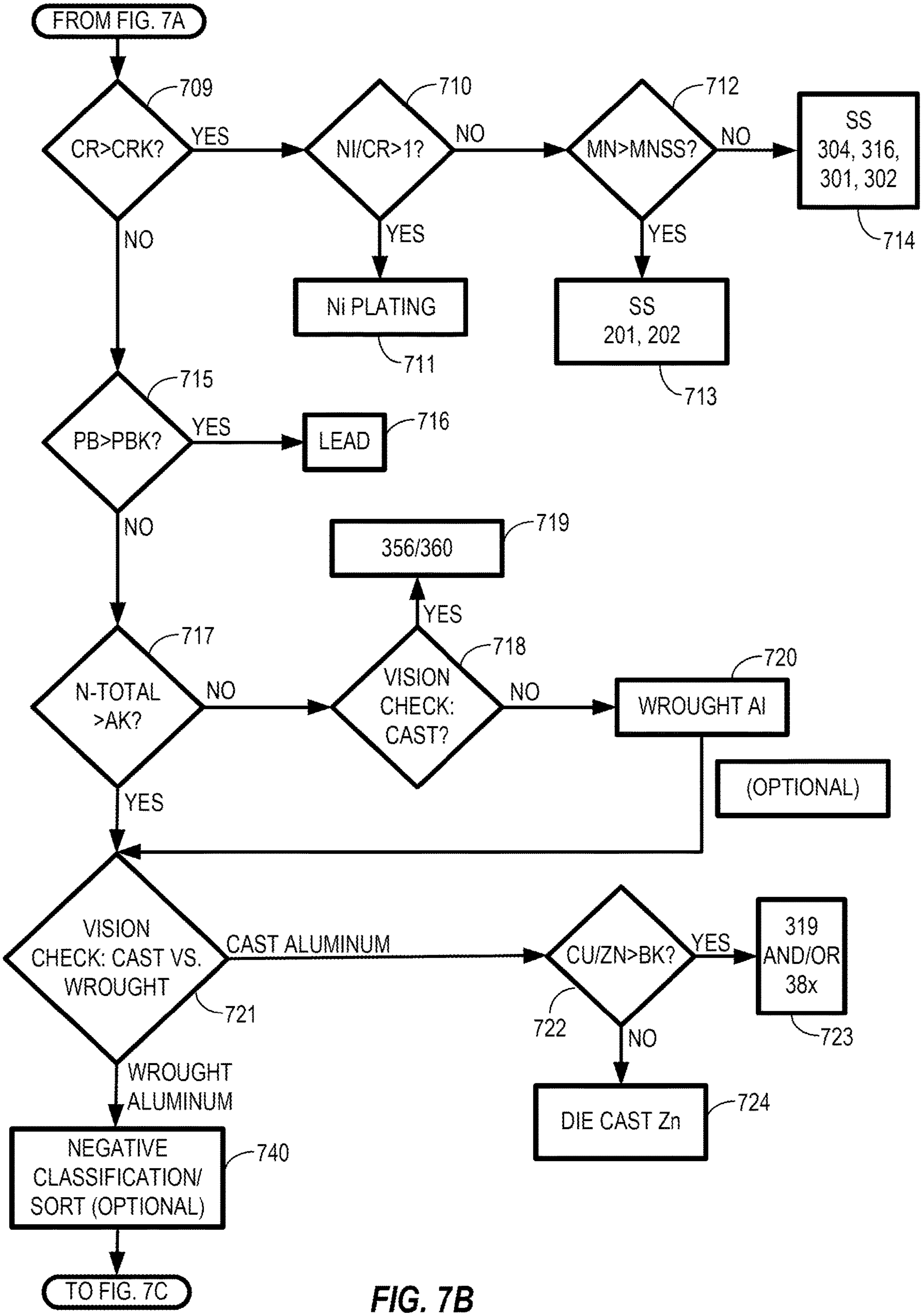

In accordance with certain embodiments of the present disclosure, the Zorba may be classified/sorted to separate the heavy metals (also referred to as Zebra or "Heavies") from the lighter metals (e.g., Twitch) (for example, see the process blocks 704-721 of FIGS. 7A-7B).

Certain alternative embodiments of the present disclosure may be configured to sort out "meatballs" and/or airbag canisters from the material stream. For example, see U.S. published patent application no. 2022/0371057, which is hereby incorporated by reference herein.

In accordance with certain embodiments of the present disclosure, FIG. 5 schematically depicts how one or more various combinations of one or more vision systems (e.g., implementing an AI system) and/or one or more sensor systems (e.g., an XRF system) may be utilized so that the Zebra may be classified/sorted to separately extract various metals (e.g., copper, zinc, brass, stainless steel, nickel plating, lead, etc.) from a conveyed stream of material pieces. Alternatively, any other of the disclosed sensor systems 120 (e.g., LIBS, XRT, etc.) may be utilized instead of an XRF system.

In accordance with certain embodiments of the present disclosure, FIG. 6 schematically depicts how one or more various combinations of one or more vision systems (e.g., implementing an AI system) and/or one or more sensor systems (e.g., an XRF system) may be utilized so that the Twitch can be separated into various desired classifications of cast, extrusion, and/or wrought aluminum alloys. Alternatively, any other of the disclosed sensor systems 120 (e.g., LIBS, XRT, etc.) may be utilized instead of an XRF system.

Figure 7C:
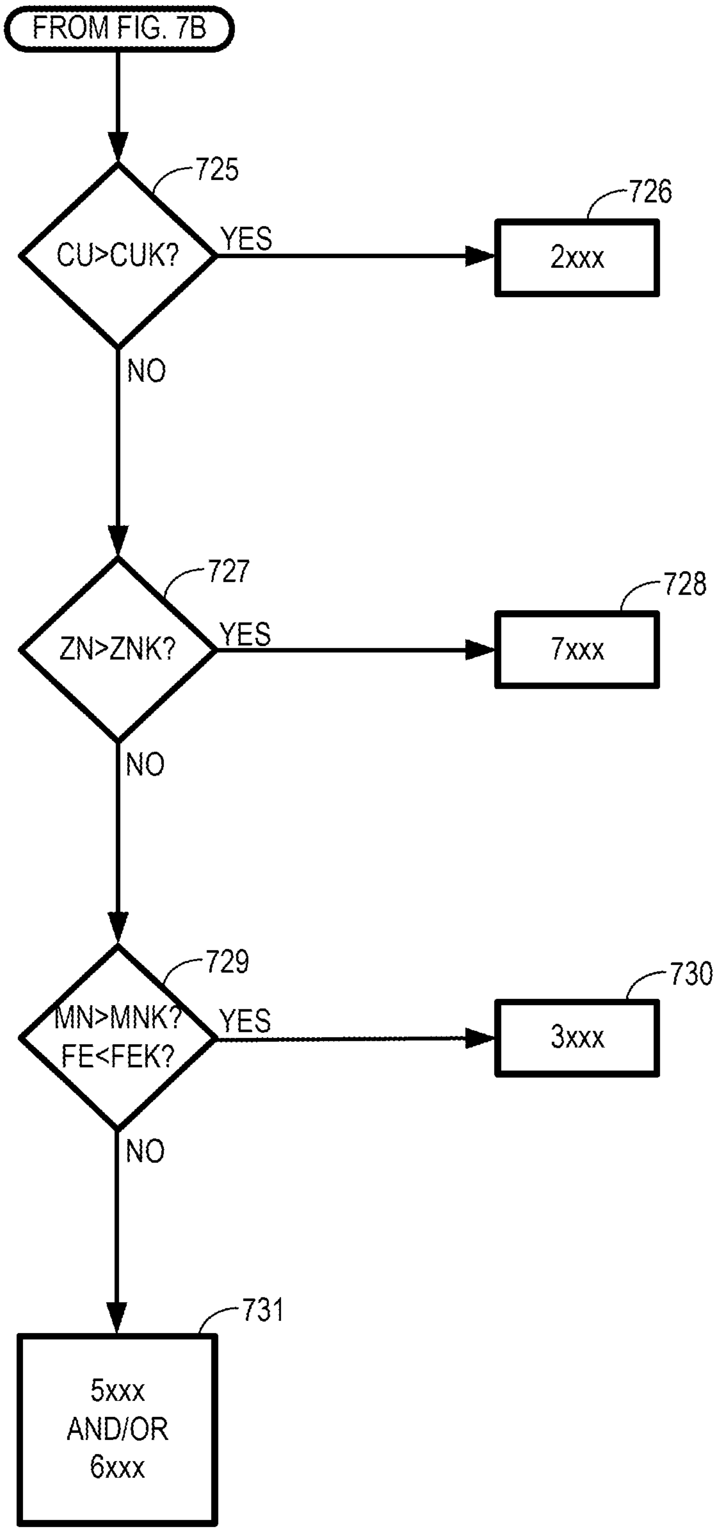

FIGS. 7A-7C illustrate a flowchart diagram of a process 700 configured in accordance with one or more embodiments of the present disclosure in which a material handling system classifies and sorts various materials (e.g., a stream of material pieces conveyed by a conveyor system) utilizing unique combinations of classifications by one or more vision system(s) (e.g., implementing an AI system) and classifications by one or more sensor system(s) (e.g., an XRF or LIBS system). The process 700, or any aspects or portions thereof, may be implemented within any material handling system appropriately configured to carry out one or more of the various described classification and sorting operations (including, but not limited to, the material handling systems described with respect to FIGS. 1, 8, 9A-9B, and 10) utilizing the classification and/or sorting functions, operations, systems, apparatuses, and devices described with respect to FIGS. 1-3. Though certain process blocks are described as utilizing an XRF system, any one or more of such process blocks may be implemented with any of the sensor systems as described herein (e.g., LIBS, XRT, etc.). It should be noted that one or more of the various process blocks within the process 700 may be optional or omitted in accordance with certain embodiments of the present disclosure.

In the flowchart diagram of FIGS. 7A-7C (and also with respect to certain aspects of FIGS. 12A-12B), the following legend applies with respect to measurements made by the XRF system(s) (resulting in a captured XRF spectrum of each material piece):

Legend of Variables

- M-Total=Total of raw counts from measurements of Ti, Cr, Mn, Fe, Ni, Cu, Zn, Sn, Pb
- N-Total=Total counts after normalized with length and height (or mass) of the material piece Calculated XRF Elemental Percentages for each material piece:

- TI=100×Titanium raw counts/M-Total
- CR=100×Chromium raw counts/M-Total
- MN=100×Manganese raw counts/M-Total
- FE=100×Iron raw counts/M-Total
- NI=100×Nickel raw counts/M-Total
- CU=100×Copper raw counts/M-Total
- ZN=100×Zinc raw counts/M-Total
- SN=100×Tin raw counts/M-Total
- PB=100×Lead raw counts/M-Total Predetermined Set Points (values) for XRF Elemental Percentages for each material piece:

- TIK, CRK, MNK, FEK, NIK, CUK, ZNK, SNK, and PBK represent the XRF classification percentage constants for each element (may be any predetermined value set between 0.0 and 100.0)

Other Predetermined Set Points (values):

- AK=0.4×N-Total for 319 standard cast alloy (constant value for N-Total calculated from 319 standard for determining cast vs. wrought categories; 1-100,000)
- BK=0.1×CU/ZN ratio for 319 standard (ratio value calculated from 319 standard for determining 319/38x cast vs. die cast zinc categories; 0.0-1.0 ratio)
- CURB=Ratio chosen for selecting between copper and brass—may be a value between 0.8 and 1.0 fraction (which may be set (predetermined) to a non-limiting exemplary default value of 0.9)
- CUYB=Ratio chosen for yellow brass vs. red brass—may be a value between 0.3 and 0.8 fraction (which may be set (predetermined) to a non-limiting exemplary default value of 0.5)
- MNSS=Set (predetermined) value for classifying manganese content in 2xx series stainless steel (which may be a value between 10 and 30)

The spectral data resulting from the XRF system may be normalized with respect to the sizes of the pieces. This step may be optional. This may be performed by determining the XRF signal level as a function of piece size and then calibrating the classifications in order to normalize for piece size.

The process 700 is described as operating on a per piece basis; of course, as one material piece within a conveyed stream of material pieces has been operated on by a particular process block, a following material piece may then be handled by that process block (e.g., as one material piece has been analyzed/classified by a vision system(s) and/or an XRF system(s), a following material piece may then be analyzed/classified by the vision system(s) and/or the XRF system(s)). Note that the flowchart diagram of FIGS. 7A-7C shows multiple process blocks in which a "vision check" is performed; the other diamond-shaped process blocks represent analysis of a material piece with an XRF system. Note that a "vision check" may be performed with any appropriate vision system, including, but not limited to, a vision system implementing an appropriately configured AI technique. Each vision check classifies a material piece as a function of processing visual images captured from each material piece through an AI system. Further note that one or more of the "vision checks" implemented within the process 700 may be performed on image data captured from a material piece with a single vision system implementing one or more different AI algorithms (models) for each vision check. In a similar manner, one or more of the XRF sensor system classifications implemented within the process 700 may be performed on spectral data captured from a material piece with a single XRF system.

Figure 8:
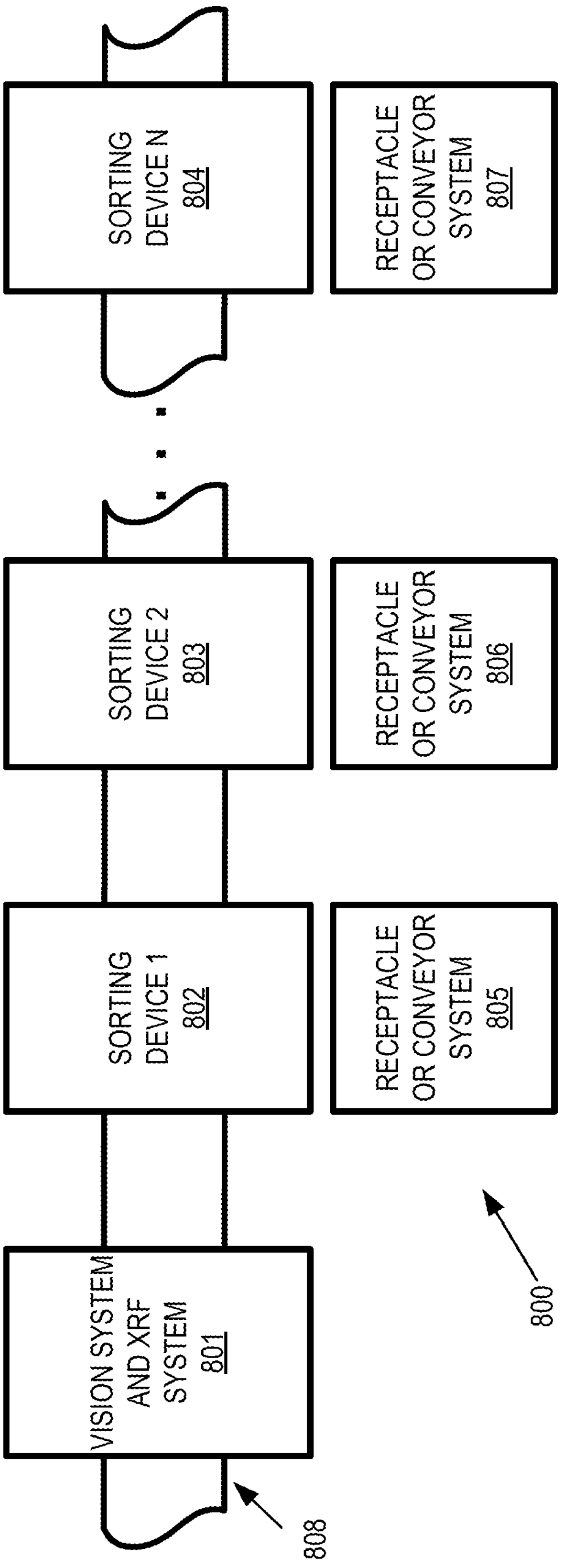
FIG. 8 illustrates systems and processes for sorting of materials in accordance with certain embodiments of the present disclosure.

Though any number of vision systems and/or XRF systems may be implemented to perform the operations within these process blocks, they all may be performed by a single vision system and/or a single XRF system (or any combination of one or more vision systems and one or more XRF systems) implemented within a material handling system (e.g., see FIG. 8). For example, as each material piece passes by a single implemented vision system, image data of the material piece captured by the single vision system may be analyzed in accordance with one or more of the process blocks 701, 704, 718, and 721 (e.g., substantially simultaneously or in parallel). In other words, algorithms associated with one or more of the process blocks 701, 704, 718, and 721 may process (e.g., substantially simultaneously or in parallel with each other by one or more AI models) captured image data, the results of which are utilized for their respective classifications. Likewise, the XRF spectrum data captured by a single implemented XRF system may be analyzed (e.g., substantially simultaneously or in parallel by one or more algorithms) in accordance with one or more of the process blocks 705, 707, 709, 710, 712, 715, 717, 722, 725, 727, and 729.

Further note that each vision check described in the process 700 represents an attempt by that particularly described algorithm to perform that classification on each material piece within the stream of materials; however, vision checks on certain material pieces may produce a "null" result, meaning that the particular vision check was unable to produce a classification (for example, the vision checks by the process blocks 718 or 721 may produce a "null" output because the material piece is neither a cast or wrought aluminum alloy). Likewise, note that each classification using XRF spectrum data described in the process 700 represents an attempt by that particularly described algorithm to perform that classification on each material piece within the stream of materials; however, classifications on certain material pieces may produce a "null" result, meaning that the particular XRF sensor system classification was unable to produce a classification (for example, the XRF sensor system classifications by any of the process blocks 705, 707, or 722 may produce a "null" output because the material piece possessed no measurable amount of zinc).

Note that any of the vision checks described in FIGS. 7A-7C may be performed in accordance with the process blocks 203-211 of the process 200 described with respect to FIG. 3. Any of the classifications performed by the XRF system(s) (or any other appropriate sensor system) in FIGS. 7A-7C may be performed in accordance with the process blocks 303-305 of the process 300 described with respect to FIG. 4.

As will be further described herein, certain aspects (i.e., classifications and/or sorts as implemented within one or more process blocks) of the process 700 may need to be performed in one or more certain sequences in order for those aspects of the process 700 to be performed more efficiently and/or more accurately. Note that though the material pieces may be analyzed/classified (including substantially simultaneously or in parallel) by a single vision system and a single XRF system, the sorting of various material pieces may need to be performed in certain sequences (e.g., along a conveyor belt), as will be further described herein.

Though the process 700 is described with respect to the classifying and sorting of a conveyed stream of materials that includes Zorba, Zebra, and/or Twitch, aspects of the process 700 may be applicable to the classifying and/or sorting of other types of material pieces.

In the process block 701, a vision check may be performed on a material piece to determine if it should be classified as some predetermined specific material (e.g., "junk" material accompanying Zorba). If the vision check classifies the material piece as a predetermined specific material, then in the process block 702, the process 700 will send instructions to a specified sorting device to sort out that material piece (e.g., from the conveyed stream of material pieces) in accordance with that classification (e.g., a material piece composed of or containing a PCB). The process block 703 represents that the process blocks 700-702 may be performed for any other type of material piece the user desires to separate from the stream of material pieces (e.g., other "junk" materials), and which can be classified with a vision system (e.g., a vision check using any of the vision-related techniques describe herein, including, but not limited to, artificial intelligence ("AI") techniques). This could be accomplished with a series of different vision systems, or a single vision system may be configured to perform classifications in a substantially simultaneous manner or in parallel for any plurality of predetermined types of material pieces (for example, the image date captured by a vision system for a single material piece is then analyzed by one or more AI algorithms (substantially simultaneously and/or in parallel with each other) to classify whether the material piece belongs to one of a plurality of predetermined types of material pieces (e.g., a predetermined set of "junk" materials)).

Note that implementation of the process blocks 701-703 in the process 700 may be optional. If the process blocks 701-703 are implemented, it may be important to perform the sorting instructed by these process blocks prior to the classifying/sorting instructed by one or more of the other process blocks of the process 700 in order to increase the efficiency of the classifications/sorts of those subsequent material pieces. For example, the sorting of various materials (as classified in the process blocks 701, 703) from the stream of materials may be important before performing the sorting of other metals and/or metal alloys as classified in one or more subsequent process blocks of the process 700 (e.g., the removal of "junk" materials before classifying/sorting of the remaining Zorba). For example, the removal of "junk" materials before other materials from the conveyed stream of materials may decrease the possibilities that such "junk" materials contaminate subsequently sorted materials. In a non-limiting example, PCBs very often contain layers of copper, and an XRF sensor may erroneously classify such PCBs as copper scrap pieces. However, a vision system can be configured to distinguish green-colored PCBs from red copper metals with substantial accuracy. Consequently, it may be advantageous to use a vision check to classify such PCBs so that they can be sorted out of the material stream, since a classification of such PCBs with an XRF system may result in them being sorted out as copper scrap pieces.

The process blocks 704-731 will now be described with respect to the classifying and sorting of materials that may be typically found in Zorba (also referred to herein as "Zorba materials"). In accordance with certain embodiments of the present disclosure, the process blocks 704-716 may be configured to classify/sort out Zebra materials from the Zorba.

In the process block 704, a vision check may be performed on a material piece to determine if it should be classified as substantially composed of or containing copper and/or brass. This can be accomplished by a vision system (e.g., using any of the vision-related techniques described herein, including, but not limited to, AI techniques) since copper and brass pieces often have a distinctive color and/or shape (for example, the vision system may be trained to classify certain pipe-shaped materials as composed of or containing copper).

If a material piece is classified by the process block 704 as composed of or containing copper and/or brass, then the process 700 may further utilize an XRF sensor system classification of the material piece in the process block 705 to distinguish between copper and brass pieces. Since brass typically contains a certain ratio of amounts of copper (Cu) to zinc (Zn) (e.g., ~60% Cu, ~40%, Zn), the material piece will be classified as a copper piece when the ratio of the relative amounts of copper to zinc is greater than a predetermined value (e.g., when a ratio of the values CU/ZN is greater than a predetermined value (CURB), which, in accordance with certain non-limiting embodiments of the present disclosure, has been empirically determined to be between 0.8 and 1.0). In other words, if the ratio of the calculated CU value to the calculated ZN value in the captured XRF spectrum of the material piece is greater than the CURB value, then the material piece is classified as copper instead of brass. Thus, if CU/ZN>CURB, then, in the process block 706, the process 700 sends an instruction to a specified sorting device to sort out the material piece from the material stream as a copper piece.

However, if the material piece is classified by the process block 705 as a brass piece, then in the process block 707, the process 700 may perform a further determination whether the material piece is either composed of yellow brass or red brass based on the captured XRF spectrum of the material piece. This may be performed by analyzing the ratio of the relative amounts of copper to zinc is greater than a second predetermined value (e.g., the values CU/ZN with respect to a predetermined CUYB value, which, in accordance with certain non-limiting embodiments of the present disclosure, has been empirically determined to be between 0.3 and 0.8). If the material piece is classified as composed of or containing red brass, then, in the process block 708, the process 700 sends an instruction to a specified sorting device to sort out the material piece as a red brass material. If the material piece is classified as composed of or containing yellow brass, then, in the process block 790, the process 700 sends an instruction to a specified sorting device to sort out the material piece as a yellow brass material.

By the combination of the process blocks 705-708, 790, it can be readily seen that a material piece may be classified as composed of yellow brass if it contains a certain amount of zinc relative to copper. Red brass is typically composed of ~85% Cu and ~15% Zn, while yellow brass is typically composed of ~60-70% Cu and ~30-40% Zn.

It can be further readily appreciated that: (1) a combination of the vision check of the process block 704 and the XRF sensor system classification of the process block 706 can be utilized for sorting of copper scrap pieces from the material stream, (2) a combination of the vision check of the process block 704 and the XRF sensor system classification of the process block 706 can be utilized for sorting of copper and brass scrap pieces from the material stream, (3) a combination of the vision check of the process block 704 and the XRF sensor system classification of the process block 707 can be utilized for sorting of brass scrap pieces from the material stream, (4) a combination of the vision check of the process block 704 and the XRF sensor system classifications of the process blocks 706 and 707 can be utilized for the separate sorting of red and yellow brass scrap pieces from the material stream, and (5) a combination of the vision check of the process block 704 and the XRF sensor system classifications of the process blocks 706 and 707 can be utilized for sorting of copper and red/yellow brass scrap pieces from the material stream.

Note that the process blocks 705-708, 790 may be optionally implemented within the process 700 (for example, when it is known that the material pieces to be sorted do not contain any copper and/or brass). Furthermore, one or more of the process blocks 705-708, 790 may be optionally omitted (or appropriately modified in a manner consistent with embodiments of the present disclosure as described herein) if it is known that the material pieces to be sorted do not contain any one or more of copper, red brass, or yellow brass. Furthermore, note that the process 700 may be configured (e.g., the process block 704 modified accordingly) so that non-copper/brass materials possessing a copper or brass color (or maybe shaped like a copper tube) are not classified/sorted as copper/brass pieces because they would not be classified as such as a result of the performance of the process blocks 705-708, 790, which utilize XRF sensor system classifications that accomplish the classifying of copper/brass pieces for sorting from the Zorba.

Further note that it may be important to perform the sorting of materials from the material stream instructed by the process blocks 706, 708, and/or 790 previous to the sorting instructed by one or more of the process blocks 723-724 since these process blocks also depend upon classifications of material pieces as a function of a CU/ZN ratio (the process block 722), so that such material pieces do not contaminate the sorted materials resulting from either or both of the process blocks 723, 724. It may also be important to perform the sorting instructed by the process blocks 706, 708, and/or 790 before either or both of the sorting instructed by the process blocks 726 and/or 728 for similar reasons (e.g., because a material piece containing copper may likely contaminate the 2xxx pieces sorted by the process block 727, and because a material piece containing zinc may likely contaminate the 7xxx pieces sorted by the process block 728).

In accordance with certain embodiments of the present disclosure, various combinations of the process blocks 709-714 may be implemented to classify and sort nickel (Ni) plated and/or stainless steel ("SS") materials from the stream of material pieces. The process 700 may be configured to do so because these materials have a relatively higher concentration of nickel than the aluminum alloys to be subsequently sorted. Note that the process block 709 is implemented as a classification utilizing a sensor system (e.g., XRF) other than a vision check because of the possibility that the nickel Ni-plated and/or SS material pieces may appear visually similar to certain types of aluminum materials (cast and/or wrought). Furthermore, since certain shredded pieces of such Ni-plated or stainless-steel material may visually appear similar to certain cast and/or wrought aluminum pieces, it may be important to sort out these material pieces before sorting of aluminum alloys so that such nickel plated and/or stainless-steel materials do not contaminate the classification/sorting of one or more various aluminum alloys.

In the process block 709, a determination is made whether the captured XRF spectrum of the material piece indicates that the material piece contains an amount of chromium (Cr) greater than a predetermined threshold. This may be performed when it is known that aluminum alloys to be sorted by the process 700 have a chromium concentration less than a known or predetermined value (e.g., a predetermined CRK value). Therefore, based on the known or predetermined CRK value, a material piece may be sorted out from the material stream when the value CR is greater than the value CRK. In accordance with certain embodiments of the present disclosure, and depending upon the materials to be sorted downstream (subsequently sorted), materials classified as having a predetermined amount (i.e., concentration) of chromium may be sorted out of the stream of material pieces. Note that this can be implemented with respect to any element known to be in certain ones of the material pieces to be sorted.

If the outcome of the process block 709 is affirmative, then the process 700 may further utilize an XRF sensor system classification of the material piece by the process block 710 to further distinguish between Ni-plated and SS materials. The process block 710 determines whether the relative content of nickel to chromium in the material piece is greater than a predetermined ratio, which, in this non-limiting example, is determined from a calculation of NI/CR>1, since a typical XRF system is only effective for measuring x-ray fluorescence a relatively small depth into the surface of the material piece, and therefore the XRF system will read a much greater content of nickel in the nickel plating on the surface of the material piece, and because 2xx and 3xx stainless steel contains substantially less nickel than chromium.

If the material piece is classified as Ni-plated, then, in the process block 711, instructions will be sent to a specified sorting device to sort out the material piece accordingly. If not, then the process 700 may proceed to the process block 712 to determine if the manganese (Mn) content is greater than a predetermined or known amount, which in this non-limiting example is a value between 10 and 30, which may be set for classifying the manganese content (MN) in 2xx series stainless steel.

It should be noted that a determining factor whether a material piece is composed of 2xx or 3xx series stainless steel is the amount of manganese. Therefore, if MN>MNSS, then the material piece is classified as 2xx series stainless steel (e.g., 201, 202); otherwise, the material piece is classified as 3xx series stainless steel (e.g., 301, 302, 304, 316). In the process block 713, if the material piece is classified as a 2xx series stainless steel, then instructions will be sent by the process 700 to a specified sorting device to sort out the material piece accordingly. In the process block 714, if the material piece is classified as a 3xx series stainless steel, then instructions will be sent by the process 700 to a specified sorting device to sort out the material piece accordingly.

It can be readily appreciated that: (1) a combination of the XRF sensor system classifications of the process blocks 709 and 710 can be utilized for sorting of Ni-plated pieces from the material stream, (2) a combination of the XRF sensor system classifications of the process blocks 709 and 710 can be utilized for sorting of SS pieces from the material stream, (3) a combination of the XRF sensor system classifications of the process blocks 709 and 710 can be utilized for separately sorting Ni-plated and SS pieces from the material stream, (4) a combination of the XRF sensor system classifications of the process blocks 709, 710, and 712 can be utilized for sorting of SS pieces from the material stream, (5) a combination of the XRF sensor system classifications of the process blocks 709, 710, and 712 can be utilized for sorting of SS pieces from the material stream into separate groups of SS 201/202 and SS 301, 302, 304, 316, and (6) a combination of the XRF sensor system classifications of the process blocks 709, 710, and 712 can be utilized for separately sorting from the material stream Ni-plated pieces and SS pieces further separated into groups of SS 201/202 and SS 301, 302, 304, 316. Additionally, all of the foregoing combinations may also include (1) the vision check of the process block 704 and/or (2) the vision check(s) of the process blocks 701/703.

In the process block 715, a determination is made whether the captured XRF spectrum of the material piece indicates that the material piece contains an amount of lead (Pb) greater than a predetermined threshold. This may be performed when it is known that material pieces to be sorted by the process 700 have a lead concentration less than a known or predetermined value (e.g., a predetermined PBK value). Therefore, based on the known or predetermined PBK value, a material piece may be sorted out when the value PB is greater than the value PBK. In the process block 716, the process 700 will send instructions to a specified sorting device to sort out that material piece (e.g., from the conveyed stream of material pieces) in accordance with the lead classification. Note that, in accordance with certain embodiments of the present disclosure, the sorting resulting from the process blocks 704, 709, and 715 may be performed in a different order relative to each other (e.g., if it is known that doing so will improve the accuracy and/or efficiency of the sorting of one or more of the materials). In accordance with embodiments of the present disclosure, implementation of the process blocks 715-716 is optional.

The material stream to be classified/sorted may also contain other materials that can be classified based on containing a unique (specific) chemical composition or signature (e.g., containing a specific element, metal, and/or alloying element). In such cases, the sorting of these materials may be performed before the sorting of materials composed of more complex chemical compositions or signatures where such unique chemical compositions or signatures could contaminate the classifications of the materials composed of more complex chemical compositions or signatures (and thus decrease the accuracy or efficiency of a sorting of such materials). Thus, it may be important to sort out these materials with such unique chemical compositions or signatures so that those materials are not inadvertently sorted into (do not contaminate) receptacles meant for the materials composed of more complex chemical compositions or signatures. For example, the process 700 may be configured to sort out any materials known to be within Zebra before sorting of Twitch materials (e.g., if it is known that doing so in that order will improve the accuracy and/or efficiency of the sorting of one or more certain Twitch materials). Alternatively, in accordance with certain embodiments of the present disclosure, the process 700 may be configured to sort out any materials known to be within Twitch before classifying and sorting of certain Zebra materials (e.g., if it is known that doing so in that order will improve the accuracy and/or efficiency of the sorting of one or more certain Zebra materials).

In accordance with certain embodiments of the present disclosure, it may be advantageous or desired to perform sorting based on the process blocks 717-731 subsequent to one or more of the previously described process blocks since XRF technology is known to be very poor at discerning between certain aluminum alloys (for example, the existence of any one or more of various Zebra materials (e.g., the aforementioned copper, brass, Ni-plated, and SS materials) may negatively or adversely affect the XRF measurements within the process blocks 717-731). For example, pieces of die cast zinc look very similar to certain aluminum alloys, and thus cannot be visually distinguished from each other based solely on a vision check. However, an XRF system can easily distinguish between die cast zinc and aluminum. Therefore, it may be advantageous to classify and sort out die cast zinc (see the process block 724) previously to the processing of other aluminum pieces (e.g., any one or more of the process blocks 725-731). Additionally, a material piece that is substantially larger (e.g., in size and/or mass) than other material pieces within the stream may have a relatively large zinc peak in the captured XRF spectrum resulting in such a material piece being erroneously classified as a 7xxx series aluminum alloy. Therefore, it may be advantageous or desired to perform sorting based on the process blocks 721-724 before sorting based on the process blocks 727-728.

Note that the captured XRF spectrum of a wrought aluminum piece (also referred to as sheet aluminum) will have a relatively lower total of captured raw counts than a similarly sized cast aluminum piece because cast aluminum contains a relatively larger amount of copper and zinc, resulting in a relatively larger total number of captured raw counts. Exceptions to the foregoing are the 356 and 360 series cast aluminum alloys, which have a relatively lower concentration of copper and zinc. Therefore, the process blocks 717-720 are configured to identify (classify) and sort out the 356 and/or 360 series cast aluminum pieces, which have relatively lower amounts of copper and zinc similar to wrought aluminum. Otherwise, the 356 and/or 360 series cast aluminum pieces could be erroneously classified and thus sorted as wrought aluminum (e.g., in the process block 721). Therefore, it may be advantageous to perform sorting based on the process blocks 717-719 before sorting based on the process block 721.

In the process block 717, a determination is made whether the total captured XRF spectrum counts for a material piece (N-Total) (after normalized with the length and height (or mass) of the piece) is greater than a predetermined constant value (AK). In accordance with certain embodiments of the present disclosure, this constant value may be set as 0.4× N-Total for a 319 standard cast aluminum alloy (e.g., as determined by the Aluminum Association). In accordance with certain embodiments of the present disclosure, the process block 717 may determine whether measured amounts of copper and zinc in a scrap piece is greater than a predetermined value. For classifications that do not meet the standard set forth by the classification of the process block 717 (i.e., the total captured XRF counts are relatively low or the measured amounts of copper and zinc in a scrap piece is less than a predetermined value), then the process 700 may utilize a vision check by the process block 718 to determine whether the material piece is composed of wrought or cast aluminum. If the material piece is not classified as a wrought aluminum piece, then in the process block 719 it will be classified as a 356 and/or 360 cast aluminum piece and instructions sent to a specified sorting device to sort out the material piece accordingly.

Thus, in accordance with embodiments of the present disclosure, the process 700 may be configured so that a material piece is sorted out as classified as a 356/360 cast aluminum material by instructions sent by the process block 719 if the process block 717 determines that N-Total≤AK and a vision check classifies the material piece as a cast aluminum piece; otherwise, the material piece remains on the main conveyor belt for classification/sorting by the subsequent process blocks 721-731. Therefore, it can be readily appreciated that the process 700 may be configured so that a material piece is sorted out as classified as a 356/360 cast aluminum material by a combination of the process blocks 717 and 719. Additionally, the foregoing combination may also include (1) the vision check of the process block 704, and/or (2) the vision check(s) of the process blocks 701/703, and/or (3) the XRF classification by the process block 709.

In accordance with alternative embodiments of the present disclosure, if the material piece is classified as a wrought aluminum piece by the process block 718, then in the process block 720, instructions may be sent by the process 700 to a specified sorting device to sort out the material piece accordingly.

In accordance with further alternative embodiments of the present disclosure, such material pieces classified as wrought aluminum pieces may instead, in the process block 720, be redirected and/or returned in some appropriate manner to the main conveyor belt for classification/sorting by the subsequent process blocks in the process 700. This may be performed by depositing these material pieces back onto the beginning of the material handling system and thereafter deactivating the process block 717 or by a return or circular conveyor belt that returns these material pieces to a location on the conveyor belt downstream from the sorting position associated with the process blocks 719 and 720.

In accordance with alternative embodiments of the present disclosure, the AK value may be predetermined (including on an empirical basis) to classify for sorting certain wrought aluminum alloys in the process block 717, but not all. In other words, the AK value may be adjusted as needed to achieve a desired classification/sorting result. In accordance with certain embodiments of the present disclosure, the AK value may be set so that a predetermined percentage of the wrought aluminum pieces are passed through by the process block 717 to the process block 721.

Note that in accordance with alternative embodiments of the present disclosure, a further classification and sort (e.g., with an XRF or LIBS system) may be performed to classify/sort between the 356 and 360 cast aluminum alloys (e.g., as a modification and/or addition to the process block 719 in accordance with embodiments disclosed herein). For example, the process 700 may be modified to include the process blocks 1216-1218 as described with respect to FIGS. 12A-12B (e.g., the process block 719 modified with, or replaced by, the process blocks 1216-1218).

Since 319 and 38x cast aluminum alloys have a material composition represented by a relatively large copper peak compared to zinc as captured in the XRF spectrum (copper concentration ~3-4%; zinc concentration <1%), the process blocks 721-724 may be implemented in the process 700 to separate these alloys from die cast zinc metal pieces (or all other cast aluminum alloys remaining in the stream of material pieces). Note that in accordance with alternative embodiments of the present disclosure, the material handling system may be configured so that all cast aluminum alloy pieces not classified as either 319/38x and/or die cast zinc metal pieces are collected in a catch-all receptacle (e.g., in response to the classification by the process block 722, the process sends instructions to a sorting device to sort out such cast aluminum alloy pieces separately from the 319/38x and/or die cast zinc metal pieces).

In the process block 721, a vision check is configured to perform a classification between cast and wrought aluminum alloys. For those material pieces classified as cast aluminum, the process 700 may be configured to perform a further classification of each such material piece by the process block 722 whereby a determination is made whether the captured XRF spectrum of the material piece indicates that the material piece has a copper concentration that is relatively larger than the zinc concentration (e.g., as previously described with respect to the process blocks 705, 707). For example, a determination may be made whether the ratio of the values CU/ZN is greater than the predetermined value BK, which in this non-limiting example may be predetermined to be 0.1×CU/ZN.

If yes, then the material piece is classified as a 319/38x cast aluminum piece, and, in the process block 723, the process 700 sends instructions to a specified sorting device to sort out the material piece accordingly. Otherwise, the material piece is classified as a die cast zinc piece, and in the process block 724, the process 700 sends instructions to a specified sorting device to sort out the material piece accordingly. Thus, it can be readily appreciated that: (1) a combination of the vision check of the process block 721 and the XRF sensor system classification of the process block 722 can result in the sorting of die cast zinc and 319/38x cast aluminum scrap pieces from the material stream, (2) a combination of the vision check of the process block 721 and the XRF sensor system classification of the process block 722 can result in the sorting of die cast zinc pieces from the material stream, and (3) a combination of the vision check of the process block 721 and the XRF sensor system classification of the process block 722 can result in the sorting of 319/38x cast aluminum scrap pieces from the material stream. Additionally, any of the foregoing combinations may also include (1) any one or more of the vision checks of the process blocks 701/703 and 704, and/or (2) any one or more of the XRF classifications by the process blocks 709, 715, and 717.

In accordance with alternative embodiments of the present disclosure, the process may divert onto another conveyor belt (or any appropriate conveyor system; or diverted onto a different portion of the conveyor belt) the material pieces classified in the process block 721 as cast aluminum alloy pieces whereby a classification/sort is performed between the 319/38x cast alloy pieces and the die cast zinc pieces.

Note that in accordance with alternative embodiments of the present disclosure, a further classification and sort (e.g., with an XRF or LIBS system) may be performed to classify/sort between the 319 and 38x cast aluminum alloys (e.g., as a modification and/or addition to the process block 723 in accordance with embodiments disclosed herein). For example, the process 700 may be modified to include the process blocks 1221-1224 as described with respect to FIGS. 12A-12B.

In accordance with alternative embodiments of the present disclosure, the vision check implemented within the process block 721 may be configured to classify between cast, wrought, and extruded aluminum alloys, such as described within U.S. Pat. No. 11,471,916, which is hereby incorporated by reference herein.

In accordance with alternative embodiments of the present disclosure, an optional process block 740 may be implemented in the process 700 to perform a negative classification/sort on those material pieces to remove from the material stream any cast aluminum alloy pieces that were classified as wrought aluminum by the process block 721. Such a classification may be implemented with an appropriately configured vision check (or any of the sensor technologies described herein).

In accordance with embodiments of the present disclosure, the material pieces classified by the vision check of the process block 721 as wrought aluminum alloy pieces may be classified/sorted in accordance with various combinations of one or more of the process blocks 725-731. In accordance with embodiments of the present disclosure, the sorting of these wrought aluminum alloy pieces into these various classifications is performed after one or more of the sorts previously described with respect to FIGS. 7A-7B. Note that in accordance with certain embodiments of the present disclosure, any one or more of these classification/sorts may be optional or omitted.

In the process block 725, a determination is made using the captured XRF spectrum of the material piece whether the percentage amount of copper (the CU value) in the material piece is greater than a predetermined value (CUK). If so, then the material piece is classified by the process block 725 as belonging to the 2xxx series of wrought aluminum alloys; and, in the process block 726, an instruction is sent by the process 700 to a specified sorting device to sort out the material piece accordingly. Note that it is known that the 2xxx aluminum alloy series contains a certain amount more of copper than the other wrought aluminum alloy series. Therefore, the CUK value can be set (predetermined) so as to effectively sort (as predetermined by the user) these 2xxx series aluminum alloys from the other material pieces in the material stream. It can be readily appreciated that it may be beneficial for operation, or implementation, of the process block 726 to be performed subsequent to the sorting of any other materials having a relatively high copper content (e.g., the process blocks 706, 708, 790, and/or 723).

In the process block 727, a determination is made using the captured XRF spectrum of the material piece whether the percentage amount of zinc (the ZN value) in the material piece is greater than a predetermined value (ZNK). If so, then the material piece is classified by the process block 727 as belonging to the 7xxx series of wrought aluminum alloys; and, in the process block 728, an instruction is sent by the process 700 to a specified sorting device to sort out the material piece accordingly. Note that it is known that the 7xxx series aluminum alloy contains a certain amount more of zinc than the other wrought aluminum alloy series. Therefore, the ZNK value can be set (predetermined) so as to effectively sort (as predetermined by the user) these 7xxx series aluminum alloys from the other material pieces in the material stream.

In the process block 729, a determination is made using the captured XRF spectrum of the material piece whether the percentage amount of manganese (the MN value) in the material piece is greater than a predetermined value (MNK), and whether the percentage amount of iron (the FE value) in the material piece is less than a predetermined value (FEK). If so, the material piece is classified by the process block 729 as belonging to the 3xxx series of wrought aluminum alloys, and in the process block 730 an instruction is sent by the process 700 to a specified sorting device to sort out the material piece accordingly.

The process block 731 may represent that any material pieces not classified/sorted as a 3xxx series wrought aluminum alloy are classified as a 5xxx/6xxx series wrought aluminum alloy. This may be accomplished by simply permitting all such remaining material pieces in the material stream to be collected in a sorting receptacle. In accordance with alternative embodiments of the present disclosure, a further classification/sort may be performed between the 5xxx and 6xxx series aluminum alloys. As is known, 5xxx series wrought aluminum alloys are aluminum alloyed with magnesium, while 6xxx series wrought aluminum alloys are aluminum alloyed with magnesium and silicon. Note, however, that the concentrations of these aluminum alloy constituents are relatively very low, and therefore, it may be important to configure the process 700 so that the classification/sort in the process block 731 is subsequent to other classifications/sorts associated with larger peaks measured within the captured XRF spectrum, which may obscure the ability of the process 700 to classify/sort the 5xxx/6xxx wrought aluminum alloy pieces.

In accordance with alternative embodiments of the present disclosure, the process block 731 may be configured to implement a principal component analysis ("PCA") algorithm (or any other appropriately configured algorithm) of the captured XRF spectrum in order to classify/sort between the 5xxx and 6xxx series aluminum alloys.

In accordance with certain embodiments of the present disclosure, the process blocks 726, 728, 730, and/or 731 may be performed in any order; however, the effectiveness of one or more such classifications/sorts may be thereby affected. Moreover, these classifications/sorts may be interchanged/re-ordered in order to achieve a certain effectiveness/efficiency for one or more of these classifications/sorts.

Additionally, in accordance with alternative embodiments of the present disclosure, after any one or more of the sorts 726, 728, 730, or 731, a further classification/sort may be performed to further separate these into finer classifications of alloys (e.g., within that particular wrought aluminum series) by utilizing any appropriate sensor technology (e.g., XRF, LIBS, etc.), such as described within U.S. Pat. No. 11,278,937 and U.S. Published Patent Application Nos. 2021/0346916 and 2021/0229133, which are hereby incorporated by reference herein.

In accordance with certain embodiments of the present disclosure, the process 700 may be configured so that the material pieces classified as cast aluminum alloys are sorted out from the stream of material pieces, and then any material pieces not classified by any of the process blocks 725, 727, and 729 as belonging to a designated wrought aluminum alloy are collected in a specified receptacle (e.g., see the receptacle 140 of FIG. 1). In accordance with certain embodiments of the present disclosure, the process 700 may be configured so that both the classified cast and wrought aluminum alloys are sorted out from the stream of material pieces after the process block 721, and then the process blocks 722-724 are performed on the sorted-out cast aluminum alloys, and the process blocks 725-731 are performed on the sorted out wrought aluminum alloys. In accordance with certain embodiments of the present disclosure, the process 700 may be configured so that the classified 3xxx series wrought aluminum alloys and the classified 5xxx/6xxx series wrought aluminum alloys are both sorted out of the stream of material pieces after the process block 729, leaving any unclassified material pieces to be collected in a receptacle (e.g., see the receptacle 140 of FIG. 1).

It can be further readily appreciated that: (1) a combination of the vision check of the process block 721 and the XRF sensor system classification of the process block 725 can be utilized for sorting of 2xxx series wrought aluminum alloy pieces from the material stream, (2) a combination of the vision check of the process block 721 and the XRF sensor system classification of the process block 727 can be utilized for sorting of 7xxx series wrought aluminum alloy pieces from the material stream, (3) a combination of the vision check of the process block 721 and the XRF sensor system classification of the process block 729 can be utilized for sorting of 3xxx series wrought aluminum alloy pieces from the material stream, and (4) a combination of the vision check of the process block 721 and the XRF sensor system classification of the process block 729 can be utilized for sorting of 5xxx/6xxx series wrought aluminum alloy pieces from the material stream. Additionally, any of the foregoing combinations may also include (1) any one or more of the vision checks of the process blocks 701/703 and 704, and/or (2) any one or more of the XRF classifications by the process blocks 709, 715, and 717.

Figure 12A:
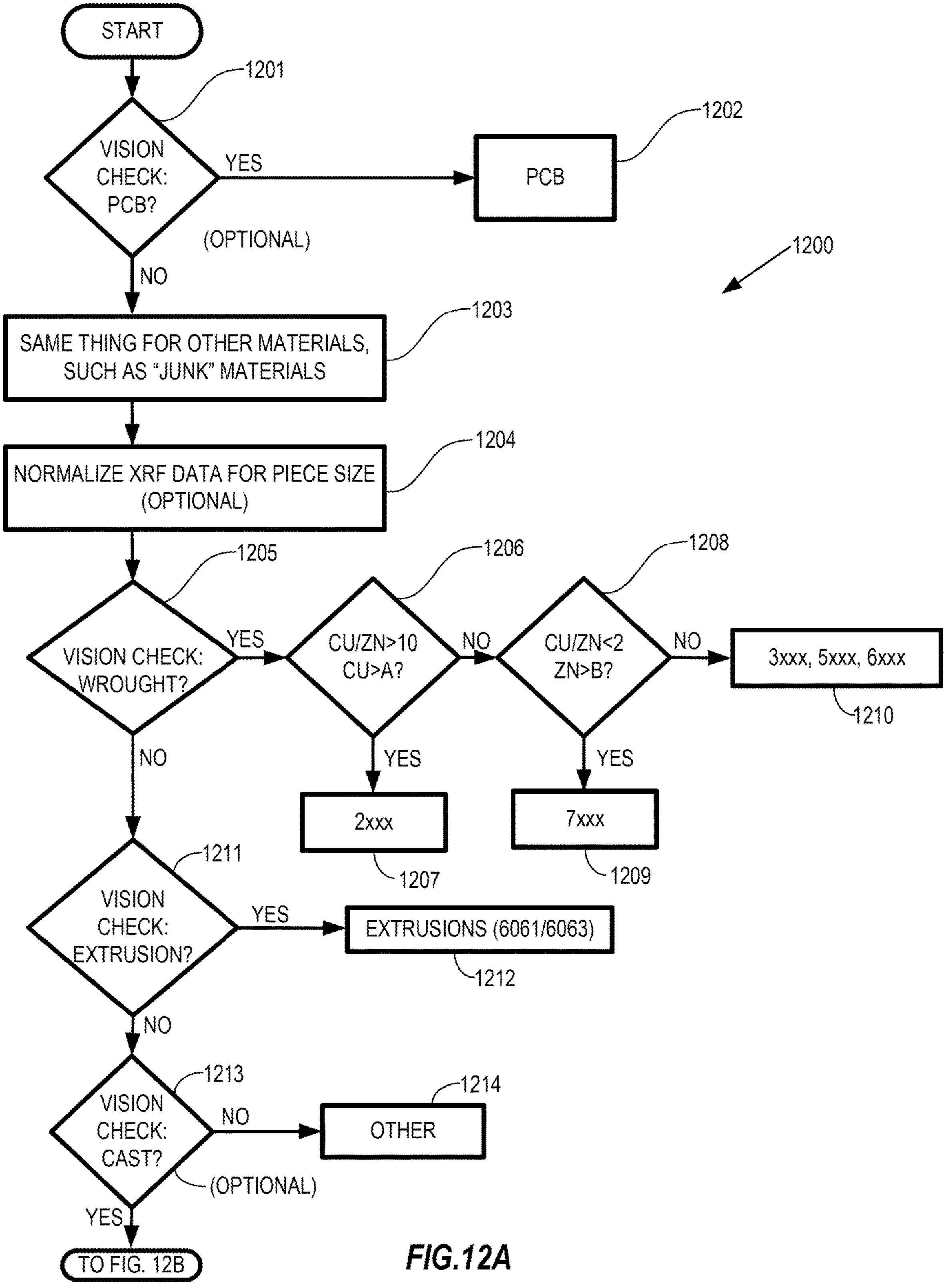
FIGS. 12A and 12B illustrate a flowchart diagram configured in accordance with various embodiments of the present disclosure.
Figure 12B:
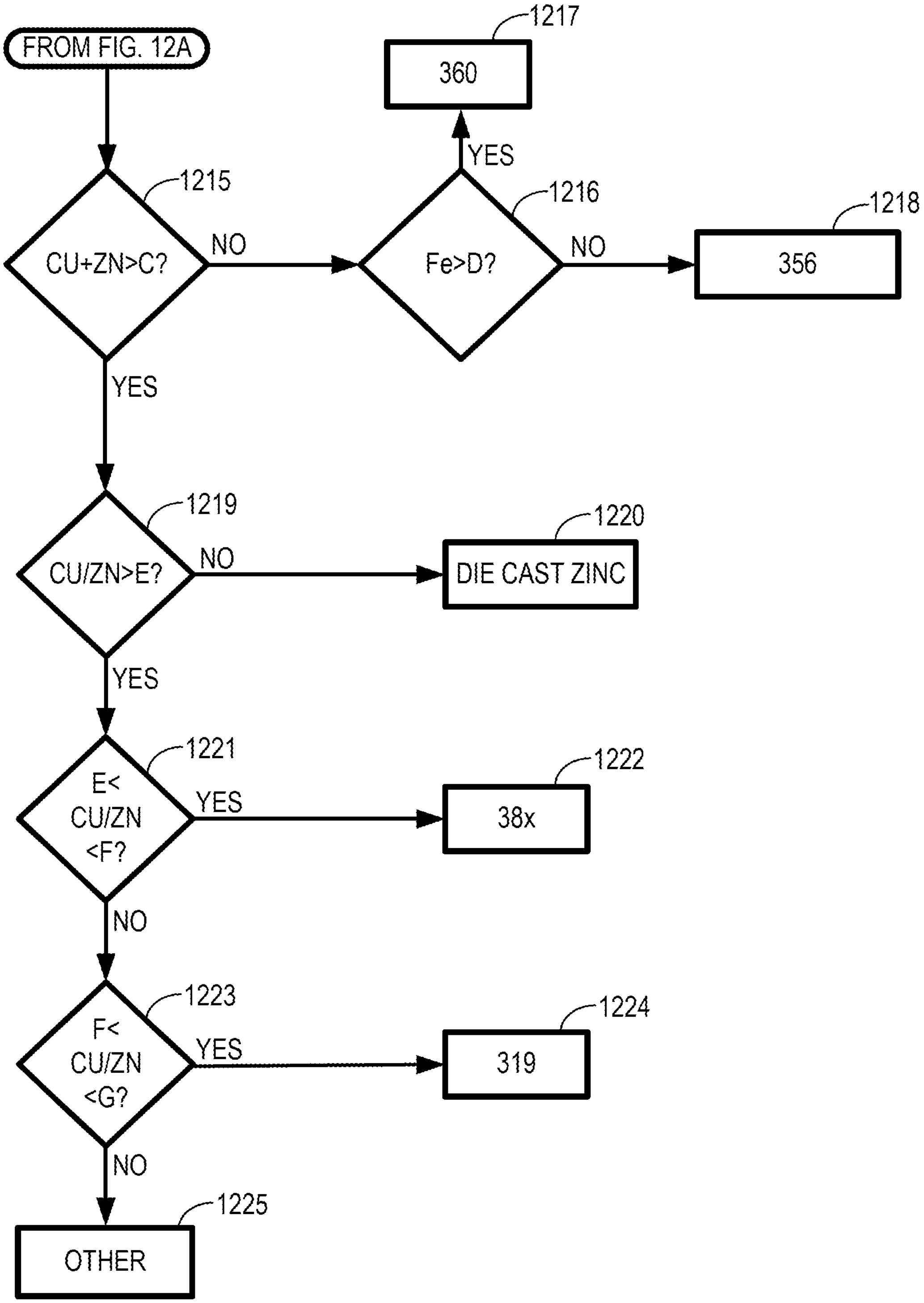

FIGS. 12A-12B illustrate a flowchart diagram of a process 1200 configured in accordance with one or more alternative embodiments of the present disclosure in which a material handling system classifies and sorts various materials (e.g., a stream of material pieces conveyed by a conveyor system) utilizing unique combinations of classifications by one or more vision system(s) (e.g., implementing an AI system) and classifications by one or more sensor system(s) (e.g., a spectroscopic sensor system, such as an XRF or LIBS system). The process 1200, or any aspects or portions thereof, may be implemented within any material handling system appropriately configured to carry out one or more of the various described classification and sorting operations (including, but not limited to, the material handling systems described with respect to FIGS. 1, 8, 9A-9B, and 10) utilizing the classification and/or sorting functions, operations, systems, apparatuses, and devices described with respect to FIGS. 1-3. Though certain process blocks are described as utilizing an XRF system, any one or more of such process blocks may be implemented with any of the spectroscopic sensor systems as described herein (e.g., LIBS, XRT, etc.). It should be noted that one or more of the various process blocks within the process 1200 may be optional or omitted in accordance with certain embodiments of the present disclosure.

The process 1200 is described as operating on a per piece basis; of course, as one material piece within a conveyed stream of material pieces has been operated on by a particular process block, a following material piece may then be handled by that process block (e.g., as one material piece has been analyzed/classified by a vision system(s) and/or an XRF system(s), a following material piece may then be analyzed/classified by the vision system(s) and/or the XRF system(s)). Note that the flowchart diagram of FIGS. 12A-

12B shows multiple process blocks in which a "vision check" is performed; the other diamond-shaped process blocks represent analysis of a material piece by an XRF system (also referred to as an XRF sensor system classification). Note that a "vision check" may be performed with any appropriate vision system, including, but not limited to, a vision system implementing an appropriately configured AI technique. Each vision check classifies a material piece as a function of processing visual images captured from each material piece through an AI system.

Though any number of vision systems and/or XRF systems may be implemented to perform the operations within these process blocks, they all may be performed by a single vision system and/or a single XRF system (or any combination of one or more vision systems and one or more XRF systems) implemented within a material handling system (e.g., see FIG. 8). Thus, one or more of the "vision checks" implemented within the process 1200 may be performed on image data captured from a material piece with a single vision system implementing one or more different AI algorithms (models) for each vision check. In a similar manner, one or more of the XRF sensor system classifications implemented within the process 1200 may be performed on spectral data captured from a material piece with a single XRF system. For example, as each material piece passes by a single implemented vision system, image data of the material piece captured by the single vision system may be analyzed in accordance with one or more of the process blocks 1201, 1205, 1211, and 1213 (e.g., substantially simultaneously or in parallel). In other words, algorithms associated with one or more of the process blocks 1201, 1205, 1211, and 1213 may process (e.g., substantially simultaneously or in parallel with each other by one or more AI models) captured image data, the results of which are utilized for their respective classifications. Likewise, the XRF spectrum data captured by a single implemented XRF system may be analyzed (e.g., substantially simultaneously or in parallel by one or more algorithms) in accordance with one or more of the process blocks 1206, 1208, 1215, 1216, 1219, 1221, and 1223.

Note that any of the vision checks described in FIGS. 12A-12B may be performed in accordance with the process blocks 203-211 of the process 200 described with respect to FIG. 3.

Any of the classifications performed by the XRF system(s) (or any other appropriate sensor system) in FIGS. 12A-12B may be performed in accordance with the process blocks 303-305 of the process 300 described with respect to FIG. 4.

As will be further described herein, certain aspects (i.e., classifications and/or sorts as implemented within one or more process blocks) of the process 1200 may need to be performed in one or more certain sequences in order for those aspects of the process 1200 to be performed more efficiently and/or more accurately. Note that though the material pieces may be analyzed/classified (including substantially simultaneously or in parallel) by a single vision system and a single XRF system, it may be advantageous to sort various material pieces in certain sequences (along a conveyor belt), as will be further described herein.

Though the process 1200 is described with respect to the classifying and sorting of a conveyed stream of materials that includes Zorba, Zebra, and/or Twitch, aspects of the process 1200 may be applicable to the classifying and/or sorting of other types of material pieces.

In the process block 1201, a vision check may be performed on a material piece to determine if it should be classified as some predetermined specific material (e.g., "junk" or "fluff" material accompanying Zorba). If the vision check classifies the material piece as a predetermined specific material, then in the process block 1202, the process 1200 will send instructions to a specified sorting device to sort out that material piece (e.g., from the conveyed stream of material pieces) in accordance with that classification (e.g., a material piece composed of or containing a PCB). The process block 1203 represents that the process blocks 1200-1202 may be performed for any other type of material piece the user desires to separate from the stream of material pieces (e.g., other "junk" or "fluff" materials), and which can be classified with a vision system (e.g., a vision check using any of the vision-related techniques describe herein, including, but not limited to, AI techniques). This could be accomplished with a series of different vision systems, or a single vision system may be configured to perform classifications in a substantially simultaneous manner or in parallel for any plurality of predetermined types of material pieces (for example, the image date captured by a vision system for a single material piece is then analyzed by one or more AI algorithms (substantially simultaneously and/or in parallel with each other) to classify the material piece as belonging to one of a plurality of predetermined types of material pieces (e.g., a predetermined set of "junk" or "fluff" materials).

Note that implementation of the process blocks 1201-1203 may be optional. If the process blocks 1201-1203 are implemented, it may be important to perform the sorting instructed by these process blocks prior to the classifying/sorting instructed by one or more of the other process blocks of the process 1200 in order to increase the efficiency of the classifications/sorts of those subsequent material pieces. For example, the sorting of various materials (as classified in the process blocks 1201, 1203) from the stream of materials may be important before performing the sorting of other metals and/or metal alloys as classified in one or more subsequent process blocks of the process 1200 (e.g., the removal of "junk" or "fluff" materials before classifying/sorting of the remaining Zorba). For example, the removal of "junk" or "fluff" materials before other materials from the conveyed stream of materials may decrease the possibilities that such "junk" or "fluff" materials contaminate subsequent sorted materials. In a non-limiting example, PCBs very often contain layers of copper, and an XRF sensor may erroneously classify such PCBs as copper scrap pieces. However, a vision system can be configured to distinguish green-colored PCBs from red copper metals with substantial accuracy. Consequently, it may be advantageous to use a vision check to classify such PCBs so that they can be sorted out of the material stream, since a classification of such PCBs with an XRF system may result in them being sorted out as copper scrap pieces.

The process blocks 1204-1225 will now be described with respect to the classifying and sorting of materials that may be typically found in Zorba (also referred to herein as "Zorba materials").

In the process block 1204, the data resulting from the XRF system may be normalized with respect to the sizes of the pieces. This step may be optional. This may be performed by determining the XRF signal level as a function of piece size and then calibrating the classifications in order to normalize for piece size.

In accordance with embodiments as described with respect to FIGS. 12A-12B, the process 1200 may be configured to classify/sort out wrought and/or extrusion aluminum alloys before classifying/sorting of certain cast aluminum alloys. In accordance with embodiments of the present disclosure, the process 1200 may be configured to classify/sort out wrought aluminum alloys based on a combination of one or more vision checks and one or more sensor system classifications based on measured amounts of copper and zinc in the material piece. In accordance with embodiments of the present disclosure, the process 1200 may be configured to classify/sort out cast aluminum alloys based on a combination of one or more vision checks and one or more sensor system classifications based on measured amounts of copper and zinc in the material piece.

In the process block 1205, a vision check is performed to classify wrought aluminum alloy pieces within the stream of materials. In accordance with embodiments of the present disclosure, the material pieces classified by the process block 1205 as wrought aluminum alloy pieces may be further classified and sorted in accordance with various combinations of one or more of the process blocks 1206-1210. Note that in accordance with certain embodiments of the present disclosure, any one or more of these classification/sorts may be optional or omitted.

In the process block 1206, a determination is made using the captured XRF spectrum of the material piece whether a ratio of a measured amount of copper to a measured amount of zinc in the material piece is greater than a predetermined value (which, in accordance with certain non-limiting embodiments of the present disclosure, has been empirically determined to be 10), and whether a measured amount of copper in the material piece is greater than a predetermined value "A." In accordance with certain embodiments of the present disclosure, a ratio of the values CU/ZN as described with respect to the process 700 may be utilized. Also, in accordance with certain embodiments of the present disclosure, a determination of CU>CUK as described with respect to the process block 725 may be utilized for the determination of CU>A.

If both determinations in the process block 1206 are affirmative, then the material piece is classified as belonging to the 2xxx series of wrought aluminum alloys; and, in the process block 1207, an instruction is sent by the process 1200 to a specified sorting device to sort out the material piece accordingly. Note that it is known that the 2xxx aluminum alloy series contains a certain amount more of copper than the other wrought aluminum alloy series. Therefore, the value "A" can be set (predetermined) so as to effectively sort (as predetermined by the user) these 2xxx series aluminum alloys from the other material pieces in the material stream.

In the process block 1208, a determination is made using the captured XRF spectrum of the material piece whether a ratio of a measured amount of copper to a measured amount of zinc in the material piece is less than a predetermined value (which, in accordance with certain non-limiting embodiments of the present disclosure, has been empirically determined to be 2), and whether a measured amount of zinc in the material piece is greater than a predetermined value "B." In accordance with certain embodiments of the present disclosure, a ratio of the values CU/ZN as described with respect to the process 700 may be utilized. Also, in accordance with certain embodiments of the present disclosure, a determination of ZN>ZNK as described with respect to the process block 727 may be utilized for the determination of ZN>B.

If both determinations in the process block 1208 are affirmative, then the material piece is classified as belonging to the 7xxx series of wrought aluminum alloys; and, in the process block 1209, an instruction is sent by the process 1200 to a specified sorting device to sort out the material piece accordingly. Note that it is known that the 7xxx series aluminum alloy contains a certain amount more of zinc than the other wrought aluminum alloy series. Therefore, the value "B" can be set (predetermined) so as to effectively sort (as predetermined by the user) these 7xxx series aluminum alloys from the other material pieces in the material stream.

In accordance with embodiments of the present disclosure, the process 1200 may send an instruction (the process block 1210) to a specified sorting device to sort out those remaining material pieces classified as wrought aluminum but not sorted out as either 2xxx or 7xxx series wrought aluminum pieces into a receptacle (and, in accordance with embodiments of the present disclosure, these material pieces may be designated as 3xxx, 5xxx, and/or 6xxx series aluminum pieces). Thus, the process block 1210 may represent that any material pieces not classified/sorted as a 2xxx or 7xxx series wrought aluminum alloy are classified as a 3xxx/5xxx/6xxx series wrought aluminum alloy. In accordance with alternative embodiments of the present disclosure, a further classification/sort may be performed between the 3xxx, 5xxx, and/or 6xxx series aluminum alloys, such as described with respect to the process blocks 729-731.

In accordance with certain embodiments of the present disclosure, the sortation by the process block 1209 may be performed before the sortation by the process block 1207; however, the effectiveness of these sorts may be thereby affected. Moreover, these classifications/sorts may be interchanged/re-ordered in order to achieve a certain effectiveness/efficiency for one or more of these classifications/sorts.

Additionally, in accordance with alternative embodiments of the present disclosure, any one or more of the sorts 1207, 1209, or 1210 may be further modified with a further classification/sort to further separate these into finer classifications of alloys (e.g., within that particular wrought aluminum series) by utilizing a classification based on any appropriate sensor technology (e.g., XRF, LIBS, etc.), such as described within U.S. Pat. No. 11,278,937 and U.S. Published Patent Application Nos. 2021/0346916 and 2021/0229133, which are hereby incorporated by reference herein.

In accordance with certain embodiments of the present disclosure, the process 1200 may be configured so that the material pieces classified as cast aluminum alloys are sorted out from the stream of material pieces, and then any material pieces not classified by any of the process blocks 1206 and 1208 as belonging to a designated wrought aluminum alloy are collected in a specified receptacle (e.g., see the receptacle 140 of FIG. 1).

It can be readily appreciated that: (1) a combination of the vision check of the process block 1205 and the XRF sensor system classification of the process block 1206 can be utilized for sorting of 2xxx wrought aluminum alloy pieces from the material stream, (2) a combination of the vision check of the process block 1205 and the XRF sensor system classification of the process block 1206 can be utilized for sorting of 2xxx and/or 7xxx, 3xxx, 5xxx, and/or 6xxx series wrought aluminum alloy pieces from the material stream, (3) a combination of the vision check of the process block 1205 and the XRF sensor system classifications of the process blocks 1206 and 1208 can be utilized for sorting of 7xxx and 3xxx, 5xxx, and/or 6xxx series wrought aluminum alloy pieces from the material stream, (4) a combination of the vision check of the process block 1205 and the XRF sensor system classifications of the process blocks 1206 and 1208 can be utilized for sorting of 7xxx or 3xxx, 5xxx, and/or 6xxx series wrought aluminum alloy pieces from the material stream, and (5) a combination of the vision check of the process block 1205 and the XRF sensor system classifications of the process blocks 1206 and 1208 can be utilized for sorting of 3xxx, 5xxx, and/or 6xxx series wrought aluminum alloy pieces from the material stream. Additionally, all of the foregoing combinations may also include the vision check(s) of the process blocks 1201/1203.

It can be also appreciated that it may be advantageous to configure the process 1200 so that a vision check for wrought aluminum alloys by the process block 1205 is performed in combination with the sensor system classification by the process block 1206 in order to sort out the 2xxx series aluminum alloys before sorting out of certain cast aluminum alloys that are known to contain relative high amounts of copper. It can be also further appreciated that it may be advantageous to configure the process 1200 so that a vision check for wrought aluminum alloys by the process block 1205 is performed in combination with the sensor system classification by the process blocks 1208 in order to sort out the 7xxx series aluminum alloys before sorting out of certain cast aluminum alloys that are known to contain relative high amounts of zinc.

In the process block 1211, a vision check may be performed to classify extrusion aluminum alloy pieces within the stream of materials (see, for example, U.S. Pat. No. 11,471,916, which is hereby incorporated by reference herein). In accordance with non-limiting embodiments of the present disclosure, such extrusion aluminum alloy pieces may be classified as 6061, 6063, or other types of extrusions. The process 1200 may then send an instruction (the process block 1212) to a specified sorting device to sort out those material pieces accordingly. Additionally, in accordance with alternative embodiments of the present disclosure, after the sort 1212, a further classification/sort may be performed to further separate these into finer classifications of alloys (e.g., within those particular extrusion aluminum series) by utilizing any appropriate sensor technology (e.g., XRF, LIBS, etc.).

In the process block 1213, a vision check may be performed to classify cast aluminum alloy pieces within the stream of materials. The process block 1214 represents that any material pieces not classified as cast aluminum and remaining within the stream of materials may be sorted from the stream as belonging to "Other" material classifications (i.e., not wrought, extrusion, and cast aluminum). Additionally, the process block 1213 may be optionally implemented in that all remaining material pieces not sorted out are then considered as cast aluminum alloy pieces. The process block 1213 may also be optionally implemented by an assumption within the process 1200 that all material pieces not classified as wrought aluminum alloys by the process block 1205 and/or not classified as extrusion aluminum alloys by the process block 1211 are to be considered thereafter within the process 1200 as cast aluminum alloys.

Note, that in accordance with alternative embodiments of the present disclosure, a negative classification/sort may be performed after any one or more of the process blocks 1205, 1211, 1213.

In the process block 1215, a determination is made whether a total measured amount of copper and zinc in the material piece is greater than a predetermined value "C." In accordance with certain embodiments of the present disclosure, such a determination may be made utilizing the CU and ZN values described with respect to the process 700. Additionally, in accordance with certain embodiments of the present disclosure, such a determination may be made utilizing the total captured XRF spectrum counts for a material piece (N-Total) (after normalized with the length and height (or mass) of the piece) relative to the value AK, such as disclosed with respect to the process block 717. In accordance with certain embodiments of the present disclosure, this AK value may be set as 0.4×N-Total for a 319 standard cast aluminum alloy (e.g., as determined by the Aluminum Association).

If the determination by the process block 1215 is not in the affirmative, then a determination is made in the process block 1216 whether a measured amount of iron in the material piece is greater than a predetermined value "D." In accordance with certain embodiments of the present disclosure, a determination of FE relative to the value FEK as similarly described with respect to the process block 729 may be utilized for the determination of FE>D. If FE>D, the material piece will be classified as a 360 cast aluminum piece, and in the process block 1217, instructions may be sent by the process 1200 to a specified sorting device to sort out the material piece accordingly. Otherwise, the material piece will be classified as a 356 cast aluminum piece, and in the process block 1218, instructions may be sent by the process 1200 to a specified sorting device to sort out the material piece accordingly.

Therefore, it can be readily appreciated that the process 1200 may be configured so that a material piece is sorted out as classified as a 356/360 cast aluminum material by a combination of the process blocks 1215 and 1216. Additionally, the foregoing combination may also include any one or more of the vision checks of the process blocks 1201/1203, 1205, 1211, and/or 1213.

Since 319 and 38x cast aluminum alloys have a material composition represented by a relatively large copper peak compared to zinc as captured in the XRF spectrum (copper concentration ~3-4%; zinc concentration <1%), the process blocks 1219-1224 may be implemented in the process 1200 to separate these alloys from die cast zinc metal pieces (or all other cast aluminum alloys remaining in the stream of material pieces). Note that in accordance with alternative embodiments of the present disclosure, the material handling system may be configured so that all cast aluminum alloy pieces not classified as either 319/38x and/or die cast zinc metal pieces are collected in a catch-all receptacle (see the process block 1225).

In the process block 1219, a classification of each such material piece is performed whereby a determination is made whether the captured XRF spectrum of the material piece indicates that the material piece has a copper concentration that is relatively larger than the zinc concentration, as previously described. For example, a determination may be made whether a ratio of a measured amount of copper to a measured amount of zinc in the material piece is greater than a predetermined value "E." In accordance with certain embodiments of the present disclosure, a determination whether the ratio of the values CU/ZN is greater than the predetermined value BK as described with respect to the process block 722 may be utilized.

If the ratio of a measured amount of copper to a measured amount of zinc in the material piece is not greater than a predetermined value "E," the material piece is classified as a die cast zinc piece, and in the process block 1220, the process 1200 sends instructions to a specified sorting device to sort out the material piece accordingly.

In the process block 1221, a classification of each such material piece is performed whereby a determination is made whether the ratio of a measured amount of copper to a measured amount of zinc in the material piece is greater than a predetermined value E and less than a predetermined value F. In accordance with certain embodiments of the present disclosure, a determination whether the ratio of the values CU/ZN is greater than a predetermined value E and less than a predetermined value F may be utilized.

If yes, the material piece is classified as a 38x cast aluminum piece, and in the process block 1222, the process 1200 sends instructions to a specified sorting device to sort out the material piece accordingly.

In the process block 1223, a classification of each such material piece is performed whereby a determination is made whether the ratio of a measured amount of copper to a measured amount of zinc in the material piece is greater than a predetermined value F and less than a predetermined value G. In accordance with certain embodiments of the present disclosure, a determination whether the ratio of the values CU/ZN is greater than a predetermined value F and less than a predetermined value G may be utilized.

If yes, the material piece is classified as a 319 cast aluminum piece, and in the process block 1224, the process 1200 sends instructions to a specified sorting device to sort out the material piece accordingly.

In accordance with embodiments of the present disclosure, the process 1200 may be configured so that any other material pieces not sorted out from the material stream of collected in a receptacle as noted by the process block 1225.

It can be readily appreciated that: (1) a combination of the XRF sensor system classifications of the process blocks 1215 and 1219 can be utilized for sorting of die cast zinc pieces from the material stream, (2) a combination of the XRF sensor system classifications of the process blocks 1219 and 1221 can be utilized for sorting of 38x cast aluminum alloy pieces from the material stream, (3) a combination of the XRF sensor system classifications of the process blocks 1221 and 1223 can be utilized for sorting 319 cast aluminum alloy pieces from the material stream, (4) a combination of the XRF sensor system classifications of the process blocks 1219, 1221, and 1223 can be utilized for separately sorting of die cast zinc, 38x cast aluminum alloy, and 319 cast aluminum alloy pieces from the material stream, and (5) a combination of the XRF sensor system classifications of the process blocks 1215, 1219, 1221, and 1223 can be utilized for separately sorting of 356, 360, 38x, and 319 cast aluminum alloys and die cast zinc pieces from a material stream. Additionally, the foregoing combinations may also include any one or more of the vision checks of the process blocks 1201/1203, 1205, 1211, and/or 1213.

FIG. 8 illustrates a simplified schematic diagram of a non-limiting example of a material handling system 800 configured in accordance with embodiments of the present disclosure. The label 808 represents a conveyor system, which may be configured with any combination of conveyor devices as described herein, including, but not limited to, one or more conveyor belts, for conveying a plurality of material pieces (not shown) past a vision system and XRF system 801 (or any other appropriately configured sensor technology disclosed herein) and N (N≥1) sorting devices 802 . . . 804. The N sorting devices 802 . . . 804 may be configured to sort out specifically classified material pieces into N corresponding receptacles or onto N other conveyor systems 805 . . . 807, respectively. In accordance with certain embodiments of the present disclosure, one or more of the N conveyor systems 805 . . . 807 may be configured to convey its respective sorted material pieces to another sorting device (not shown) for a further sort, based on one or more classifications derived from the captured information from the vision system and/or the XRF system 801 (for example, see the discussion with respect to FIG. 10).

Thus, the material handling system 800 may be configured to implement one or more aspects of the process 700 described with respect to FIGS. 7A-7C, whereby each sort is based on one or more classifications derived from the captured information from the vision system and/or the XRF system 801. For example, various configurations of the system and process 800 may be configured to implement a combination of one or more of the process blocks 704-708, 790, a combination of one or more of the process blocks 709-714, a combination of one or more of the process blocks 704, 709, 715, 717, and/or 721, or a combination of one or more of the process blocks 725-731.

Similarly, the material handling system 800 may be configured to implement one or more aspects of the process 1200 described with respect to FIGS. 12A-12B, whereby each sort is based on one or more classifications derived from the captured information from the vision system and/or the XRF system 801. For example, various configurations of the system and process 800 may be configured to implement a combination of one or more of the process blocks 1205-1210, a combination of one or more of the process blocks 1215-1218, a combination of one or more of the process blocks 1205, 1211, 1213, 1215, 1219, 1221, and/or 1223, or a combination of one or more of the process blocks 1219-1225.

In accordance with non-limiting exemplary embodiments of the present disclosure, a plurality of at least a portion of the components of the material handling system 100 may be linked together (e.g., in succession or in parallel) in order to perform multiple iterations or layers of classifying/sorting. Such a linking may be a physical/mechanical linking of systems or a linking of classifying/sorting processes in any desired manner by separate material handling systems (or the same material handling system separately performing the various classifying/sorting processes). For example, when two or more systems 100 are linked in such a manner, the conveyor system may be implemented with a single conveyor belt, or multiple conveyor belts, conveying the material pieces past a first vision system (and, in accordance with certain embodiments, a sensor system) configured for classifying/sorting material pieces of a first set of a heterogeneous mixture of materials by a sorting device (e.g., the first automation control system 108 and associated one or more sorting devices 126 . . . 129) into a first set of one or more receptacles (e.g., sorting receptacles 136 . . . 139), and then conveying the material pieces past a second vision system (and, in accordance with certain embodiments, another sensor system) configured for classifying/sorting material pieces of a second set of a heterogeneous mixture of materials by a second sorting device into a second set of one or more sorting receptacles. A further discussion of such multistage sorting is in U.S. published patent application no. 2022/0016675, which is hereby incorporated by reference herein.

As further described herein, such successions of material handling systems 100 can contain any number of such systems linked together in such a manner. In accordance with certain embodiments of the present disclosure, each successive material handling system may be configured to classify/sort out a different classified or type of material than the previous system(s) (e.g., as described with respect to FIGS. 7A-7C and FIGS. 12A-12B).

Figure 9A:
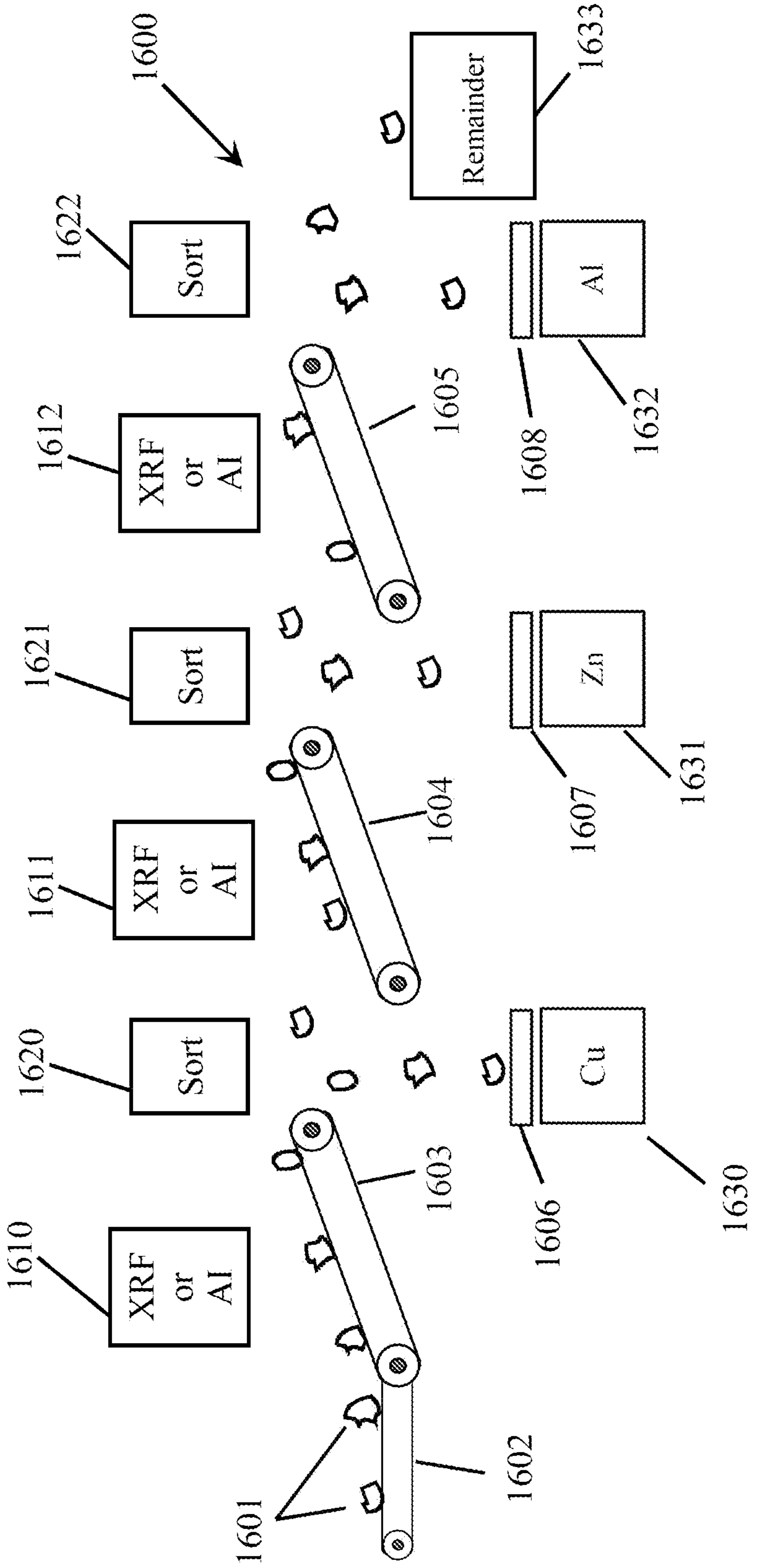
FIGS. 9A and 9B illustrate systems and processes for sorting of materials in accordance with certain embodiments of the present disclosure.
Figure 9B:
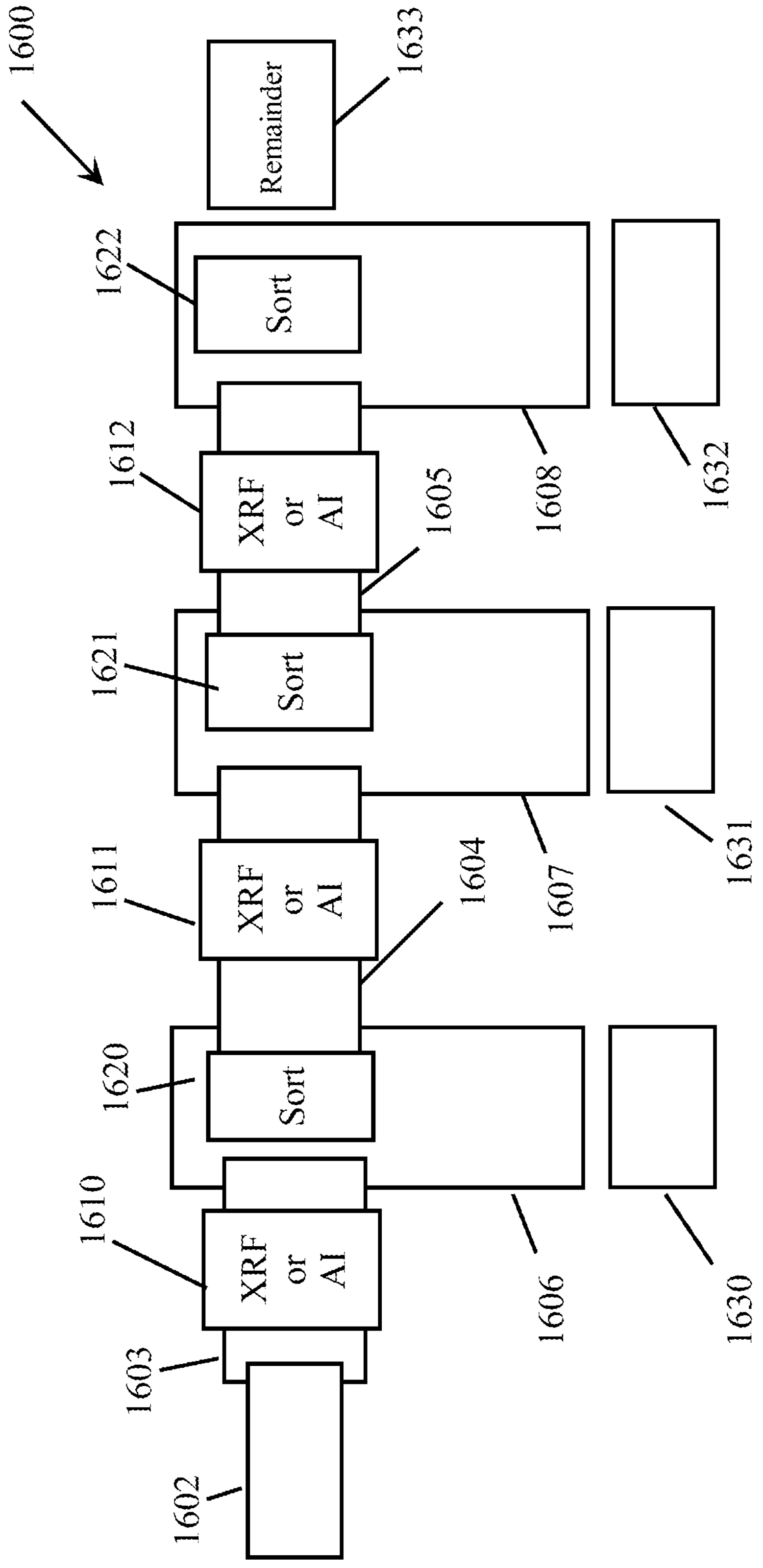

FIGS. 9A-9B illustrate a simplified schematic diagram of a system and process 1600 configured in accordance with certain non-limiting exemplary embodiments of the present disclosure in order to classify/sort a plurality of material pieces (e.g., such as described with respect to various aspects of the process 700 of FIGS. 7A-7C and the process 1200 of FIGS. 12A-12B). FIG. 9A illustrates an exemplary non-limiting schematic diagram of a side view of such a system and process 1600, while FIG. 9B illustrates a top view.

A plurality of material pieces 1601 may be conveyed (e.g., by a conveyor belt 1602), or deposited into a hopper, to be picked up by an inclined conveyor system 1603. Note that the material pieces 1601 are not depicted in FIG. 9B for the sake of simplicity. The conveyor system 1603 conveys the material pieces 1601 past an AI and/or XRF system in order to classify the material pieces for sorting. Alternatively, any other of the disclosed sensor systems 120 (e.g., LIBS, XRT, etc.) may be utilized instead of an XRF system.

For example, various configurations of the system and process 1600 may be configured to implement a combination of one or more of the process blocks 705-708, 790, a combination of one or more of the process blocks 709-714, a combination of one or more of the process blocks 704, 709, 715, 717, and/or 721, or a combination of one or more of the process blocks 725-731.

Take, for example, the combination of the process blocks 725-731. As a non-limiting example, an XRF or vision system implementing an AI system 1610 may be configured to classify which of the material pieces 1601 are composed of a 2xxx series wrought aluminum alloy. The conveyor system 1603 may be configured to operate at a sufficient speed in order to "throw" the material pieces not classified as a 2xxx series wrought aluminum alloy onto a following inclined conveyor system 1604. Material pieces classified as composed of 2xxx series wrought aluminum alloy are ejected by a sorting device 1620 onto a lower positioned conveyor system 1606. For example, such a sorting device 1620 may be an air jet nozzle such as described herein, which is actuated to eject a material piece classified as a 2xxx series wrought aluminum alloy from the normal trajectory of material pieces being "thrown" from the end of the conveyor system 1603 onto the conveyor system 1604. The material pieces classified as a 2xxx series wrought aluminum alloy may be conveyed into a receptacle 1630.

The material pieces not classified as a 2xxx series wrought aluminum alloy may be conveyed past an XRF or AI system 1611, which may be configured to identify and classify those material pieces that are composed of a 7xxx series wrought aluminum alloy. The conveyor system 1604 may be configured to operate at a sufficient speed in order to "throw" the material pieces not classified as a 7xxx series wrought aluminum alloy onto a following inclined conveyor system 1605. Material pieces classified as composed of a 7xxx series wrought aluminum alloy may be ejected by a sorting device 1621 onto a lower positioned conveyor system 1607. For example, such a sorting device 1621 may be an air jet nozzle such as described herein, which is actuated to eject a material piece classified as a 7xxx series wrought aluminum alloy from the normal trajectory of material pieces being "thrown" from the end of the conveyor system 1604 onto the conveyor system 1605. The classified material pieces may be conveyed into a receptacle 1631.

The material pieces not classified as a 7xxx series wrought aluminum alloy may be conveyed past an XRF or AI system 1612, which may be configured to identify and classify those material pieces as a 3xxx series wrought aluminum alloy.

The conveyor system 1605 may be configured to operate at a sufficient speed in order to "throw" the material pieces not classified as a 3xxx series wrought aluminum alloy onto yet another conveyor system (not shown) or into a receptacle 1633. The material pieces classified as a 3xxx series wrought aluminum alloy may be ejected by a sorting device 1622 onto a lower positioned conveyor system 1608. For example, such a sorting device 1622 may be an air jet nozzle such as described herein, which is actuated to eject a material piece classified as a 3xxx series wrought aluminum alloy, for example, from the normal trajectory of material pieces being "thrown" from the end of the conveyor system 1605. These classified material pieces may be conveyed into a receptacle 1632. The remaining material pieces thrown from the end of the conveyor belt 1605 may be considered as classified as either or both 5xxx and 6xxx series wrought aluminum alloys.

Note that the system and process 1600 is not limited to one line of conveyor systems, but may be expanded to multiple lines each ejecting classified material pieces onto multiple conveyor systems (e.g., conveyor systems 1606 . . . 1608). Likewise, one or more of the conveyor systems 1606 . . . 1608 may be implemented with an additional XRF or AI system to further classify those material pieces. For example, the material pieces classified as composed of 5xxx and 6xxx series wrought aluminum alloys (and collected into the receptacle 1633) may be instead conveyed (by a conveyor system not shown) past another XRF and/or AI system (or other sensor system 120) in order to classify and/or sort between those wrought aluminum alloys.

Therefore, in accordance with certain embodiments of the present disclosure, a classifying/sorting system as described with respect to one or more of the process blocks 717-721 can first sort out cast aluminum material pieces, then the remaining material pieces can be classified/sorted between the various remaining wrought aluminum alloys.

Similarly, the material handling system 1600 may be configured to implement one or more aspects of the process 1200 described with respect to FIGS. 12A-12B, whereby each sort is based on one or more classifications derived from the captured information from the vision system and/or the XRF system 801. For example, various configurations of the system and process 800 may be configured to implement a combination of one or more of the process blocks 1205-1210, a combination of one or more of the process blocks 1215-1218, a combination of one or more of the process blocks 1205, 1211, 1213, 1215, 1219, 1221, and/or 1223, or a combination of one or more of the process blocks 1219-1225.

Figure 10:
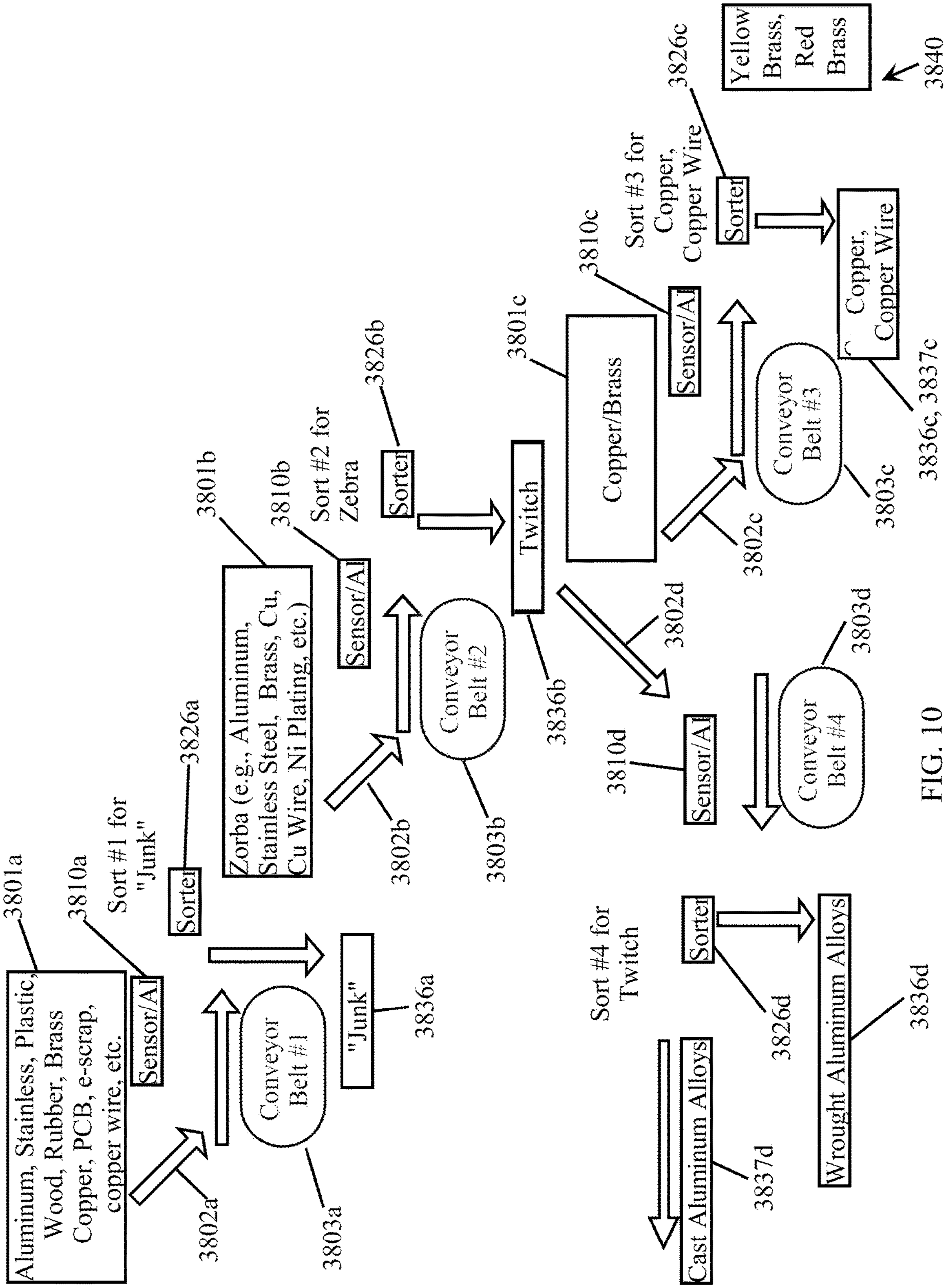
FIG. 10 illustrates linking of successive material handling systems in accordance with certain embodiments of the present disclosure.

Referring to FIG. 10, there is illustrated a schematic diagram of a non-limiting example of a linking of successive material handling systems (physically or performed in succession by a plurality of appropriately configured material handling systems 100 (or the same material handling system appropriately configured for each successive classification/sort)) in accordance with certain embodiments of the present disclosure, which may be implemented with any material handling system utilizing one or more vision systems implementing (e.g., utilizing artificial intelligence ("AI")) and/or one or more sensor systems 120 (such as, for example, to perform one or more various aspects as described with respect to FIGS. 7A-7C or FIGS. 12A-12B). For the sake of simplicity, with respect to the following discussion of FIG. 10, such combinations of one or more vision systems and/or one or more sensor systems may simply be referred to as a material classification system. In FIG. 10, the arrows schematically depict how the various material pieces are conveyed along such an exemplary material handling system. In this non-limiting example, four separate material handling systems are illustrated, though any number of such material handling systems may be combined in any manner in order to separate and sort various different classes of materials. The example in FIG. 10 describes various classes of materials to be sorted (e.g., such as typically contained with Zorba, Zebra, and Twitch), but embodiments of the present disclosure are applicable to the classification/sorting of any combination of a heterogeneous mixture of material pieces.

In this particular example, a group of materials that includes a heterogeneous mixture of materials 3801*a* (for example, Zorba and "junk" or "fluff" materials (e.g., aluminum, stainless steel, plastic, wood, rubber, brass, copper, PCB, e-scrap, copper wire, etc.)) is fed onto a first conveyor system 3803*a* (identified as Conveyor Belt #1 in FIG. 10), for example, from a ramp or chute 3802*a* (e.g., ramp or chute 102, for example from a hopper). The conveyor system 3803*a* conveys the material pieces 3801*a* past a material classification system 3810*a*, which may be configured to classify/sort the material pieces (e.g., "junk" or "fluff" materials) from the remainder of the material pieces (identified as Sort #1) utilizing the Sorter 3826*a*, which may utilize any of the sorting devices described herein, for deposit into one or more receptacles 3836*a* (for example, see the process blocks 701-703 of FIG. 7A or the process blocks 1201-1203 of FIG. 12A).

The remaining heterogeneous mixture of material pieces 3801*b* (e.g., Zorba materials) may then be conveyed along the same conveyor system, or deposited 3802*b* onto a conveyor system 3803*b* (identified as Conveyor Belt #2 in FIG. 10). The conveyor system 3803*b* passes these material pieces 3801*b* past a material classification system 3810*b*, which may be configured to identify and separate the Zebra pieces from the Twitch pieces (identified as Sort #2) using the Sorter 3826*b*, which may include one or more combinations of classify/sorts (for example, see the process blocks 704, 709, and 715 of FIGS. 7A-7B).

In this particular non-limiting example, the copper and brass material pieces 3801*c* may then be deposited 3802*c* onto a conveyor system 3803*c* (identified as Conveyor Belt #3 in FIG. 10) for identification by a material classification system 3810*c* to be sorted by a Sorter 3826*c* (identified as Sort #3). This section of the material handling system may be configured to separate and sort material pieces made of copper and copper wire from the brass (e.g., see the process blocks 705-706), which may be deposited into one or more receptacles or onto a conveyor system for further classification/sorting. In accordance with certain embodiments of the present disclosure, each of the material pieces classified as copper, copper wire, yellow brass, and red brass material pieces may be individually sorted and deposited into separate receptacles for copper 3836*c* and copper wire 3837*c*. The remaining heterogeneous mixture of material pieces (yellow brass and red brass) may then be deposited into a receptacle 3840, or may be further processed by a classifying/sorting system (not shown) as previously described (e.g., see the process blocks 707, 708, 790).

Embodiments of the present disclosure are not limited to a linear succession of such material handling systems, but may include a combination of branching of such material handling systems for further classification and sorting of a particular class or classes of materials. For example, FIG. 10 illustrates how the material pieces classified as aluminum alloy (Twitch) material pieces 3836*b* sorted in Sort #2 may then be deposited 3802*d* onto a conveyor system 3803*d* (identified as Conveyor Belt #4 in FIG. 10). For example, the Sorter 3826*b* may physically sort such Twitch material pieces onto a conveyor system, such as the conveyor system 3803*d*, or the receptacle 3836*b* in which the Twitch material pieces have been deposited may be a ramp or chute for depositing the Twitch material pieces onto the conveyor system 3803*d*, or the receptacle containing the Twitch material pieces may simply be manipulated to deposit the Twitch material pieces onto the conveyor system 3803*d*. A material classification system 3810*d* may then be configured to classify these Twitch material pieces into cast aluminum alloys and wrought aluminum alloys (e.g., such as described herein with respect to the process block 721 of FIG. 7B), or wrought aluminum alloys, extrusion aluminum alloys, and cast aluminum alloys (e.g., such as described herein with respect to the process blocks 1205, 1211, and 1213 of FIG. 12A). In this Sort #4, a Sorter 3826*d* may then be configured to separate the cast aluminum alloys from the wrought aluminum alloys based on the classification by the material classification system 3810*d* whereby the cast aluminum alloys may be deposited into a receptacle 3837*d* and the wrought aluminum alloys may be deposited into a receptacle 3836*d* or onto a conveyor system (not shown) for further classification/sorting.

A variation in the system of FIG. 10 may include a further classification/sort of the cast aluminum alloys into different predefined cast aluminum alloys using one or more sensor systems 120, including, but not limited to, an XRF system (e.g., such as described with respect to the process blocks 722-724 of FIG. 7B and also with respect to the process blocks 1215-1225 of FIG. 12B). And another variation in the system of FIG. 10 may include a further classification/sort of the wrought aluminum alloys into different predefined wrought aluminum alloys using one or more sensor systems 120, including, but not limited to, an XRF system such as described with respect to the process blocks 725-731 of FIG. 7C (and also with respect to the process blocks 1206-1210 of FIG. 12A).

As can be readily seen, the material handling system illustrated in FIG. 10 may be modified into any combination of classification/sorting systems for sorting materials as desired.

In accordance with various embodiments of the present disclosure, different types or classes of materials may be classified by different types of sensors each for use with an AI system, and combined to classify material pieces in a stream of scrap or waste.

In accordance with various embodiments of the present disclosure, data from two or more sensors can be combined using single or multiple AI systems to perform classifications of material pieces.

In accordance with various embodiments of the present disclosure, multiple sensor systems can be mounted onto a single conveyor system, with each sensor system utilizing a different AI system. In accordance with various embodiments of the present disclosure, multiple sensor systems can be mounted onto different conveyor systems, with each sensor system utilizing a different AI system.

In accordance with various embodiments of the present disclosure, different types or classes of materials may be classified by different types of sensors each for use with an AI system, and combined to classify material pieces in a stream of scrap or waste.

In accordance with various embodiments of the present disclosure, data (e.g., spectral or XRF spectrum data) from two or more sensors can be combined using a single or multiple AI systems to perform classifications of material pieces.

Figure 11:
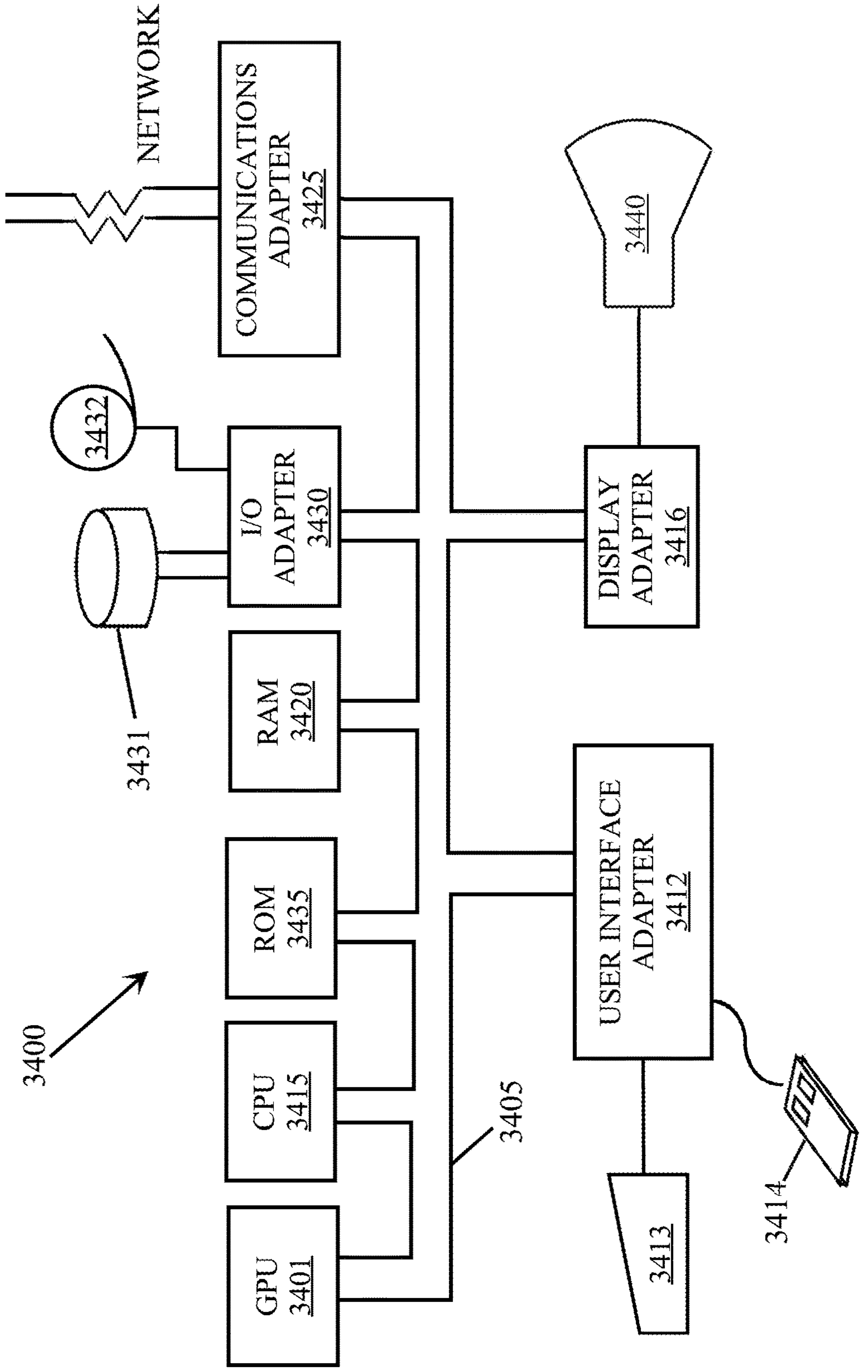
FIG. 11 illustrates a block diagram of a data processing system configured in accordance with various embodiments of the present disclosure.

With reference now to FIG. 11, a block diagram illustrating a data processing ("computer") system 3400 is depicted in which aspects of embodiments of the disclosure may be implemented. (The terms "computer," "system," "computer system," and "data processing system" may be used interchangeably herein.) Aspects of the computer system 107, the automation control system 108, the sensor system(s) 120, and/or the vision system 110 may be configured similarly as the computer system 3400. The computer system 3400 may employ a local bus 3405 (e.g., a peripheral component interconnect ("PCI") local bus architecture). Any suitable bus architecture may be utilized such as Accelerated Graphics Port ("AGP") and Industry Standard Architecture ("ISA"), among others. One or more processors 3415, volatile memory 3420, and non-volatile memory 3435 may be connected to the local bus 3405 (e.g., through a PCI Bridge (not shown)). An integrated memory controller and cache memory may be coupled to the one or more processors 3415. The one or more processors 3415 may include one or more central processor units and/or one or more graphics processor units and/or one or more tensor processing units. Additional connections to the local bus 3405 may be made through direct component interconnection or through add-in boards. In the depicted example, a communication (e.g., network (LAN)) adapter 3425, an I/O (e.g., small computer system interface ("SCSI") host bus) adapter 3430, and expansion bus interface (not shown) may be connected to the local bus 3405 by direct component connection. An audio adapter (not shown), a graphics adapter (not shown), and display adapter 3416 (coupled to a display 3440) may be connected to the local bus 3405 (e.g., by add-in boards inserted into expansion slots).

The user interface adapter 3412 may provide a connection for a keyboard 3413 and a mouse 3414, modem (not shown), and additional memory (not shown). The I/O adapter 3430 may provide a connection for a hard disk drive 3431, a tape drive 3432, and a CD-ROM drive (not shown).

An operating system may be run on the one or more processors 3415 and used to coordinate and provide control of various components within the computer system 3400. The operating system may be a commercially available operating system. An object-oriented programming system may run in conjunction with the operating system and provide calls to the operating system from programs or programs (e.g., Java, Python, etc.) executing on the system 3400. Instructions for the operating system, the object-oriented operating system, and programs may be located on non-volatile memory 3435 storage devices, such as a hard disk drive 3431, and may be loaded into volatile memory 3420 for execution by the processor 3415.

Those of ordinary skill in the art will appreciate that the hardware in FIG. 11 may vary depending on the implementation. Other internal hardware or peripheral devices, such as flash ROM (or equivalent nonvolatile memory) or optical disk drives and the like, may be used in addition to or in place of the hardware depicted in FIG. 11. Also, any of the processes of the present disclosure may be applied to a multiprocessor computer system, or performed by a plurality of such systems 3400. For example, training of the vision system 110 may be performed by a first computer system 3400, while operation of the vision system 110 for sorting may be performed by a second computer system 3400.

As another example, the computer system 3400 may be a stand-alone system configured to be bootable without relying on some type of network communication interface, whether or not the computer system 3400 includes some type of network communication interface. As a further example, the computer system 3400 may be an embedded controller, which is configured with ROM and/or flash ROM providing non-volatile memory storing operating system files or user-generated data.

The depicted example in FIG. 11 and above-described examples are not meant to imply architectural limitations. Further, a computer program form of aspects of the present disclosure may reside on any computer readable storage medium (i.e., floppy disk, compact disk, hard disk, tape, ROM, RAM, etc.) used by a computer system.

As has been described herein, embodiments of the present disclosure may be implemented to perform the various functions described for identifying, tracking, classifying, and/or sorting material pieces. Such functionalities may be implemented within hardware and/or software, such as within one or more data processing systems (e.g., the data processing system 3400 of FIG. 11), such as the previously noted computer system 107, the vision system 110, aspects of the sensor system(s) 120, and/or the automation control system 108. Nevertheless, the functionalities described herein are not to be limited for implementation into any particular hardware/software platform.

As will be appreciated by one skilled in the art, aspects of the present disclosure may be embodied as a system, process, method, and/or program product. Accordingly, various aspects of the present disclosure may take the form of an entirely hardware embodiment, an entirely software embodiment (including firmware, resident software, micro-code, etc.), or embodiments combining software and hardware aspects, which may generally be referred to herein as a "circuit," "circuitry," "module," or "system." Furthermore, aspects of the present disclosure may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 3420 of FIG. 11), a read-only memory ("ROM") (e.g., ROM 3435 of FIG. 11), an erasable programmable read-only memory ("EPROM" or flash memory), an optical fiber, a portable compact disc read-only memory ("CD-ROM"), an optical storage device, a magnetic storage device (e.g., hard drive 3431 of FIG. 11), or any suitable combination of the foregoing. In the context of this document, a computer readable storage medium may be any tangible medium that can contain or store a program for use by or in connection with an instruction execution system, apparatus, controller, or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, controller, or device.

The flowchart and block diagrams in the figures illustrate architecture, functionality, and operation of possible implementations of systems, methods, processes, and program products according to various embodiments of the present disclosure. In this regard, each block in the flowcharts or block diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

Modules implemented in software for execution by various types of processors (e.g., GPU 3401, CPU 3415) may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data (e.g., material classification libraries described herein) may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to one or more processors and/or controller(s) of a general purpose computer, special purpose computer, or other programmable data processing apparatus (e.g., controller) to produce a machine, such that the instructions, which execute via the processor(s) (e.g., GPU 3401, CPU 3415) of the computer or other programmable data processing apparatus, create circuitry or means for implementing the functions/acts specified in the flowchart and/or block diagram block or blocks.

It will also be noted that each block of the block diagrams and/or flowchart illustrations, and combinations of blocks in the block diagrams and/or flowchart illustrations, can be implemented by special purpose hardware-based systems (e.g., which may include one or more graphics processing units (e.g., GPU 3401)) that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices, or the like.

Computer program code, i.e., instructions, for carrying out operations for aspects of the present disclosure may be written in any combination of one or more programming languages, including an object oriented programming language such as Java, Smalltalk, Python, C++, or the like, conventional procedural programming languages, such as the "C" programming language or similar programming languages, programming languages such as MATLAB or LabVIEW, or any of the machine learning software disclosed herein. The program code may execute entirely on the user's computer system, partly on the user's computer system, as a stand-alone software package, partly on the user's computer system (e.g., the computer system utilized for sorting) and partly on a remote computer system (e.g., the computer system utilized to train the machine learning system), or entirely on the remote computer system or server. In the latter scenario, the remote computer system may be connected to the user's computer system through any type of network, including a local area network ("LAN") or a wide area network ("WAN"), or the connection may be made to an external computer system (for example, through the Internet using an Internet Service Provider). As an example of the foregoing, various aspects of the present disclosure may be configured to execute on one or more of the computer system 107, automation control system 108, the vision system 110, and aspects of the sensor system(s) 120.

These program instructions may also be stored in a computer readable storage medium that can direct a computer system, other programmable data processing apparatus, controller, or other devices to function in a particular manner, such that the instructions stored in the computer readable medium produce an article of manufacture including instructions which implement the function/act specified in the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host for storing and providing access to data for the various implementations. One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, any of the database products available from Oracle Corporation, Microsoft Access by Microsoft Corporation, or any other database product. The database may be organized in any suitable manner, including as data tables or lookup tables.

Embodiments of the present disclosure provide a paradigm shift from "binary" sorts thereby reducing cost. This innovation is not immediately striking; however, it greatly reduces the overall cost of sorting. Existing sorters are designed to sort materials in a binary fashion, where air nozzles at the end of the conveyor eject one class into one of two bins. If eight classes needed to be separated as in the case of Zorba, the entire stream needs to be run across the binary sorter eight different times, which takes eight times as long as trying to remove one single object in the stream. Embodiments of the present disclosure allow for multiple classes to be sorted in one pass, in this case, that would reduce the overall sorting time by a factor of eight.

Reference is made herein to "configuring" a device or a device "configured to" perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing. Such configured devices are physically designed to perform the specified function or functions.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, and so forth. In other instances, well-known structures, materials, or operations may be not shown or described in detail to avoid obscuring aspects of the disclosure.

Reference throughout this specification to "an embodiment," "embodiments," or similar language means that a particular feature, structure, or characteristic described in connection with the embodiments is included in at least one embodiment of the present disclosure. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the disclosure unless expressly described as essential or critical.

Those skilled in the art having read this disclosure will recognize that changes and modifications may be made to the embodiments without departing from the scope of the present disclosure. It should be appreciated that the particular implementations shown and described herein may be illustrative of the disclosure and its best mode and may be not intended to otherwise limit the scope of the present disclosure in any way. Other variations may be within the scope of the following claims.

While this specification contains many specifics, these should not be construed as limitations on the scope of the disclosure or of what can be claimed, but rather as descriptions of features specific to particular implementations of the disclosure. Headings herein may be not intended to limit the disclosure, embodiments of the disclosure or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the disclosure. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms (such as acronyms used for chemical elements within the periodic table) used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

What is claimed is:

1. A method for sorting of material pieces from a conveyed stream of materials, comprising:

- performing one or more vision checks on each material piece within the conveyed stream of materials, wherein each of the one or more vision checks comprises classifying each material piece as a function of processing visual images captured from each material piece through an artificial intelligence ("AI") system;
- performing one or more sensor system classifications on each material piece within the conveyed stream of materials; and
- sorting material pieces from the conveyed stream of materials into one or more classification groups as a function of a combination of the one or more vision checks and the one or more sensor system classifications.

2. The method as recited in claim 1, wherein the conveyed stream of materials comprises one or more wrought aluminum alloys and one or more cast aluminum alloys, wherein the sorting further comprises:

sorting from the conveyed stream of materials one or more of the wrought aluminum alloys into one or more first classification groups based on a first combination of the one or more vision checks and the one or more sensor system classifications; and sorting from the conveyed stream of materials one or more of the cast aluminum alloys into one or more second classification groups based on a second combination of the one or more vision checks and the one or more sensor system classifications, wherein the sorting from the conveyed stream of materials of the one or more wrought aluminum alloys is performed before the sorting from the conveyed stream of materials of the one or more cast aluminum alloys.

3. The method as recited in claim 2, wherein the first combination comprises a vision check to determine whether a material piece is composed of a wrought aluminum alloy and one or more sensor system classifications based on measured amounts of copper and zinc in the material piece.

4. The method as recited in claim 2, wherein the sorting from the conveyed stream of materials one or more of the wrought aluminum alloys into one or more first classification groups further comprises sorting a material piece from the stream of material pieces as classified as a 2xxx series wrought aluminum alloy when a vision check determines that the material piece is composed of a wrought aluminum alloy and a sensor system classification determines that (1) a ratio of a measured amount of copper to a measured amount of zinc in the material piece is greater than a first predetermined value and (2) a measured amount of copper in the material piece is greater than a second predetermined value.

5. The method as recited in claim 2, wherein the sorting from the conveyed stream of materials one or more of the wrought aluminum alloys into one or more first classification groups further comprises sorting a material piece from the stream of material pieces as classified as a 7xxx series wrought aluminum alloy when a vision check determines that the material piece is composed of a wrought aluminum alloy and a sensor system classification determines that (1) a ratio of a measured amount of copper to a measured amount of zinc in the material piece is less than a first predetermined value and (2) a measured amount of zinc in the material piece is greater than a second predetermined value.

6. The method as recited in claim 2, wherein the sorting from the conveyed stream of materials one or more of the wrought aluminum alloys into one or more first classification groups further comprises sorting a material piece from the stream of material pieces as classified as a 3xxx and/or 5xxx and/or 6xxx series wrought aluminum alloy when:

(1) a vision check determines that the material piece is composed of a wrought aluminum alloy, and (2) a first one of the one or more sensor system classifications determines that:

(i) a ratio of a measured amount of copper to a measured amount of zinc in the material piece is not greater than a first predetermined value, and (ii) a measured amount of copper in the material piece is not greater than a second predetermined value, and (3) a second one of the one or more sensor system classifications determines that:

(i) the ratio of a measured amount of copper to a measured amount of zinc in the material piece is not less than a third predetermined value, and (ii) a measured amount of zinc in the material piece is not greater than a fourth predetermined value.

7. The method as recited in claim 2, further comprising sorting from the conveyed stream of materials extrusion aluminum alloys into one or more third classification groups based on a third combination of the one or more vision checks, wherein the sorting from the conveyed stream of materials of the one or more extrusion aluminum alloys is performed subsequent to the sorting from the conveyed stream of materials of the one or more wrought aluminum alloys and before the sorting from the conveyed stream of materials of the one or more cast aluminum alloys.

8. The method as recited in claim 3, wherein the sorting from the conveyed stream of materials one or more of the cast aluminum alloys into one or more second classification groups further comprises:

sorting a material piece from the stream of material pieces as classified as a 360 cast aluminum alloy when the first vision check determines that the material piece is not composed of a wrought aluminum alloy and a first one of the one or more sensor system classifications determines that a total measured amount of copper and zinc in the material piece is not greater than a first predetermined value and a second one of the one or more sensor system classifications determines that a measured amount of iron in the material piece is greater than a second predetermined value; and sorting a material piece from the stream of material pieces as classified as a 356 cast aluminum alloy when the first vision check determines that the material piece is not composed of a wrought aluminum alloy and the first one of the one or more sensor system classifications determines that the total measured amount of copper and zinc in the material piece is not greater than the first predetermined value and the second one of the one or more sensor system classifications determines that the measured amount of iron in the material piece is not greater than the second predetermined value.

9. The method as recited in claim 8, further comprising sorting a material piece from the stream of material pieces as classified as a die cast zinc piece when:

(1) the first vision check determines that the material piece is not composed of a wrought aluminum alloy, and (2) the first one of the one or more sensor system classifications determines that a total measured amount of copper and zinc in the material piece is greater than the first predetermined value, and (3) a third one of the one or more sensor system classifications determines that a ratio of a measured amount of copper to a measured amount of zinc in the material piece is less than a third predetermined value.

10. The method as recited in claim 2, wherein the second combination comprises a vision check to determine whether a material piece is composed of a cast aluminum alloy and one or more sensor system classifications based on measured amounts of copper and zinc in the material piece.

11. The method as recited in claim 10, wherein the sorting from the conveyed stream of materials one or more of the cast aluminum alloys into one or more second classification groups further comprises sorting a material piece from the stream of material pieces as classified as a 38x cast aluminum alloy when:

(1) the vision check determines that the material piece is composed of a cast aluminum alloy, and (2) a first one of the one or more sensor system classifications determines that a total measured amount of copper and zinc in the material piece is greater than a first predetermined value, and (3) a second one of the one or more sensor system classifications determines that a ratio of a measured amount of copper to a measured amount of zinc in the material piece is greater than a second predetermined value and less than a third predetermined value.

12. The method as recited in claim 11, wherein the sorting from the conveyed stream of materials one or more of the cast aluminum alloys into one or more second classification groups further comprises sorting a material piece from the stream of material pieces as classified as a 319 cast aluminum alloy when:

(1) the vision check determines that the material piece is composed of a cast aluminum alloy, and (2) the first one of the one or more sensor system classifications determines that the total measured amount of copper and zinc in the material piece is greater than the first predetermined value, and (3) a third one of the one or more sensor system classifications determines that the ratio of the measured amount of copper to the measured amount of zinc in the material piece is greater than the third predetermined value and less than a fourth predetermined value.

13. The method as recited in claim 12, wherein the second combination also includes a vision check to determine whether the material piece is composed of a wrought aluminum alloy, which is performed before the vision check to determine whether the material piece is composed of a cast aluminum alloy.

14. The method as recited in claim 2, wherein the conveyed stream of materials comprises Zorba materials, the method further comprising sorting from the conveyed stream of materials one or more junk materials based on one or more vision checks, wherein the sorting of the junk materials is performed before the sorting of the one or more wrought aluminum alloys and the sorting of the one or more cast aluminum alloys.

15. The method as recited in claim 2, wherein each of the one or more sensor system classifications is performed by a spectroscopic system.

16. The method as recited in claim 15, wherein the spectroscopic system is an x-ray fluorescence system.

17. The method as recited in claim 2, wherein each of the one or more vision checks is performed by a single vision system implementing one or more AI models within the AI system, and wherein each of the one or more sensor system classifications is performed by a single spectroscopic system implementing one or more algorithms for analyzing spectral data collected from the material pieces.

18. A method for sorting of material pieces from a conveyed stream of Zorba materials, comprising:

performing vision checks on each material piece within the conveyed stream of Zorba materials, wherein each of the vision checks comprises classifying each material piece as a function of processing visual images captured from each material piece through an artificial intelligence ("AI") system, wherein the vision checks are performed by a single vision system implementing a different AI model within the AI system for each of the vision checks;

performing sensor system classifications on each material piece within the conveyed stream of Zorba materials, wherein each of the sensor system classifications is performed by a different algorithm analyzing spectral data collected from each material piece by a single spectroscopic system;

sorting from the conveyed stream of Zorba materials a plurality of different wrought aluminum alloy material pieces into separately sorted classification groups based on a first combination of one or more vision checks and one or more sensor system classifications; and sorting from the conveyed stream of Zorba materials a plurality of different cast aluminum alloys material pieces into separately sorted classification groups based on a second combination of one or more vision checks and one or more sensor system classifications.

19. The method as recited in claim 18, wherein the sorting from the conveyed stream of Zorba materials of the plurality of different wrought aluminum alloy material pieces is performed before the sorting from the conveyed stream of Zorba materials of the plurality of different cast aluminum alloys material pieces, and wherein the single spectroscopic system is an x-ray fluorescence system.

20. The method as recited in claim 18, wherein the sensor system classifications are based on measured amounts of copper and zinc in the material piece.

21. The method as recited in claim 18, wherein the sorting from the conveyed stream of Zorba materials a plurality of different wrought aluminum alloy material pieces into separately sorted classification groups further comprises:

sorting a material piece from the conveyed stream of Zorba materials as classified as a 2xxx series wrought aluminum alloy when a vision check determines that the material piece is composed of a wrought aluminum alloy and a first sensor system classification determines that a ratio of a measured amount of copper to a measured amount of zinc in the material piece is greater than a first predetermined value and a measured amount of copper in the material piece is greater than a second predetermined value;

sorting a material piece from the conveyed stream of Zorba materials as classified as a 7xxx series wrought aluminum alloy when the vision check determines that the material piece is composed of a wrought aluminum alloy and a second sensor system classification determines that the ratio of a measured amount of copper to a measured amount of zinc in the material piece is less than a third predetermined value and a measured amount of zinc in the material piece is greater than a fourth predetermined value; and sorting a material piece from the conveyed stream of Zorba materials as classified as a 3xxx and/or 5xxx and/or 6xxx series wrought aluminum alloy when the second sensor system classification determines that the ratio of a measured amount of copper to a measured amount of zinc in the material piece is not less than the third predetermined value and the measured amount of zinc in the material piece is not greater than the fourth predetermined value.

22. The method as recited in claim 18, wherein the sorting from the conveyed stream of Zorba materials a plurality of different cast aluminum alloys material pieces into separately sorted classification groups further comprises:

sorting a material piece from the conveyed stream of Zorba materials as classified as a 360 cast aluminum alloy when a vision check determines that the material piece is composed of a cast aluminum alloy, a first sensor system classification determines that a total measured amount of copper and zinc in the material piece is less than a first predetermined value, and a second system classification determines that a measured amount of iron in the material piece is greater than a second predetermined value;

sorting a material piece from the conveyed stream of Zorba materials as classified as a 356 cast aluminum alloy when the vision check determines that the material piece is composed of a cast aluminum alloy, the first sensor system classification determines that the total measured amount of copper and zinc in the material piece is less than the first predetermined value, and the second system classification determines that the measured amount of iron in the material piece is less than the second predetermined value;

sorting a material piece from the conveyed stream of Zorba materials as classified as a 38x cast aluminum alloy when the vision check determines that the material piece is composed of a cast aluminum alloy, the first sensor system classification determines that a total measured amount of copper and zinc in the material piece is greater than a first predetermined value, and a third sensor system classification determines that a ratio of a measured amount of copper to a measured amount of zinc in the material piece is greater than a third predetermined value and less than a fourth predetermined value; and sorting a material piece from the conveyed stream of Zorba materials as classified as a 319 cast aluminum alloy when the vision check determines that the material piece is composed of a cast aluminum alloy, the first sensor system classification determines that the total measured amount of copper and zinc in the material piece is greater than the first predetermined value, and a fourth sensor system classification determines that the ratio of the measured amount of copper to the measured amount of zinc in the material piece is greater than the fourth predetermined value and less than a fifth predetermined value.

23. The method as recited in claim 22, further comprising sorting a material piece from the conveyed stream of Zorba materials as classified as a die cast zinc piece when the vision check determines that the material piece is composed of a cast aluminum alloy, the first sensor system classification determines that the total measured amount of copper and zinc in the material piece is greater than the first predetermined value, and a fifth sensor system classification determines that the ratio of a measured amount of copper to a measured amount of zinc in the material piece is less than the third predetermined value.

* * * * *